(12) United States Patent
Greenberg et al.

(10) Patent No.: US 9,582,485 B2
(45) Date of Patent: *Feb. 28, 2017

(54) AUTHORING AND DELIVERING WRAP PACKAGES OF CARDS WITH CUSTOM CONTENT TO TARGET INDIVIDUALS

(71) Applicant: Wrap Media, LLC, San Francisco, CA (US)

(72) Inventors: Eric H. Greenberg, Ross, CA (US); John M. Garris, San Francisco, CA (US); Jared L. Ficklin, Austin, TX (US); Mark E. Rolston, Austin, TX (US); Kunal K. Bhasin, San Francisco, CA (US)

(73) Assignee: Wrap Media, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/239,052

(22) Filed: Aug. 17, 2016

(65) Prior Publication Data

US 2016/0357726 A1    Dec. 8, 2016

Related U.S. Application Data

(63) Continuation of application No. 14/816,662, filed on Aug. 3, 2015, which is a continuation of application
(Continued)

(51) Int. Cl.
*G06F 3/14* (2006.01)
*G06F 17/24* (2006.01)
(Continued)

(52) U.S. Cl.
CPC .......... *G06F 17/248* (2013.01); *G06F 3/0484* (2013.01); *G06F 3/0485* (2013.01);
(Continued)

(58) Field of Classification Search
CPC .. G06F 17/212; G06F 17/248; G06F 17/2247; G06F 17/30896; G06F 3/0482;
(Continued)

(56) References Cited

U.S. PATENT DOCUMENTS 6,321,244 B1    11/2001 Liu et al.
9,275,403 B2 *   3/2016 Pedregal ............ G06Q 30/0282
(Continued)

FOREIGN PATENT DOCUMENTS

EP         1239389         9/2002

OTHER PUBLICATIONS

Sarah Sluis, "Harper's Bazaar Pursues Shoppable Ads With Streamwize", http://adexchanger.com/publishers/harpers-bazaar-pursues-shoppable-ads-with-streamwize/, Jul. 24, 2014, downloaded on May 22, 2015.
(Continued)

*Primary Examiner* — Scott Baderman
*Assistant Examiner* — Hassan Mrabi
(74) *Attorney, Agent, or Firm* — Beyer Law Group LLP

(57) ABSTRACT

A method for using analytics to define and deliver wrap packages of cards with insight content. The method includes the steps of generating insight content by applying analytics to a set of data, inserting or associating the insight content into one or more content component container(s) included in a set of cards of a wrap package, and generating a wrap descriptor for the wrap package.

26 Claims, 68 Drawing Sheets

Related U.S. Application Data

No. 14/747,436, filed on Jun. 23, 2016, now abandoned.

(60) Provisional application No. 62/062,056, filed on Oct. 9, 2014, provisional application No. 62/062,061, filed on Oct. 9, 2014, provisional application No. 62/084,171, filed on Nov. 25, 2014, provisional application No. 62/091,866, filed on Dec. 15, 2014, provisional application No. 62/114,675, filed on Feb. 11, 2015, provisional application No. 62/133,574, filed on Mar. 16, 2015, provisional application No. 62/144,139, filed on Apr. 7, 2015, provisional application No. 62/170,438, filed on Jun. 3, 2015, provisional application No. 62/170,569, filed on Jun. 3, 2015.

(51) Int. Cl.

| | | |
|---|---|---|
| *G06F 17/21* | (2006.01) | |
| *G06F 17/22* | (2006.01) | |
| *G06Q 30/06* | (2012.01) | |
| *H04L 29/08* | (2006.01) | |
| *G06F 3/0484* | (2013.01) | |
| *G06F 3/0485* | (2013.01) | |
| *G06F 17/30* | (2006.01) | |
| *G06Q 30/02* | (2012.01) | |
| *H04W 4/02* | (2009.01) | |
| *H04W 40/24* | (2009.01) | |

(52) U.S. Cl.
CPC ........ *G06F 3/04842* (2013.01); *G06F 17/211* (2013.01); *G06F 17/212* (2013.01); *G06F 17/2247* (2013.01); *G06F 17/30528* (2013.01); *G06F 17/30598* (2013.01); *G06F 17/30601* (2013.01); *G06Q 30/0276* (2013.01); *G06Q 30/0635* (2013.01); *G06Q 30/0643* (2013.01); *H04L 67/02* (2013.01); *H04W 4/021* (2013.01); *H04W 4/025* (2013.01); *H04W 40/244* (2013.01)

(58) Field of Classification Search
CPC ..... G06F 3/0485; G06F 3/0488; H04L 67/02; G06Q 30/0635; G06Q 30/0643
USPC ......................... 715/201, 202, 244, 243, 764
See application file for complete search history.

(56) References Cited

U.S. PATENT DOCUMENTS

| | | |
|---|---|---|
| 9,285,977 B1 | 3/2016 | Greenberg et al. |
| 9,330,192 B1 | 5/2016 | Greenberg et al. |
| 2005/0228824 A1 | 10/2005 | Gattuso et al. |
| 2005/0245241 A1 | 11/2005 | Durand et al. |
| 2006/0056433 A1 | 3/2006 | Herrmann |
| 2006/0123089 A1 | 6/2006 | Cahn et al. |
| 2008/0040673 A1 | 2/2008 | Zuckerberg et al. |
| 2010/0070876 A1 | 3/2010 | Jain et al. |
| 2010/0121567 A1 | 5/2010 | Mendelson |
| 2011/0060993 A1* | 3/2011 | Cotter ............... H04N 21/2743 715/720 |
| 2012/0054596 A1 | 3/2012 | Kroger et al. |
| 2012/0131427 A1 | 5/2012 | Artin |
| 2012/0278704 A1 | 11/2012 | Ying et al. |
| 2013/0021377 A1 | 1/2013 | Doll |
| 2013/0024757 A1 | 1/2013 | Doll et al. |
| 2013/0097186 A1 | 4/2013 | Van Hoff |
| 2013/0111395 A1 | 5/2013 | Ying et al. |
| 2013/0179761 A1* | 7/2013 | Cho ....................... G06F 17/21 715/202 |
| 2013/0219255 A1 | 8/2013 | Van Hoff et al. |
| 2014/0074624 A1 | 3/2014 | Ying et al. |
| 2014/0074863 A1 | 3/2014 | Walkingshaw et al. |
| 2014/0074934 A1 | 3/2014 | Van Hoff et al. |
| 2014/0075275 A1 | 3/2014 | Aleksandrovsky et al. |
| 2014/0075289 A1 | 3/2014 | Brant |
| 2014/0075339 A1 | 3/2014 | Weskamp et al. |
| 2014/0087760 A1 | 3/2014 | Bennett |
| 2014/0096014 A1 | 4/2014 | Johnson et al. |
| 2014/0198127 A1 | 7/2014 | Ying |
| 2014/0245128 A9 | 8/2014 | Brant |
| 2014/0320535 A1 | 10/2014 | Ying |
| 2014/0351268 A1 | 11/2014 | Weskamp et al. |
| 2015/0100587 A1 | 4/2015 | Walkingshaw et al. |
| 2015/0120767 A1* | 4/2015 | Skeen ............... G06F 17/30752 707/754 |
| 2016/0063580 A1* | 3/2016 | Greenberg ......... G06Q 30/0282 705/347 |
| 2016/0103565 A1 | 4/2016 | Greenberg et al. |
| 2016/0103794 A1 | 4/2016 | Greenberg et al. |
| 2016/0103795 A1 | 4/2016 | Greenberg et al. |
| 2016/0103805 A1 | 4/2016 | Greenberg et al. |
| 2016/0103904 A1 | 4/2016 | Greenberg et al. |
| 2016/0103926 A1 | 4/2016 | Greenberg et al. |
| 2016/0104211 A1 | 4/2016 | Greenberg et al. |
| 2016/0105771 A1 | 4/2016 | Bhasin et al. |
| 2016/0124924 A1 | 5/2016 | Greenberg et al. |
| 2016/0196244 A1 | 7/2016 | Greenberg et al. |

OTHER PUBLICATIONS

Paul Adams, "The End of Apps as We Know Them", https://blog.intercom.io/the-end-of-apps-as-we-know-them/, published around Nov. 2014, downloaded on May 22, 2015.

Paul Adams, "Why Cards are the Future of the Web", https://blog.intercom.io/why-cards-are-the-future-of-the-web/, published around Sep. 2013, downloaded on May 22, 2015.

Allison Schiff, "Sharethrough Brings Its Version of Twitter Cards to the Masses", http://adexchanger.com/native-advertising-2/sharethrough-brings-its-version-of-twitter-cards-to-the-masses/, Dec. 17, 2014, downloaded on May 26, 2015.

Sarah Perez, "Storytelling App Steller Becomes More of a Social Network", http://techcrunch.com/2014/08/21/storytelling-app-steller-becomes-more-of-a-social-network/, Aug. 21, 2014, downloaded on May 26, 2015.

Kaylene Hong, "Steller is a Beautiful Visual Storytelling App, Similar to Storehouse, but for Your iPhone Instead", http://thenextweb.com/apps/2014/03/13/steller-is-a-beautiful-visual-storytelling-app-similar-to-storehouse-but-for-your-iphone-instead/, Mar. 13, 2014, downloaded on May 27, 2015.

Jayanth Prathipati, "Why Do All Mobile Roads Lead Back to the Palm Pre?", http://thetechblock.com/mobile-roads-lead-back-palm-pre/, published on Jun. 11, 2014, downloaded on May 27, 2015.

Pictela, "Introduction to Pictela", http://www.pictela.com/docs/getting-started/introduction-to-pictela, from Wayback Machine indicating Wayback retrieval date of Mar. 18, 2015, downloaded on Jun. 5, 2015. (Pictela_Intro).

Pictela, https://web.archive.org/web/20130908132533/http://www.pictela.com/formats, from Wayback Machine indicating Wayback retrieval date of Sep. 8, 2013, downloaded on Jun. 5, 2015. (Pictela_Formats).

Twitter, https://web.archive.org/web/20150324121730/https://dev.twitter.com/cards/getting-started, from Wayback Machine indicating Wayback retrieval date of Mar. 24, 2015, downloaded on Jun. 5, 2015. (Twitter_Getting_Started).

Twitter, https://web.archive.org/web/20140929154946/https://dev.twitter.com/cards/overview, from Wayback Machine indicating Wayback retrieval date of Sep. 29, 2014, downloaded on Jun. 5, 2015. (Twitter_Overview).

Max Bulger, "Why Cards?", http://blog.trywildcard.com/post/93983166893/why-cards, published on Aug. 6, 2014, downloaded on May 26, 2015.

Streamwize, http://www.streamwize.com, downloaded on May 22, 2015. (Streamwise).

(56) References Cited

OTHER PUBLICATIONS

Streamwize, https://web.archive.org/web/20141222085204/http://www.streamwize.com/#introduction, from Wayback Machine indicating Wayback retrieval date of Dec. 22, 2014, downloaded on Jun. 5, 2015. (Streamwize V2).
Steller, "Everyone has a story to tell. Tell yours with photos, videos and texts", https://steller.co, from Wayback Machine indicating Wayback retrieval date of Apr. 5, 2014, downloaded on Jun. 5, 2015.
Max Bulger, "Introducing the Wildcard iOS SDK", http://blog.trywildcard.com/, Feb. 23, 2015, downloaded on May 26, 2015.
Wildcard, http://www.trywildcard.com/, from Wayback Machine indicating Wayback retrieval date of Feb. 8, 2014, downloaded on Jun. 5, 2015. (WC_homepage).
Wildcard, https://web.archive.org/web/20141115090135/http://www.trywildcard.com/docs/intro, from Wayback Machine indicating Wayback retrieval date of Nov. 15, 2014, downloaded on Jun. 5, 2015. (intro V1).
Wildcard, https://web.archive.org/web/20150321155952/http://www.trywildcard.com/docs/intro, from Wayback Machine indicating Wayback retrieval date of Mar. 21, 2015, downloaded on Jun. 5, 2015. (intro V2).
Wildcard, https://web.archive.org/web/20141115171158/http://www.trywildcard.com/docs/overview, from Wayback Machine indicating Wayback retrieval date of Nov. 15, 2014, downloaded on Jun. 5, 2015. (arch Overview V1).
Wildcard, https://web.archive.org/web/20150321162417/http://www.trywildcard.com/docs/overview, from Wayback Machine indicating Wayback retrieval date of Mar. 21, 2015, downloaded on Jun. 5, 2015. (arch overview V2).
Wildcard, https://web.archive.org/web/20150520042344/http://www.trywildcard.com/docs/overview/, from Wayback Machine indicating Wayback retrieval date of May 20, 2015, downloaded on Jun. 5, 2015. (arch overview V3).
Wildcard, https://web.archive.org/web/20141115090625/http://www.trywildcard.com/docs/sdk/quickstart_sdk, from Wayback Machine indicating Wayback retrieval date of Nov. 15, 2014, downloaded on Jun. 5, 2015. (SDK_QS_V1).
Wildcard, https://web.archive.org/web/20150321172000/http://www.trywildcard.com/docs/sdk/quickstart_sdk, from Wayback Machine indicating Wayback retrieval date of Mar. 21, 2015, downloaded on Jun. 5, 2015. (SDK_QS_V2).
Wildcard, https://web.archive.org/web/20141115090143/http://www.trywildcard.com/docs/sdk/java_sdk, from Wayback Machine indicating Wayback retrieval date of Nov. 15, 2014, downloaded on Jun. 5, 2015. (WC_Java_V1).
Wildcard, https://web.archive.org/web/20150321184716/http://www.trywildcard.com/docs/sdk/java_sdk, from Wayback Machine indicating Wayback retrieval date of Mar. 21, 2015, downloaded on Jun. 5, 2015. (WC_Java_V2).
Wildcard, https://web.archive.org/web/20141115090150/http://www.trywildcard.com/docs/sdk/ruby_sdk, from Wayback Machine indicating Wayback retrieval date of Nov. 15, 2014, downloaded on Jun. 5, 2015. (WC_Ruby_V2).
Wildcard, https://web.archive.org/web/20150321180400/http://www.trywildcard.com/docs/sdk/ruby_sdk, from Wayback Machine indicating Wayback retrieval date of Mar. 21, 2015, downloaded on Jun. 5, 2015. (WC_Ruby).
Wildcard, https://web.archive.org/web/20141115090647/http://www.trywildcard.com/partners, from Wayback Machine indicating Wayback retrieval date of Nov. 15, 2014, downloaded on Jun. 5, 2015. (WC_Partners_V1).
Wildcard, https://web.archive.org/web/20150315070647/http://www.trywildcard.com/partners, from Wayback Machine indicating Wayback retrieval date of Mar. 15, 2015, downloaded on Jun. 5, 2015. (WC_Partners_V2).
Wildcard, https://web.archive.org/web/20141126020058/http://www.trywildcard.com/docs/faq/, from Wayback Machine indicating Wayback retrieval date of Nov. 26, 2014, downloaded on Jun. 5, 2015. (FAQ_V1).
Wildcard, https://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_IOS_Tutorials_V1).
Wildcard, https://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_IOS_Sample_Projects_V1).
Wildcard, https://web.archive.org/web/20141115171308/http://www.trywildcard.com/docs/schema, from Wayback Machine indicating Wayback retrieval date of Nov. 15, 2014, downloaded on Jun. 5, 2015. (WC_Card_Schema_V1).
Wildcard, https://web.archive.org/web/20150518060819/http://www.trywildcard.com/docs/schema, from Wayback Machine indicating Wayback retrieval date of May 18, 2015, downloaded on Jun. 5, 2015. (WC_Card_Schema_V2).
Wildcard, http://www.trywildcard.com/docs/faq#shopify, not available on Wayback Machine, downloaded on Jun. 5, 2015. (WC_FAQ_V2).
Jacqueline Thomas, A Serious Look at Card Based Design, [retrieved on Nov. 17, 2015].Retrieved from the internet: http://webdesignledger.com/card-based-design.Jun. 12, 2014.
International Search Report dated Dec. 16, 2015 from International Application No. PCT/US2015/047976.
Written Opinion dated Dec. 16, 2015 from International Application No. PCT/US2015/047976.
Hypercard.org, http://web.archive.org/web/20121114055910/http://hypercard.org/hypercard_file_format.php, from Wayback Machine indicating Wayback retrieval date of Nov. 14, 2012, downloaded on Jun. 13, 2016.
Vito Tardia, "Building ePub with PHP and Markdown", https://www.sitepoint.com/building-epub-with-php-and-markdown/, Mar. 1, 2013.
Siegman et al., "Epub Zero, A Collection of Interesting Ideas", https://dauwhe.github.io/epub-zero/#compare, Sep. 28, 2015.
Gylling et al., "EPUB 3 Fixed-Layout Documents", http://www.idpf.org/epub/fxl/#dimensions, International Digital Publishing Forum, 2012.
Adobe InDesign CC, "How to Design Fixed Layout EPUB", https://web.archive.org/web/20140626152711/https://helpx.adobe.com/indesign/how-to/ebook-fixed-layout.html, from Wayback Machine indicating Wayback retrieval date of Jun. 26, 2014, downloaded on Sep. 13, 2016.
Gardeur et al., "Collection + JSON vs collection in EPUB", https://groups.google.com/forum/#!topic/epub-working-group/2aK4-jezWNE, Apr. 18, 2016.
Greenberg et al., U.S. Appl. No. 15/239,060, filed Aug. 17, 2016.
Greenberg et al., U.S. Appl. No. 15/240,556, filed Aug. 18, 2016.
Thompson, "Beacon Design Paradigms: TabViews and Cards," Feb. 25, 2014.
Mbience, "eM Card," http://embience.com/frameworks/em-cards/.
Thomas, "A Serious Look at Card Based Design," https://webdesignledger.com/card-based-design/, Jun. 12, 2014.
Twitter, "Twitter Cards", available at https://web.archive.org/web/20140912160742/https://dev.twitter.com/cards/overview.
Scott, "Twitter Card Tutorial," Dec. 13, 2013, available at https://www.youtube.com/watch?v=OjgksJFH9Dg.

\* cited by examiner

| CARD | | |
|---|---|---|
| DESIGN QUALITY | TEMPLATE BASED AUTHORING | AUTHORING TOOL THAT ENABLES THE CREATION OF BEAUTIFUL CARDS |
| | BEAUTIFUL, WELL DESIGNED TEMPLATES | |
| FUNCTION | A DIVERSE COMPONENT LIBRARY | AUTHORING OBJECTS THAT EXPOSE DEEP FUNCTIONALITY IN EASILY USABLE MODULES |
| | POWERFUL AND EXTENSIBLE MODULES | |
| INTEGRATION | STRUCTURED DATA INTEGRATORS | CONNECTORS THAT INPUT AND OUTPUT DATA TO AND FROM OTHER SYSTEMS |
| | UNSTRUCTURED DATA GATHERERS | |

FIG. 2

AUTHORING AND DELIVERING WRAP PACKAGES OF CARDS WITH CUSTOM CONTENT TO TARGET INDIVIDUALS

CROSS REFERENCE TO RELATED APPLICATIONS

This application is a Continuation of U.S. patent application Ser. No. 14/816,662 (P020C1), filed Aug. 3, 2015. U.S. patent application Ser. No. 14/816,662 (P020C1) is a Continuation of U.S. patent application Ser. No. 14/747,436 (P020), filed on Jun. 23, 2015. U.S. patent application Ser. No. 14/816,662 also claims the benefit of U.S. Provisional Patent Application No. 62/062,056 (P001P) and 62/062,061 (P002P), both filed on Oct. 9, 2014 and both entitled "Wrapped Packages of Cards for Conveying a Narrative With Media Content, Providing Application Functionality, and Engaging Users in E-Commerce". U.S. patent application Ser. No. 14/816,662 further claims priority of U.S. Provisional Patent Application No. 62/084,171 (P005P), filed Nov. 25, 2014; 62/091,866 (P005P2), filed Dec. 15, 2014; 62/114,675 (P005P3), filed Feb. 11, 2015, and 62/133,574 (P005P4) filed Mar. 16, 2015, each entitled "Card Based Package for Distributing Electronic Media and Services. U.S. patent application Ser. No. 14/816,662 also claims the benefit of U.S. Provisional Application No. 62/144,139 (P016P), entitled "Authoring Tool for Creating Wrap Packages", filed Apr. 7, 2015; U.S. Provisional Application No. 62/170,438 (P016P2), entitled "Authoring Tool for the Authoring of Wrap Packages of Cards", filed Jun. 3, 2015 and U.S. Provisional Application No. 62/170,569 (P018P), entitled "Integration of Social Media with Card Packages", filed Jun. 3, 2015. All of the above-referenced applications are incorporated herein by reference for all purposes.

BACKGROUND

This invention relates to authoring and delivering wrap packages of cards, and more particularly, to using analytics to define custom content to be included in a wrap package of cards prior to delivery.

The above-listed non-prior art related applications describe a new media content type, referred to as "wrap packages". The terms "wrap" or "package" are interchangeably used herein to refer to wrap packages.

A wrap package is a collection of cards that are each selectively authored to include (i) one or more types of media content such as text, images, photos, video, etc., (ii) application functionality and/or (iii) e-commerce related services. The cards in a wrap are also typically authored to define one or more linear sequence(s) when consumed. With wrap packages, an author thus has the ability to select media content, combined with application-like and website functionality, and combine them all into an elegant, card-based, narrative. As a result, the author can create compelling stories using media, interwoven with interactive functionality and/or e-commerce services. Wrap packages are, therefore, ideal, but not necessarily limited to, delivering a unique, interactive, "book-like", experience over the mobile web, which previously has been not possible.

The cards of wrap packages are navigation metaphors. Each card can be authored to group related information that can be easily consumed within a user interface experience by swipe (or other simple gesture) navigation from card-to-card.

Cards have a visual representation intended to evoke similarities to their physical counterparts. They have a fixed portrait aspect ratio that makes them ideally suited to current mobile computing devices as well as easy to scale up to and arrange to fit other display form factors, such as provided on laptop and desktop computers as well as smart TVs. The physical card metaphor can also extend to the interactive behavior of cards in a wrap, as the user can use gestures that evoke the "flipping" of cards in a deck or bound booklet to navigate between them.

In addition, each card in a wrap has defined content that is displayed in a predefined layout. In general, the cards in a wrap have the same size and aspect ratio. The aspect ratio is preferably device independent and is preferably maintained regardless of device orientation and/or display window size.

Cards are like containers for holding and distributing media content, such as text, images, photos, audio, video and the like. In addition, cards may also contain or hold executable objects that provide or enable real-time features, such as application functionality (i.e., the ability to schedule appointments, engage in online chats or conversations) and support e-commerce related services (i.e., the ability to purchase goods and/or services). The multimedia content and/or interactive services contained by any given card can be determined entirely in advance or as late as the moment the wrap is consumed by the end-user. Such media content and executable objects are sometimes referred to herein as card "assets."

Cards, however, can differ from their physical counterparts in ways that provide for unique presentations of content or the aforementioned application functionality and/or e-commerce services. For example, a gallery card provides the ability to present an expanded amount of content in a vertically stacked orientation such that the overall length (i.e., the number of cards or in a horizontal sequence) of the wrap is not affected by the amount of content in the wrap. This aids in navigation since the user can flip to the previous or next card regardless of their current position in the gallery.

Wrap packages are delivered and rendered in a browser as a sharable and savable message. Wrap packages thus provides an app-like user experience that is delivered as a live, interactive, message from a cloud-based platform, using for example, the Software as a Service (SaaS) model. A wrap is thus a portable container of multimedia content, and interactive services, designed for ease of delivery, exchange, and consumption.

Wrap packages are also consumable anywhere, meaning they have the ability to be resolved and displayed on just about any type of device (mobile phones, laptops, tablets, wearable computing devices such as smart watches, desktop computers, smart TVs, etc.), regardless of the platform (e.g., iOS, Android, Microsoft, etc.). Wrap packages are thus platform and device independent. Wraps do not have to be written for any specific platform, such as iOS or Android, or for any specific device or class of devices (e.g. smart phones, tablets, desktops, etc.).

Wrap packages are thus a mobile-first marketing and commerce platform that ideally provides a beautiful world of storytelling in bite-size moments that get and hold attention. In addition, the unique characteristics of (i) authoring once and running on almost any device, regardless of the operating system or the type and (ii) the ability to easily distribute wrap packages similar to messages, together are a powerful construct that potentially can make the use of wrap packages near universal.

By creating wrap packages, businesses and other organizations can simply and cheaply create, distribute, and manage storytelling mobile web user experiences, app like functionality and e-commerce, all in the context of wrap packages delivered directly to consumers. Where businesses used to have to build destinations (websites) or use monolithic systems (apps), they can now provide consumers, particularly mobile device users, with a user experience that delivers the content they want combined with a complementary palette of functions and/or e-commerce related services.

Wrap packages thus solves a number of current problem with the mobile web. Unlike web sites, wrap packages are easy to consume on mobile devices and offer the opportunity to create compelling narratives and user experiences. In addition, the ability to incorporate app-like functionality into wraps provides a multi-function app-like experience, without having to develop an app, be in an app, download an app, or open several apps.

The uniqueness of wrap packages creates opportunities for business and other organizations alike to innovate and improve marketing efforts, customer support, and user experiences in ways previously not possible, because an enabling interface and platform did not exist. Wrap packages can thus potentially define the next generation interactive web paradigm, particularly for mobile, although for desktop and other types of devices as well.

Data analytics is the science of examining raw data for the purpose of discovering insights, conclusions and/or meaningful patterns. Analytics typically relies on the simultaneous application of statistics, computer programming and operations research to quantify some desired measure of performance. In many industries, data analytics is used to allow companies and organization to make better business decisions. For example, many businesses and organizations commonly apply analytics to business data, to describe, predict, and improve business performance. Specific areas within analytics include predictive analytics, enterprise decision management, retail analytics, store assortment and stock-keeping unit optimization, market optimization, market mix modeling, and web analytics, sales force sizing and optimization, price and promotion modeling, predictive science, credit risk analysis and fraud analytics.

In the above-mentioned non-prior art U.S. Provisional Application No. 62/170,438, an authoring tool for the authoring of wrap packages is described. With this tool, one or more authors can manually create wrap packages. During the course of one or more authoring sessions, author(s) may author a set of cards of a wrap package by (a) selecting a card type among a plurality of different card types, (b) selecting a card template from one or more card templates of the selected card type, (c) authoring a new card by copying and modifying the selected card template of the selected card type, (d) repeating steps (a) through (c) for authoring a plurality of cards of the wrap package and (f) defining one or more sequence order(s) for rendering the plurality of cards in the wrap package.

Although the above-referenced authoring tool is a powerful tool that enables the creation of beautiful, graphic-intensive wrap packages with embedded application functionality and/or e-commerce services, the process is labor intensive since the authoring is manual. The authoring tool thus has limited application in certain circumstances, such as in situations where it is desirable to create and distribute a large number of wrap packages, each with custom content. A system and method for automatically authoring and delivering wrap packages of cards with custom content to target individuals is therefore needed.

SUMMARY

The present invention is directed to a method for authoring and delivering wrap packages of cards with custom content to target individuals. The method involves (a) authoring a set of cards of a wrap package without custom content, (b) predefining the custom content to be included in the set of cards of the wrap package, (c) ascertaining if a predefined trigger event has occurred, (d) inserting the custom content into the set of cards of the wrap package when the trigger event occurs, and (e) distributing the wrap package to a target individual after the trigger event occurs, the distributed wrap package including the custom content in the set of cards.

In a non-exclusive embodiment, authoring the set of cards of the wrap package without custom content includes the steps of defining one or more empty component(s) in the set of cards of the wrap package and defining one or more content type(s) for insertion into the one or more empty component(s) in the set of cards of the wrap package respectively.

In yet another non-exclusive embodiment, analytics can be used to generate the custom content inserted into the empty components of the wrap package.

BRIEF DESCRIPTION OF THE DRAWINGS

The invention and the advantages thereof, may best be understood by reference to the following description taken in conjunction with the accompanying drawings in which:

FIG. 2 is a diagram depicting the design, functionality and data integration capabilities of a representative card in a digital companion wrap package according to the principles of the present invention.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

The cards of the wrap packages are ideally authored in one or more linear sequences so that a book-like narrative unfolds, not only through the cards themselves, but also by the transition between the cards, as they are sequentially browsed. In addition, the wrap packages are portable objects that may exist within a social feed or within a custom application. Wrap packages are also readily distributed, similar to electronic messages, through e-mail, messaging, social-media, or via a variety of other electronic communication platforms. As a result, wrap packages are consumable, sharable and savable objects. As the cards are browsed in the one or more linear sequences during consumption, the user experiences the unfolding of the authored narrative, including the defined media content interwoven with the complementary application functionality and/or e-commerce related services. As a result, the entire user experience including any application functionality and/or e-commerce related services is substantially contained within the context of the wrap package itself, typically (but not necessarily) without the need to navigate to other sites.

Figure 1:
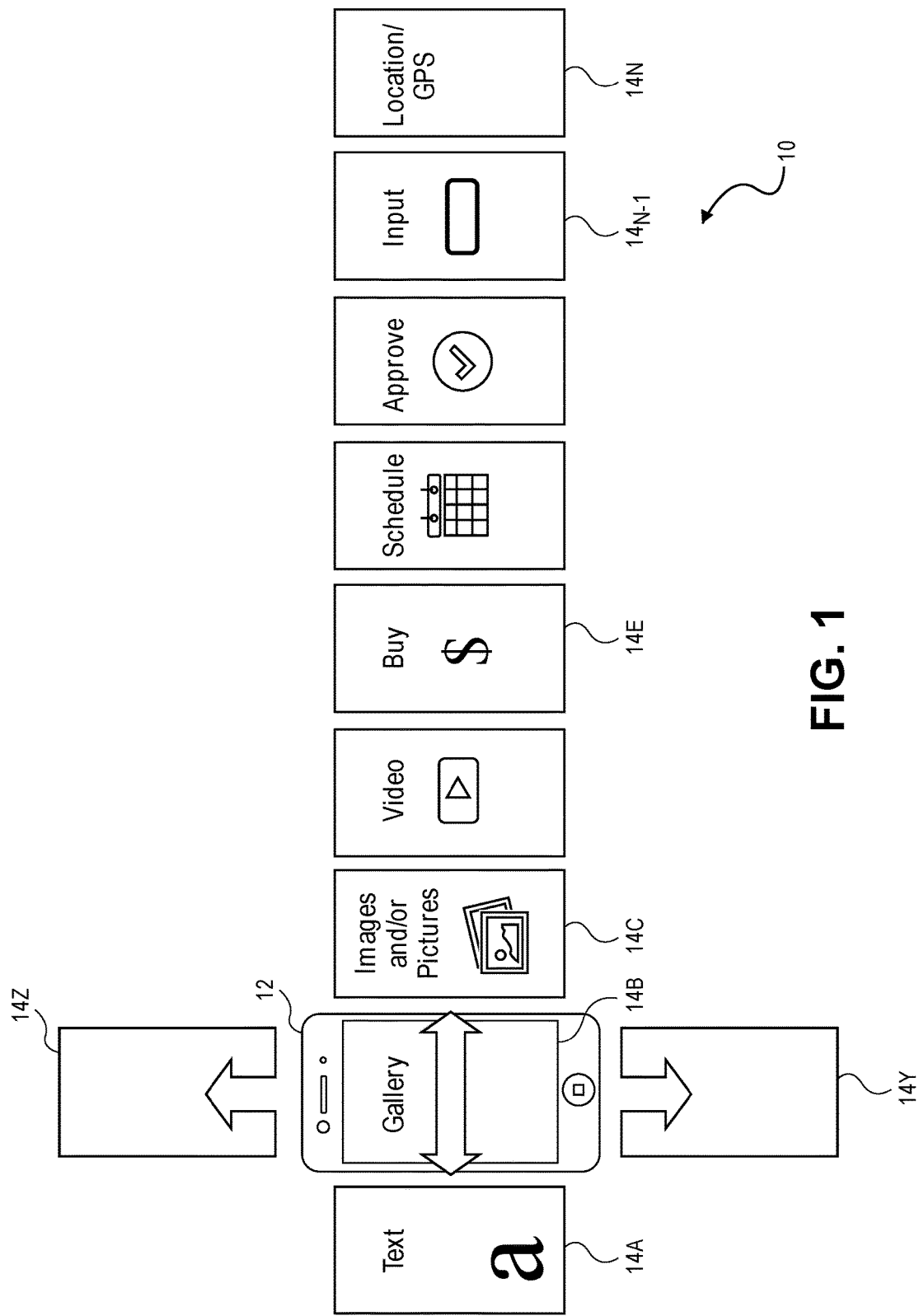
FIG. 1 is a diagram illustrating a wrap package layout that includes a plurality of cards threaded together so as to be viewable in linear arrays in accordance with the principles of the present invention.

Referring to FIG. 1, a diagram of a non-exclusive embodiment of a wrap package 10 viewable on a computing device 12 is illustrated. The wrap package 10 includes a plurality of cards 14 that are threaded together so as to enable browsing by swiping in one or more linear sequences. Any of the cards 14 may optionally include various types of media, such as text, images or photos, audio, video, a live or streaming feed of media, 3-D objects, or content from other wrap packages (not illustrated). Any of the cards 14 may also optionally provide application functionality, such as the ability to receive input data or display dynamically generated data, a calendar for scheduling or booking appointments or making reservations for goods and/or services, location/GPS, etc. In addition, any of the cards 14 may optionally provide or support e-commerce services, such as the ability to browse products in a catalog, communicate with an online sales representative, and/or purchase product(s).

By way of example, in the schematically illustrated wrap package 10, card $14_A$ includes text, card $14_B$ presents a gallery, card $14_C$ includes images or pictures, card $14_D$ includes a video, card $14_E$ includes e-commerce related service(s), card $14_F$ includes a calendar function for scheduling appointments and/or booking reservations, card $14_G$ includes a user approval function, $14_{n-1}$ includes a data entry function, card $14_N$ includes location or GPS services, etc.

On computing devices with touch sensitive screens, the cards 14 of wrap packages 10 can be navigated linearly by swiping or by using other suitable interfaces, such as a stylus or pen. In devices without a touch sensitive screen, alternative user interfaces are provided to facilitate transition (e.g., flipping) from one card to the next. In the context of the present application, the terms "swipe-browsing" or "swiping" is intended to mean the navigation from one card to an adjacent next card. With devices with touch sensitive screens, swipe browsing is typically implemented by the sliding of a finger or other input device across the display. With devices without touch-sensitive screens, other navigation tools such as a mouse, keyboard or remote control, can be used for swipe browsing. When a swipe is performed, the content of the next card in the sequence is displayed. For example, by swiping either right to left or vice versa, the next card, depending on the swipe direction, in the horizontal sequence is displayed. Similarly, by swiping up and/or down, the next card in either the up or down sequence is displayed. Thus, the user experience when consuming a wrap package is the wrap package itself (as opposed to a remote web site for example), viewable via a swipe-able interface.

Additionally, some cards may also include one or more embedded link(s) that, when selected, enable navigation to either a non-adjacent card not in linear sequence or to another wrap package, a web page or some other location entirely outside of the wrap package.

It should be noted that the particular layout of cards 14 in the wrap package 10 illustrated in FIG. 1 is merely illustrative. Both the number of rows and/or columns, and the number of sequential cards 14 within any given row or column, may vary widely as appropriate to deliver the desired user experience, narrative, content, functionality and services of the wrap package 10.

With gallery cards, such as card $14_B$ of FIG. 1, swiping allows for the scrolling through of the contents of a card 14, which are typically too voluminous to be displayed within the size of a fixed screen display, such as that provided on a mobile phone. In an illustrative example, a particular wrap package 10 may include a plurality of cards organized in a horizontal sequence. By swiping right to left or vice versa, the next card 14 or the previous card 14 in the horizontal sequence is displayed. In the vertical direction, however, one or more selected cards $14_B$ may be configured in the gallery format, allowing the viewer to scroll up or down by swiping through media content of the gallery. In an illustrative but non-exclusive example, a wrap package 10 authored and distributed by a car rental business may include a horizontal sequence of cards 10, each dedicated to a category of information pertinent to a traveler (i.e., cards dedicated to local hotels, restaurants, local tourist attractions respectively). By swiping up or down for a given card, relevant material within each category is displayed in a gallery format. For instance by swiping up or down the hotel card (not illustrated), a gallery of a number of local hotels is displayed. In variations of the gallery card format, the behavior invoked by an up or down swipe may differ. For example, swiping up or down my result in a continuous "rolling" of the content of the gallery card. In other embodiments, an up or down swipe may result in a "snap" action with the next item of content appearing after the snap, for example, as illustrated as cards 14Y and 14Z in FIG. 1.

The wrap package 10 is identified, as described in more detail below, through the use of a unique identifier (wrap ID 42) assigned to the package 10. By way of example, the wrap ID 42 may take the form of a Uniform Resource Identifier (URL). As such, the wrap ID may thus be provided as a link, which can readily be used to effectively send or retrieve the wrap package. That is, the wrap package may effectively be "sent" to a potential viewer as a link using any of the wide variety of mechanism that can currently—or in the future—be used to send a link or convey the URL. By way of example, this may include e-mail messages, text messages, SMS messages, via a Twitter tweet, as a post on social media such as Facebook, etc., discussion forums, walls or the like, as a link embedded in a document, an image, or a web page or any other media type, in a blog or micro blog (e.g. Tumblr), or any other messaging or electronic content distribution mechanism or communication platform currently known or developed in the future.

Wrap packages are therefore significantly different and more powerful than web sites. For example with wrap packages, they can be consumed "on the spot" where it is located (i.e., when delivered to a mobile device for example). In contrast with the selection of a banner ad appearing within a web site, where the viewer is taken to a new web page that is not (a) necessarily designed for mobile devices and (b) is self navigating, making it very difficult for a narrative to be conveyed. As a result, the user experience, particularly on mobile devices, may be very poor. Hence, the friction of providing a compelling user experience with wrap packages is far less than with a web site.

The cards 14 of a wrap 10 can be displayed on the screen of virtually any type of computing device. It should be appreciated that the card metaphor is particularly well suited for use on mobile devices such as smart phones, tablet computers, etc., which makes the format particularly powerful for authors interested in developing content tailored for mobile devices. By delivering wrap packages 10 to mobile devices, users and potential customers can be won over at their point of intimacy, where they spend their time and consciousness. Wrap packages thus allow authors, merchants and other content providers to create compelling narratives and provide ongoing application functionality and/or e-commerce support directly delivered anytime and anywhere to users, transforming their mobile devices into a powerful business tool that enhances mobile engagement and relationships. As a result, higher customer satisfaction, better brand engagement, and a higher conversion (i.e., click-through rates) and repeat e-commerce related activity compared to other forms of after sale promotions and merchandising will likely result.

Referring to FIG. 2, a diagram depicting the design, functionality and data integration capabilities of a representative card 14 in a wrap package 10 is shown.

By using card templates, authoring tools and media collaboration tools, beautiful, content-rich, cards 14 may be created either by automation or by individuals with even minimal design skills and experience. As such, the author, either a person or an automated process, has the ability to easily create beautiful content-rich cards 14 that can selectively include text, images, photos, and other media similar to PDF files, but optionally, with the added benefit of additional application functionality and/or e-commerce related services, either embedded in the same card 14, or other cards 14, in the wrap package 10. In the automated authoring embodiments, the content of a card 14 can be populated by a data processing system that automatically uploads predefined content into various defined fields of a card template.

By authoring (i) the horizontal and/or vertical sequence order for swipe-browsing the cards 14, (ii) the media content in each card 14, (iii) application functionality and/or (iv) the e-commerce services for each card 14, it is possible to author Wrap packages 10 that are content-rich, highly interactive, and that define a palette of services, functions and experiences related to the wrap package 10, all within the context of a story book-like narrative that unfolds as the cards 14 are browsed in their sequence order(s).

In addition, the use of component libraries and the authoring tools allow for the authoring of cards 14 with a diverse, easy to use, reusable, set of component modules that provide a wide variety of application functions and e-commerce services. Such application functions include, but are not limited to, for example, calendar functions, scheduling of an appointment functions, reserving or booking goods and/or services, such as a car rental, hotel room, or table at a restaurant, map or GPS related functions, support for online conversations, streaming live video or other media feeds, etc. In addition, e-commerce related services include displaying product and/or service offerings, displaying user account information, engaging a sales representative in an online chat session, and enabling the purchase of goods and/or services, etc. These card services or "plugins" are all part of an ecosystem supported by a Wrap run-time engine viewer (described in more detail below), which allows the various plug-in services to all communicate and inter-operate together. For example, a calendar plugin could be configured to communicate with a reservation booking database plugin, which could communicate with a chat plugin. The communication among the various plug-in services is accomplished through a common set of APIs. As a result, the interactivity, functionality and usefulness of wrap packages 10 are significantly enhanced by such an ecosystem of connected plug-in services.

Finally, the integration capabilities of cards 14 enable the bi-directional flow of data from users browsing a wrap package 10 to other cards 14 in the same wrap package 10, to another wrap package 10, or a remote data processing system. For example, a card 14 can be integrated with the back end software system for a large online retailer, which will automatically populate the content of a card 14 with product images, user account information, prior purchase information, and a host of other user-related information. Alternatively, a card 14 can be used to capture data input from a user and provide it to a retailer's back end e-commerce software system. For example, a card 14 may display a one-click "Buy Now" function for a displayed item. When the Buy Now function is selected, previously saved user account information is automatically delivered to the back end software system of the online merchant, which then processes the information to complete the transaction.

The data entered by the user and/or the data presented via a card 14 of a wrap package 10 may thus be integrated with the back-end database, cloud computing services, web sites, etc., regardless if managed by an author and/or distributor of the wrap package or by a third party. The data processing for the purchase of goods and/or services, appointments, and/or other application functionality and e-commerce related services may, therefore, be performed either within the wrap packages 10 itself or integrated with a remote data processing resource.

The data integration capabilities of cards 14 can also be shared among other cards 14 in the same wrap package 10, with other wrap packages, with web sites, or just about any other data processing system.

Figure 3:
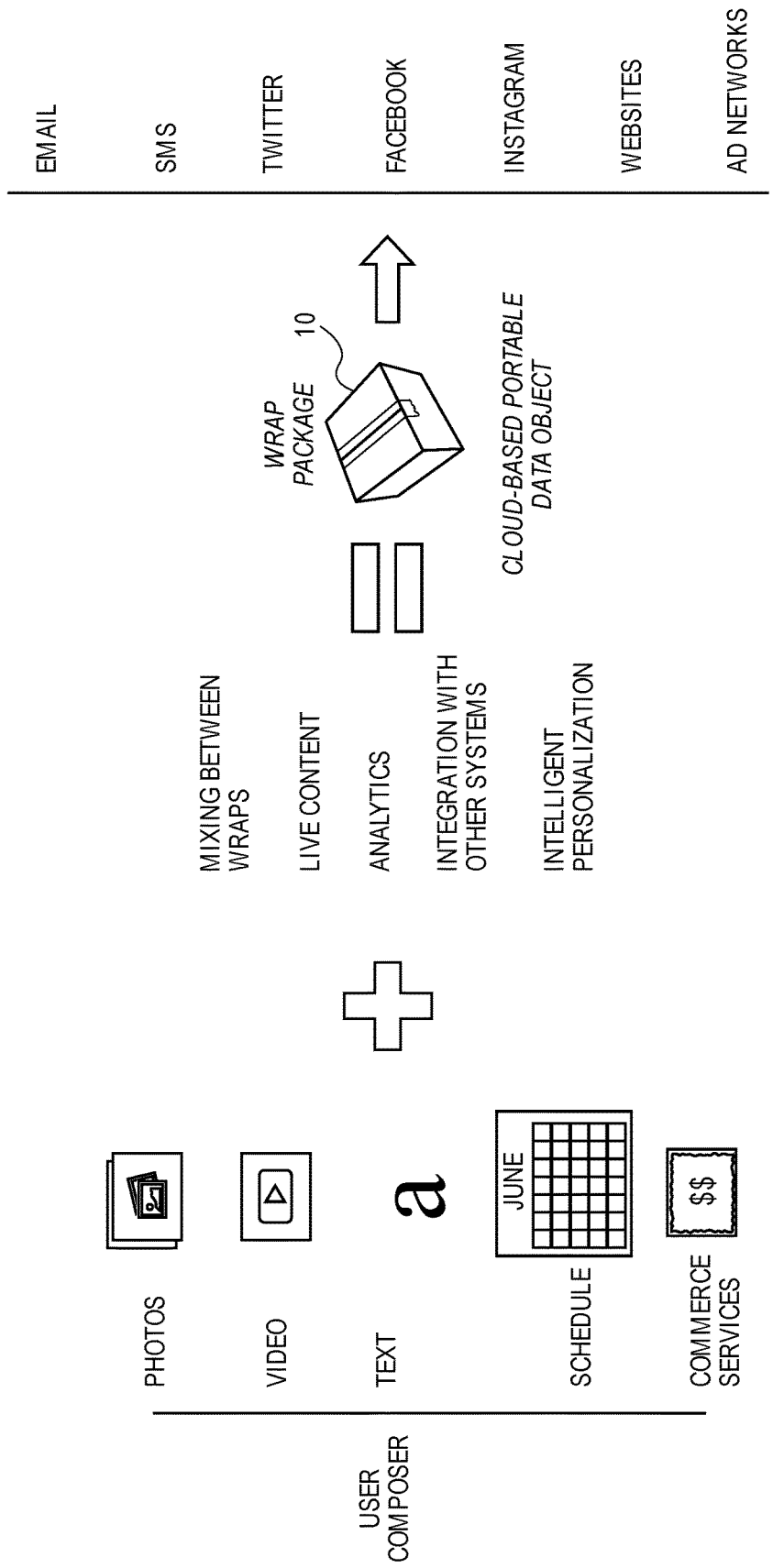
FIG. 3 is a diagram illustrating the media content and distribution model for distributing digital companion wrap packages in accordance with the principles of the present invention.

Referring to FIG. 3, a diagram summarizing the content and distribution model for wrap packages 10 is shown. As illustrated in the left most column, the content that may be included in the various cards 14 of a wrap package 10 may include photos and/or images, audio, video, text, 3-D objects, various types of streaming media (e.g., audio, video, audiovisual, data, biometric information, tickers, sensor outputs, etc.), other data types, application functionality and/or e-commerce services. This content may further be combined with content mixed from other wrap packages 10 as well as live or streaming content. The cards 14 of the wrap package 10 may be further modified based on analytics, intelligent personalization based on the demographics of targeted users or viewers, as well as the integration of either data input or data output to/from with other cards 14, other wrap packages 10, or remote data processing systems and processes, as explained above.

All of the above are then combined during the authoring process into a group of digital objects, defined herein as the wrap package 10. In non-exclusive embodiments where URLs are used as identifiers (i.e., wrap ID 42), the wrap packages are "light-weight", meaning content of the wrap package 10 is delivered over a network to a user only when the wrap ID 42 for the wrap package 10 and/or each card 14 is identified. As a result, the media content, application functionality, and/or e-commerce related services is delivered only when needed. Also, by authoring the cards 14 using a widely supported language such as HTML, the cards 14 of wrap packages 10 can be written once and are viewable on a display associated with almost any computing device running a browser. Accordingly, unlike applications, multiple version of a wrap package 10 need not be authored for multiple platforms.

The wrap package 10 is thus essentially a cloud based portable object that may be readily distributed in a number of ways. In non-exclusive examples, wrap packages 10 may be distributed by email, SMS messaging, ad networks, Twitter, merchant/retailer web sites, photo and/or video sharing web sites that support messaging, social networking web site such as Facebook, through the down-loading of applications from aggregators such as the Apple App Store or Google Play, or just about any means for electronically distributing data over a network, currently known or developed in the future.

Authoring and Distribution of Wrap Packages

Figure 4:
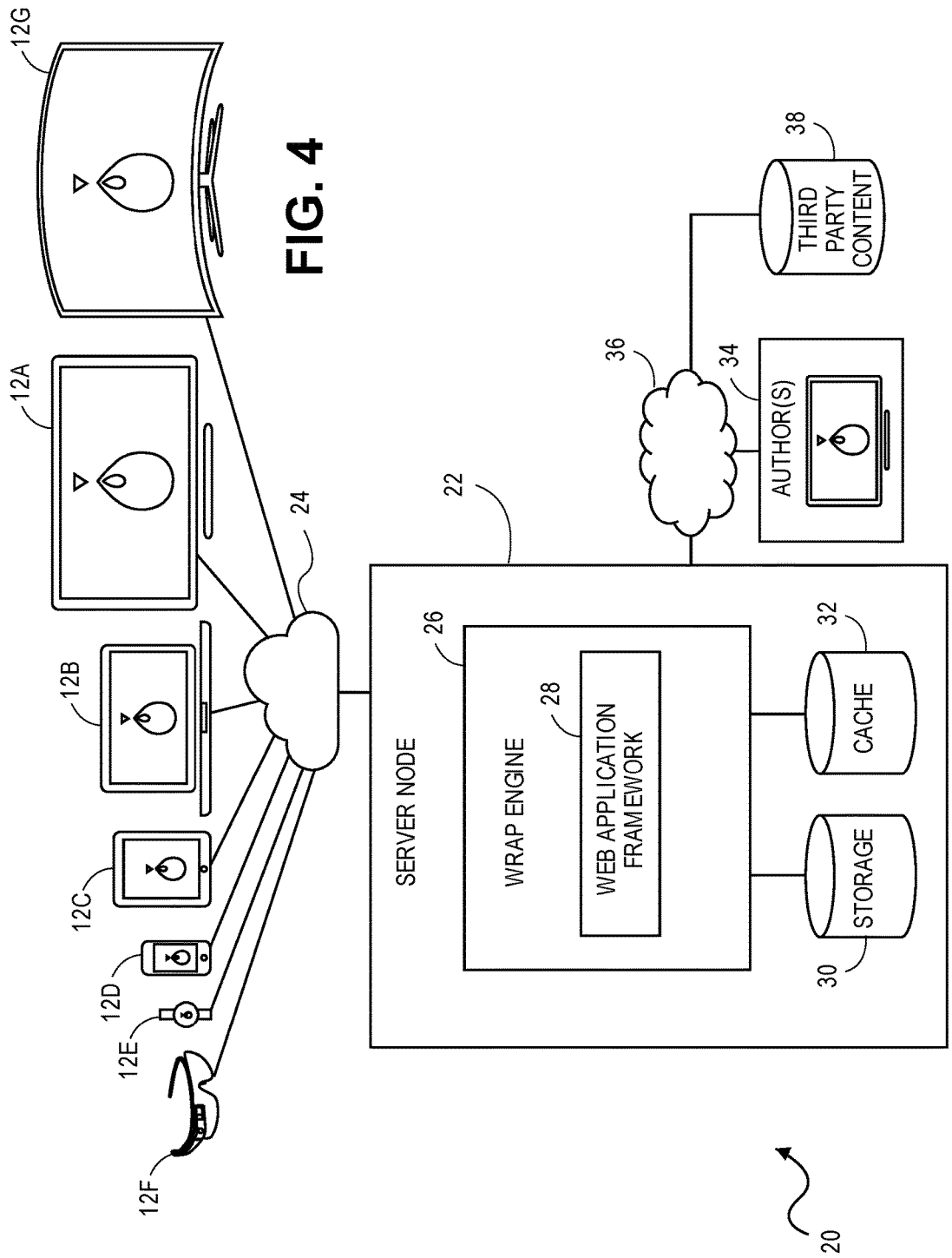
FIG. 4 is a block diagram of a representative system for authoring, storing, distributing, and consuming wrap packages in accordance with the principles of the present invention.

Referring to FIG. 4, a block diagram of a non-exclusive system for authoring, storing, distributing and consuming wrap packages 10 is illustrated. The system 20 includes a server node 22, a plurality of computing devices 12, including but not limited to a desktop computer 12A, a laptop computer 12B, a tablet computer 12C, a mobile "smart" phone 12D, a wearable computing device, such as a smart watch 12E or smart glasses 12F and "smart" TVs 12G. The server node 22 and the computing devices 12A-12G communicate with one another over a network 24. In various embodiments, the network 24 may be the Internet, an intranet, a wired or wireless network, a Wi-Fi network, a cellular network, other types of communication networks, or any combination thereof.

The server node 22 includes a "wrap" engine 26, which defines a web application framework 28, a storage device 30 and cache 32, each for storing wrap packages 10 and other data. The server node 22 also may include a suite of tools, such as an authoring tool (as described in detail below), an analytic engine tool, a media collaboration tool and a data transformation tool, for authoring wrap packages 10.

The web application framework 28 is a software platform designed to support the manual and/or automated authoring of wrap packages 10. The framework 28 is designed to alleviate the overhead associated with common activities performed during the authoring of many wrap packages 10. For example, the framework 28 may include one or more libraries to help with the authoring of common tasks, and modularizes and promotes the reuse of code designed to perform specific tasks, such as implementing application functionality and/or supporting e-commerce. In various embodiments, the web application framework 28 may be implemented using, but is not limited to, Ruby, Rails, JavaScript, Angular-JS, and/or any other language or framework currently known or developed and used in the future.

In a non-exclusive embodiment, the web application framework 28 of the wrap engine 26 also performs content management as a way of organizing, categorizing, and structuring the media and other content resources such as text, images, documents, audio files, video files and modularized software code so that the content of wrap packages 10 can be stored, published, reused and edited with ease and flexibility. The content management function is also used to collect, manage, and publish content, storing it either as components or whole documents, while maintaining dynamic links between the components and/or cards 14 of a wrap package 10.

In yet another non-exclusive embodiment, the web application framework 28 of the wrap engine 26 is structured around multiple tiers, including but not limited to a client tier, an application tier and a database tier. The client tier refers to the browser enabled communication devices 12 that execute and display cards 14 of wrap packages 10, as well as web pages written in HTML or another mark-up language. The database tier, which is maintained in storage 30, contains the one or more libraries of user and/or platform provided media content, software components, modules, etc. used for the authoring of wrap packages 10. The application tier contains the software that runs on the server node 22 and that retrieves and serves the appropriate wrap package 10 from storage 30 and/or cache 32 when requested by a computing device 12.

Since wrap packages 10 are essentially data objects, they can be both cached and delivered over a Content Delivery Network Interconnection (CDN), both of which can be effectively used to deliver wrap packages 10 with minimal delay. For example, commonly requested wrap packages 10 may be cached in the cache 32, which provides faster access and delivery times than storage 30. Also other caching techniques, such as pre-caching, may be used with popular wrap packages 10, to speed up delivery times. Since the amount of storage in the cache is typically limited, cached wrap packages 10 and other data may be periodically replaced by any known replacement algorithm, such as first-in, first-out or least recently used for example.

During the composing of a wrap package 10, one or more author(s) 34 may access the server node 22 over a network 36, which may be different or the same as network 24. The author(s) 36 interact with the wrap engine 26, including the web application framework 28, and the above-mentioned suite of tools for the creation, editing, optimization and storing of wrap packages 10. In yet other embodiments, the one or more author(s) 34 can also access third party content 38 for inclusion into a wrap package 10. As previously noted, wrap packages 10 can be authored manually by one or more individuals or electronically in an automated process.

For more details on the authoring of cards 14 of wrap packages, see U.S. provisional applications 62/062,056 and 62/062,061, both entitled "Wrapped Packages of Cards for Conveying a Narrative With Media Content, Providing Application Functionality, and Engaging Users in E-commerce", both filed Oct. 9, 2014, and both incorporated by reference herein for all purposes.

Once the authoring of a wrap package 10 is complete, it is maintained in storage 30 and possibly cached in cache 32. In response to receiving an identifier, the wrap engine 26 accesses the corresponding wrap package 10 from storage 30 or the cache 32 and serves it to the requesting computing device 12 for consumption in a format customized for the viewing device.

It should be noted that the authoring and distribution diagram of FIG. 4 is merely representative and should not be construed as limiting. For example, multiple server nodes 22 for the authoring and/or distribution of wrap packages 10 may be provided at the same or different locations. In addition, multiple instantiations of a given wrap package can 10 be stored at multiple server nodes 22, typically located at different geographic locations. With this arrangement, the server node 22 that is most capable of quickly delivering a requested wrap package 10, sometimes referred to as the "publication server", is the node 22 that will deliver the wrap package to the requesting device 12.

The Wrap Package

Figure 5A:
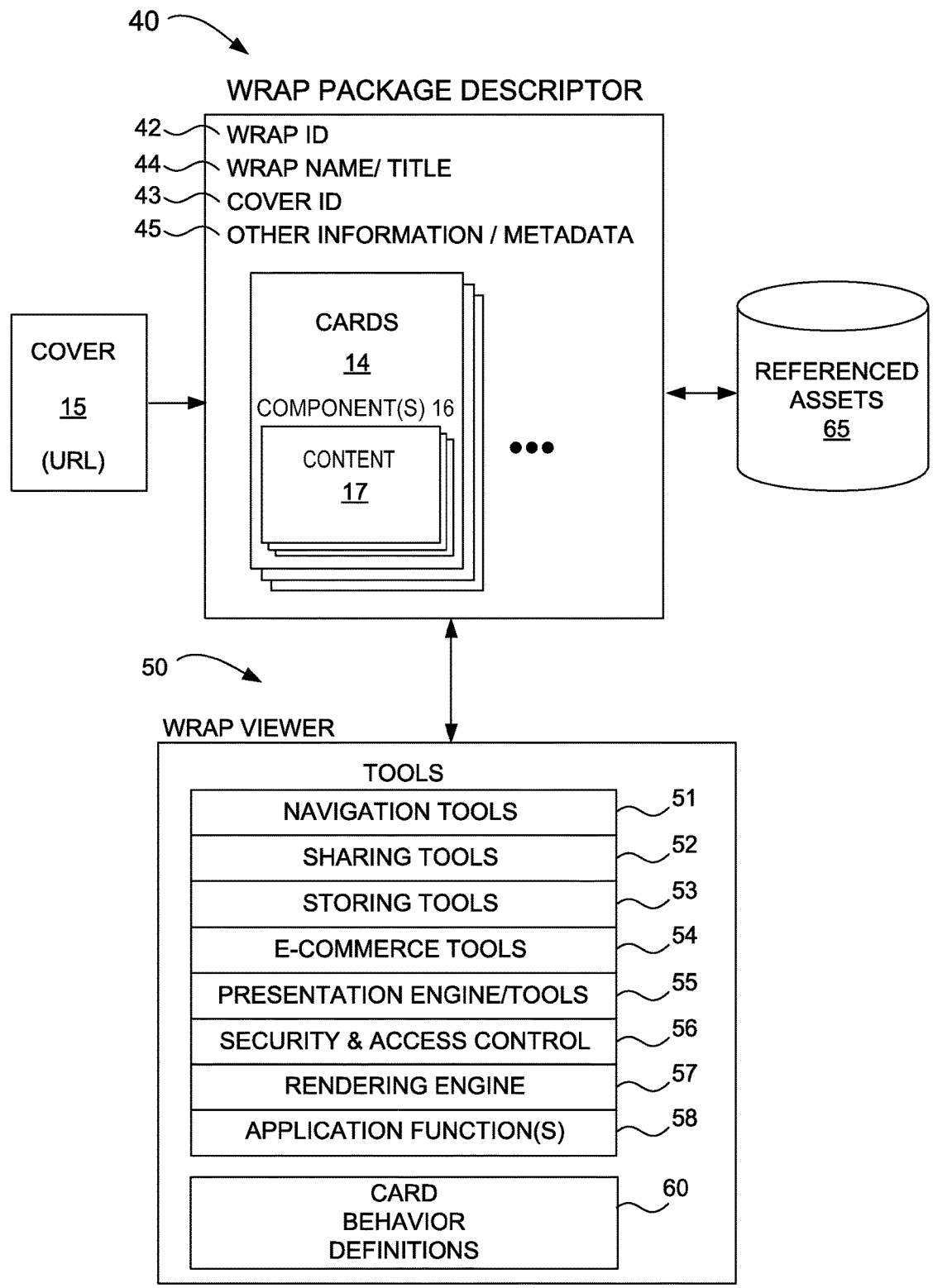
FIG. 5A diagrammatically illustrates selected components associated with defining and rendering a representative wrap package.

As diagrammatically illustrated in FIG. 5A, a wrap package 10 includes a set of one or more cards 14. Each card 14 may contain one or more components 16 that serve as containers for content objects 17. The content objects 17, together with the behaviors associated with the cards and components 16, define the content and functionality of the cards. The content objects 17 may be simple or complex. Simple content objects 17 include standard web-based content types such as text, images, video clips, etc. More complex content objects 17 may include objects having more complicated structures and/or behaviors, as will be described in more detail below.

The structure of the wrap 10, including the structure, layout and components 16 of each of its cards 14 is preferably defined by a wrap descriptor 40. The actual structure of the descriptor 40 may vary widely and a few different suitable descriptor structures are described in more detail below with respect to FIGS. 6-6D. Some content objects 17, such as text, may be directly included (in-line) in the component 16. Other content objects 17, such as images or video clips, may be included by reference, e.g., through simple URL references, or in-line through an encoding method such as MIME (Multi-Purpose Internet Mail Extensions). Complex content objects 17 may be specified in-line or by reference and may (a) contain other components 16 or content objects 17 and/or (b) specify abstract behaviors.

Referenced content objects 17 stored outside of the wrap descriptor 40 are sometimes referred to herein as assets 65. The referenced assets 65 may take the form of almost any type of content that can be included in the wrap package. This can include text, photos, images, 3-D objects, audio, video, and other media content or streams and/or a variety of executable objects, services and/or other functionality. Sometimes an asset may take the form of a stream and the wrap descriptor 40 is arranged to identify the source of the stream (i.e., the feed). By way of example, the stream could be a live audio or video stream, a data feed such as a stock ticker, sensor outputs, biometric information, etc.

In certain circumstances, some or all of the assets 65 associated with a wrap 10 may be stored and accessible from a dedicated wrap server. However, that is not a requirement. Rather, an asset can be retrieved from any location that would be accessible by the consuming device (e.g., through the Internet, an intranet or private network or any other reliable means), and there is no need for the various assets 65 to be located in a single asset store, although that may be desirable in many circumstances.

The wrap package 10 has an associated identifier, the wrap ID 42, that uniquely identifies the wrap 10. The wrap ID is preferably a globally unique identifier (GUID). In some embodiments, the wrap ID 42 takes the form of a URL, or any other identifier that can be converted to, or extracted from, a URL, which facilitates access to the wrap 10 over the Internet using conventional mechanisms. An example of a conversion of the wrap ID to a URL might be adding a domain as a prefix to the wrap ID to form a URL (e.g., www.wrap.com/wrap/<wrapID>).

FIG. 5A also diagrammatically illustrates selected components associated with defining and rendering a representative wrap package 10. The illustrated components may optionally include one or more covers 15, a wrap descriptor 40, a wrap runtime viewer 50 and various referenced external assets 65. As previously noted, the wrap descriptor 40 defines the structure, layout and components 16 of each of the cards 14 within the wrap package 10. The wrap descriptor 40 typically includes the wrap ID 42 and a set, deck or array of card definitions or card descriptors 46, each defining the structure of an associated card (as described with respect to FIG. 6 for example). The wrap descriptor 40 may also include other information of interest such as a wrap name/title 44 and optionally one or more cover identifier(s) 43 and/or other information or metadata 45 about the wrap package 10.

To facilitate rendering the wrap package 10 on various different devices, the wrap is preferably stored in a data format that separates the data from the presentation. At the time of this writing, JavaScript Object Notation (JSON) is a popular, light-weight, data-interchange format that can be used to describe the wrap package 10. Thus, by way of example, the definition of the wrap package 10 may be stored as a JSON data object at the server(s) 22. That is, the descriptor 40 may take the form of a JSON object. In other embodiments, a BSON (Binary JSON) data object may be used. Although the use of JSON or BSON data objects is described, it should be appreciated that in other embodiments, the wrap package 10 may be stored in a variety of other suitable formats, whether now existing or later developed.

The optional cover 15 of the wrap package 10 is typically a graphic object that contains an embedded hyperlink to the wrap (e.g., the URL used as wrap ID 42) and can be placed in any suitable type of electronic media to represent the wrap package 10. Thus, a wrap 10 may be accessed by clicking on or otherwise selecting the cover 15 or by clicking on, or otherwise selecting any other type of link containing the wrap ID 42. As such, in order to "distribute" a wrap package 10, either the cover 15 or a link can be distributed to potential viewers of the wrap package 10 using any available tool. For example, the wrap package 10 may be distributed by: (i) placing the cover 15 or a link on a webpage, in an ad or in any other location that can be accessed by a potential viewer via a browser; (ii) by posting the cover 15 or a link on a blog, a micro blog, a forum, a wall etc. or any social media distribution mechanism such as Facebook, Twitter, etc.; (iii) by including the cover 15 or a link in a message such as e-mail, SMS message, a Twitter Tweet, text messages, etc.; or (iv) using any other available distribution mechanism or platform, either known now or developed in the future. Therefore, in many circumstances, it is desirable to create a cover 15 that is attractive and entices viewers to access the associated wrap package 15. In some instances, the cover 15 may take the form of an image from the wrap package 10 itself (e.g., the first card); however, that is not a requirement.

The wrap package 10 is configured to be rendered on a consuming device 12 in conjunction with a wrap runtime viewer 50, which is also sometimes referred to as the wrap run-time engine or simply the viewer. The runtime viewer 50 provides a set of tools and functionalities that are helpful for viewing and/or interacting with the wrap. In some circumstances, the viewer 50 will take the form of a dedicated, platform specific, wrap viewer application (e.g., an applet or app in the context of a mobile device), a plug-in (e.g. a browser plug-in) or other mechanism installed on the viewing device that provides the necessary functionality. In other circumstances the wrap viewer functionality may be incorporated into other types of applications. However, limiting the rendering of wraps to devices which have preinstalled wrap viewing applications/functionality would greatly reduce their portability since users are not always motivated to install such applications unless or until they see a compelling need. Therefore, as will be explained in more detail below, the delivery of a wrap packages 10 may optionally be accompanied by a run-time viewer 50 that includes a set of associated tools and functionalities suitable for use by a conventional browser to generate and/or render the runtime instance of the wrap based on the wrap descriptor 40 and to facilitate user interaction with the wrap package 10. These tools and functionality can be thought of, and are often referred to herein as a wrap toolset that is part of the wrap runtime viewer 50. By providing the wrap construction, viewing and interaction toolset in a browser executable form together with the wrap descriptor 40, the wrap package 10 can be consumed on a wide variety of different devices and operating system platforms (e.g., iOS, Android, Microsoft, etc.) without requiring the users to download and install a device and/or platform specific viewer application. This is a powerful construct for enhancing the portability and viral distribution of wrap packages among a myriad of devices and operating system platforms In the embodiment illustrated in FIG. 5A, the viewer toolset provided with the wrap viewer 50 includes navigational tools 51, sharing tools 52, storing tool 53, various e-commerce tools 54, presentation engine/tools 55, security and access control tools 56, a rendering engine 57, and application functionality tools 58. Of course, it should be appreciated that not all of these tools are required in all implementations and that in other implementations, a variety of other tools and functionalities may be provided as well. The navigational tools 51 facilitate navigation within the wrap package 10. The sharing tools 52 provide mechanisms by which a consumer of the wrap 10 may share the wrap with others, e.g., by e-mail, by SMS message, via a social media post, etc. Storing tool 53 allows a user to persistently store the wrap and/or when applicable, the wrap state, either locally or remotely. The e-commerce tools 54 may include a variety of functionalities that can help facilitate a variety of e-commerce tasks including purchasing, making reservations, etc. Application functionality tools 58 enable "app-like" functionality within the wrap package 10, such as conducting online chats, GPS functionality, etc. Presentation engine 55 controls the presentation. In some embodiments, the presentation engine 55 may be arranged to present the wrap on the consuming device at a scale and in an aspect ratio that is at least somewhat optimized for the device.

Security and access control tools 56 provide security and access control functionality, which might include encryption functionality and user authentication services. For example, in some circumstances, the publisher of a wrap may want to limit the circulation of the wrap to specific users or groups of users. A few, nonexclusive examples of such circumstances include when the wrap is created for use as: (i) an active receipt for a purchase as described in U.S. Provisional Application Nos. 62/062,056 and 62/075,172 (both incorporated by reference herein for all purposes) and (ii) a ticket for an event as described in U.S. Provisional Application No. 62/079,500; (also incorporated by referenced herein for all purposes); (iii) an item customized for a customer such as a travel itinerary; and (iv) an employee manual as described in U.S. Provisional Application No. 62/114,731 (also incorporated by reference herein for all purposes); etc. Encryption services may be desirable to protect confidential information. Of course, there are a very wide variety of other circumstances where security and/or access control/permission functionality may be desired.

With certain embodiments, the viewer 50 may optionally also include a rendering engine 57 arranged to create and/or render a runtime instance of the wrap on a consuming device 12 based on the descriptor 40. In such embodiments, the rendering engine is arrange to dynamically generate the HTML (or other markup language) use by a browser or other viewing mechanism on the device 12 to render the wrap at runtime. In some implementations, the rendering engine 57 is arranged to create an object graph based on the descriptor 40 and a document object model (DOM) based on the object graph. The browser or other suitable app or application may then use the DOM to render the wrap package 10.

Figure 5B:
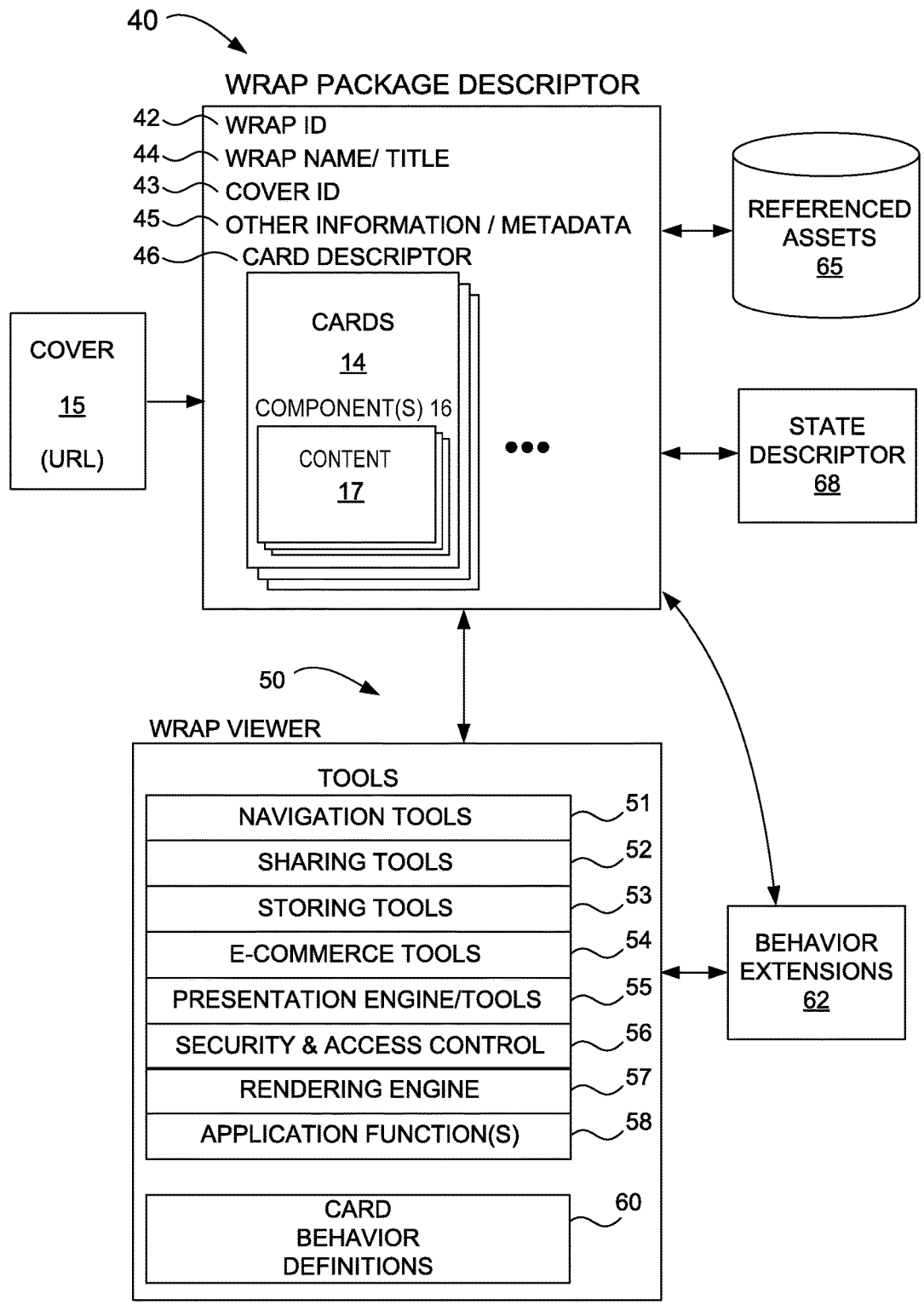
FIG. 5B diagrammatically illustrates selected components associated with defining and rendering a representative wrap package in accordance with another embodiment that utilizes state descriptors and/or behavior extensions.

With yet other embodiments, the viewer 50 may also optionally have any number of card behaviors definitions 60. As will be described in more detail below, different cards can be designed to exhibit a wide variety of different behaviors. In order to simplify the card, and card template creation processes, various desired behaviors can be defined separately from the cards themselves. The behaviors are known to or accessible by the wrap viewer 50 (e.g., desired behaviors may be defined through behavior definitions 60 or may be accessible as behavior extensions 62 as seen in FIG. 5B). Thus, the descriptor for any particular card or component may simply declare the desired behavior and the viewer 50 will know how to impart such behavior to the wrap/card/component and/or how to obtain an extension that imparts such behavior.

In FIG. 5A, the behavior definitions and the various tools are illustrated as separate items to facilitate their description. However, in practice, some of the illustrated tools are simply sets of associated behaviors, and therefore, the illustrated distinction between the behaviors and such tools is/are largely for emphasis.

As discussed above, the wrap package 10 may be rendered on a wide variety of different devices 12A through 12G. These devices may have a wide variety of different screen sizes, capabilities, and viewing mechanisms. When a particular device 12 requests a wrap package 10, a determination is effectively made as to whether a suitable wrap runtime viewer is already present on the requesting device. If not, a browser compatible runtime viewer 50 is provided in addition to the wrap or wrap descriptor 40. The browser compatible run-time viewer may be written in any format that is appropriate for execution by a browser. By way of example, JavaScript (JS) is a dynamic programming language that is currently popular and supported by most general purpose browsers and many other rendering mechanisms. Thus, JavaScript works well for the browser compatible viewer since the same wrap viewer can be used for a wide variety of different browsers. However, it should be apparent that in other embodiments, the wrap viewer 50 may be implemented using a wide variety of other now existing or future developed frameworks and/or languages. For example, the DOM rendering may be replaced with a React framework or another suitable framework currently known or developed in the future. When the wrap viewer is incorporated into a native application, it will sometimes be desirable to write the viewer (or portions of the viewer) in a format that executes more efficiently or is otherwise preferred for execution on the underlying operating system, etc.

Defining Card Behavior

Different cards 14 within a wrap 10 can be designed to exhibit a wide variety of different behaviors. To simplify the card authoring process, the card descriptor 46 within a wrap 10 can be arranged to declare the behavior of the card 14 without internally defining that behavior. Rather, in such circumstances, the desired card 14 behaviors are defined within the wrap viewer 50 as part of the behavior definitions 60 or through behavior extensions 62. With this arrangement, a card template designer can define the behavior for cards 14 authored using the template, or can define a set of available behaviors from which a card author can choose. If a set of behaviors are available to the card author, then the authors selects the desired behavior from the available set. In either case, the desired behavior is declared as part of the card. With this arrangement, different cards 14 within a wrap 10 can exhibit different behaviors and such behavior remains with the card even if the card is used in a different wrap. If a new card behavior is desired, the new behavior can be created and added to the behavior definitions 60. In this manner, the newly defined behavior becomes available to other template designers and/or card authors.

The card descriptor 46 for the gallery card includes a behavior declaration that identifies the desired behavior for the card, which can then be bound to the card at run-time by the wrap viewer (e.g., browser based viewer, native viewer, etc.). For example, this could take the form of a statement such as:

"Behaviors": ["vertical-snap-to-card"]

Further examples are shown in Appendix I of U.S. Provisional Application No. 62/133,574.

The developer of the wrap viewer 50 can define any number of card behaviors that are supported by the viewer, such as but not limited to the different scrolling techniques in the example above. Third parties can provide extensions that define still other behaviors (e.g., a scrolling behavior in which a two finger swipe reacts differently than a one finger swipe, etc.). The developer of a card template can define which of the available behaviors are available for use with the template (e.g., a subset, or all of the defined scrolling behaviors). Wrap and card authors using the template can then select which of the behaviors available to the template they would like to associate with the card, and the chosen behavior is declared as part of the card descriptor 46.

Although the specific example of scrolling behavior in a gallery card has been given, it should be appreciated that virtually any desired type of card behavior can be defined and declared in a similar manner. It should be appreciated that differences in card behavior may take a wide variety of different forms. For example, different types of cards may have different accompanying behaviors; the behavior of a particular type of card may be different based on its position within the wrap 10; and/or the animations associated with transitions may vary with respect to card position.

The actual structure of the descriptor used to define a gallery card may vary significantly. By way of a representative card descriptor structure suitable for implementing a gallery card is described in more detail below and is illustrated in FIG. 6C.

Triggers

A card can have one or more triggers embedded therein. Triggers are hooks associated with displayed items that can cause an action or behavior in response to an event (e.g. a user input). That is, a predetermined user action or other event (such as the selection of the displayed item) triggers a defined action. In general, a trigger is a component 16 of a card. The trigger has associated behaviors and one or more associated handlers. When a triggering event is detected, the associated handler causes execution of the desired behavior.

Virtually any type of computer detectable event can be used to activate a trigger. In many circumstances, the triggering event may be a user input such as the selection of a displayed trigger component (e.g., by tapping or performing another appropriate gesture relative to a displayed item configured as a trigger component). However, in other circumstance, the activating event may be system generated. System generated events can include sensor input based events, time or timer based events, the receipt of a particular message, the determination that a particular navigational sequence has occurred within a wrap, geo-location or proximity based events (e.g., the viewing device is located within a particular store or geographic area, or near to other users viewing the same wrap) or any of a wide variety of other computer detectable events.

Once activated, a trigger may exhibit any desired behavior which can be associated with the trigger through appropriate behavior declarations 95. Virtually any type of computer implementable behavior can be associated with a trigger. By way of example, a linking trigger may be used to link the user to another card within the current wrap, to send the user to another wrap, webpage or other destination. The linking trigger may also be arranged to define a desired linking behavior (e.g., open in same tab, open in new tab, etc.). Other triggers may initiate a wide variety of other action.

The ability to generally define triggering events and the resulting behaviors is an extremely versatile construct that provides wraps with tremendous flexibility and power. Thus, triggers can be used to enable a wide variety of actions, including invoking of a number of different application-like functionalities or e-commerce related services. For example, a trigger may be used to initiate an action (e.g., order a product, conduct an online chat, sharing the wrap with others, book or reserve a table at a restaurant, a hotel room, a rental car, etc.). Almost any type of wrap component/asset can be associated with a trigger, which gives authors tremendous flexibility in guiding the user experience.

Figure 7:
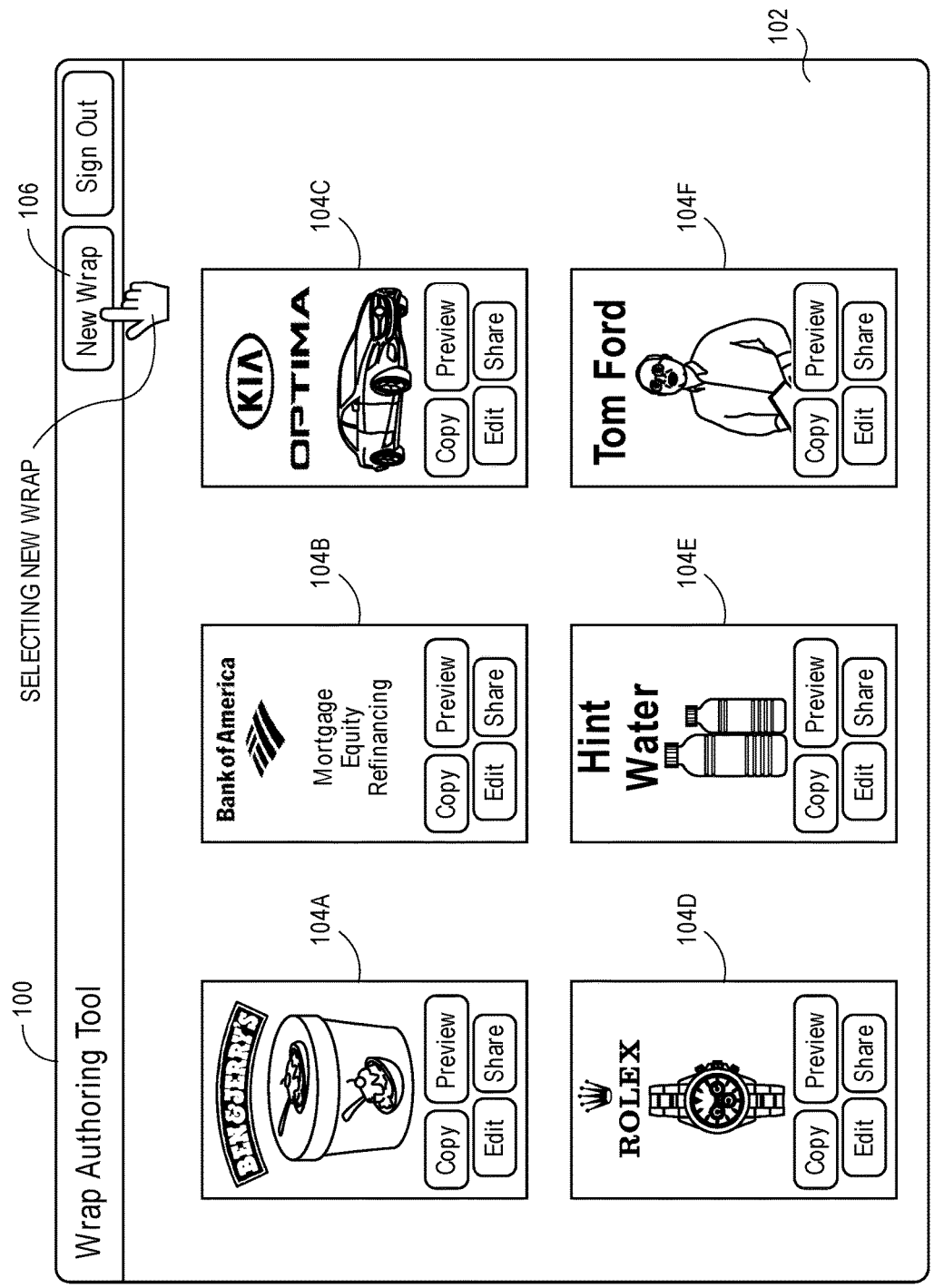
FIG. 7 is a home screen for an authoring tool used for authoring wrap packages in accordance with a non-exclusive embodiment of the invention.

The wrap 310 illustrated in FIG. 7 has a number of triggers. These include purchasing trigger 340 (FIGS. 7F-7K), subscription trigger 360 (FIG. 7L) and social media triggers 381, 382, 383 (FIG. 7M). The purchasing trigger 340 is arranged to facilitate a user purchase of the displayed product. As an illustrative example, the trigger 340 of FIG. 7F, is associated with a generally rectangular region that bounds the text and graphic located at the bottom of the card, including the text "pomegranate $18 for 12 16-ounce bottles" and the adjacent "Buy Now" button. The region that involves the trigger is generally shown by a dashed box in FIG. 7F. Selection of the trigger 340 links the user to a mechanism that facilitates the purchase of the identified item. The other above-identified triggers in the wrap 310 are characterized by and operate in a manner similar to the Buy Now trigger 340 of FIG. 7F.

The implementation of a purchase mechanism within a wrap package 10 may be widely varied. For example, in some implementations, the user may be linked to the vendor's website, where the purchase may be made in a conventional manner through the website. If this approach is taken, it is often desirable to access the target website through a "Cul-de-sac" so that the user is returned to the wrap when finished with any transactions they wish to make (a Cul-de-sac has the property of returning to the initiating wrap card/page when the user closes the target website). In another approach, the selection of the trigger causes the wrap to transition to a purchasing card (or sequence of cards) within the same wrap where the desired transaction can occur. One such approach is described below with respect to FIGS. 8A-8C. Alternatively, the transition could be to a separate purchasing wrap. Regardless of the mechanism, it is often desirable (although not necessary) to use a cul-de-sac approach so that the user is returned to the card from which the transaction was initiated after the transaction is completed. In still other implementations, the transaction can be completed without leaving the current card—particularly when the user is using a secure viewer that knows the user's identity and relevant purchase related information. In such an embodiment, the transaction can be completed using a "one-click" purchasing option, where previously stored customer billing, shipping and other account information is used to process the purchase.

In a non-exclusive embodiment, the specific behavior associated with the link may be declared in the same manner described above. For example, consider a situation where the trigger activates a link to an external website. There are several ways that such a link could be implemented. One approach might be to link to the target web page in the currently active browser tab, which has the effect of navigating away from the wrap. A second approach might be to open a new browser tab and open the target webpage in that new browser tab. A third approach might be to initiate a Cul-de-sac in the current browser tab and open the target webpage in the Cul-de-sac (a Cul-de-sac has the property of returning to the initiating wrap card/page when the user closes the target website). In such an arrangement, the card template developer can make these three link behaviors available to the trigger and the card author can select the desired behavior. The card developer can also define a default link behavior selection in the event that the card author does not affirmatively make a selection. As can be seen in Appendix I of U.S. Provisional Application No. 62/133,574, trigger 340 in card 316 has these three possible linking behaviors in response to activation of a trigger.

The ability to direct a user to a target website to complete a transaction can be helpful in many scenarios. However, a drawback is that it can be more difficult to track or guide user behavior after the user has navigated away from the wrap. Therefore, it is often preferable to design the wrap in a manner that facilitates handling user side interactions involved with a transaction from within the wrap itself.

The actual structure of the descriptor used to define a trigger may vary significantly. By way of example, a representative trigger component descriptor structure is described in more detail below and is illustrated in FIG. 6D.

Wrap Descriptors

Figure 6:
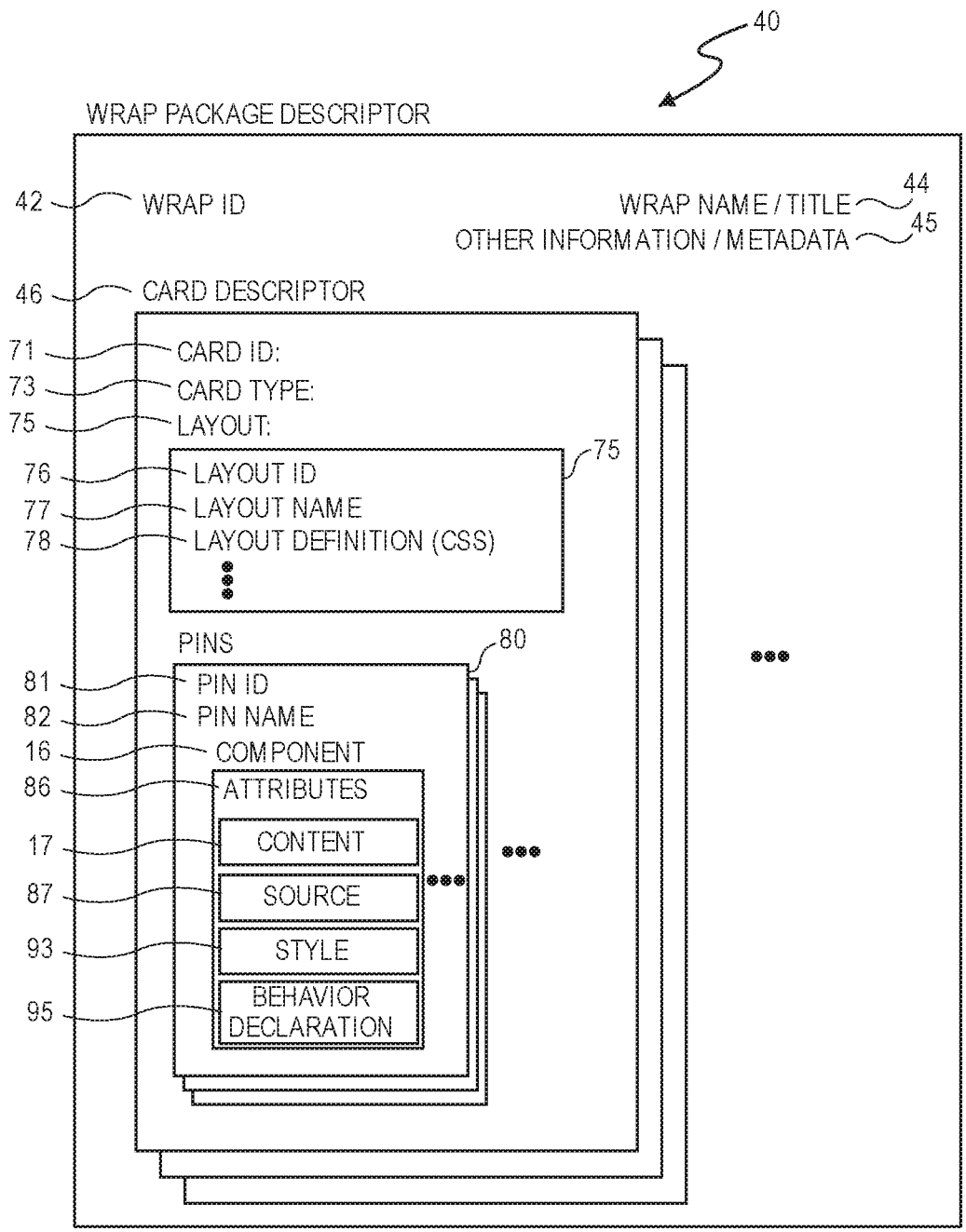
FIG. 6 is a diagram illustrating the hierarchy of a wrap descriptor in accordance with the principles of the present invention.
Figure 6A:
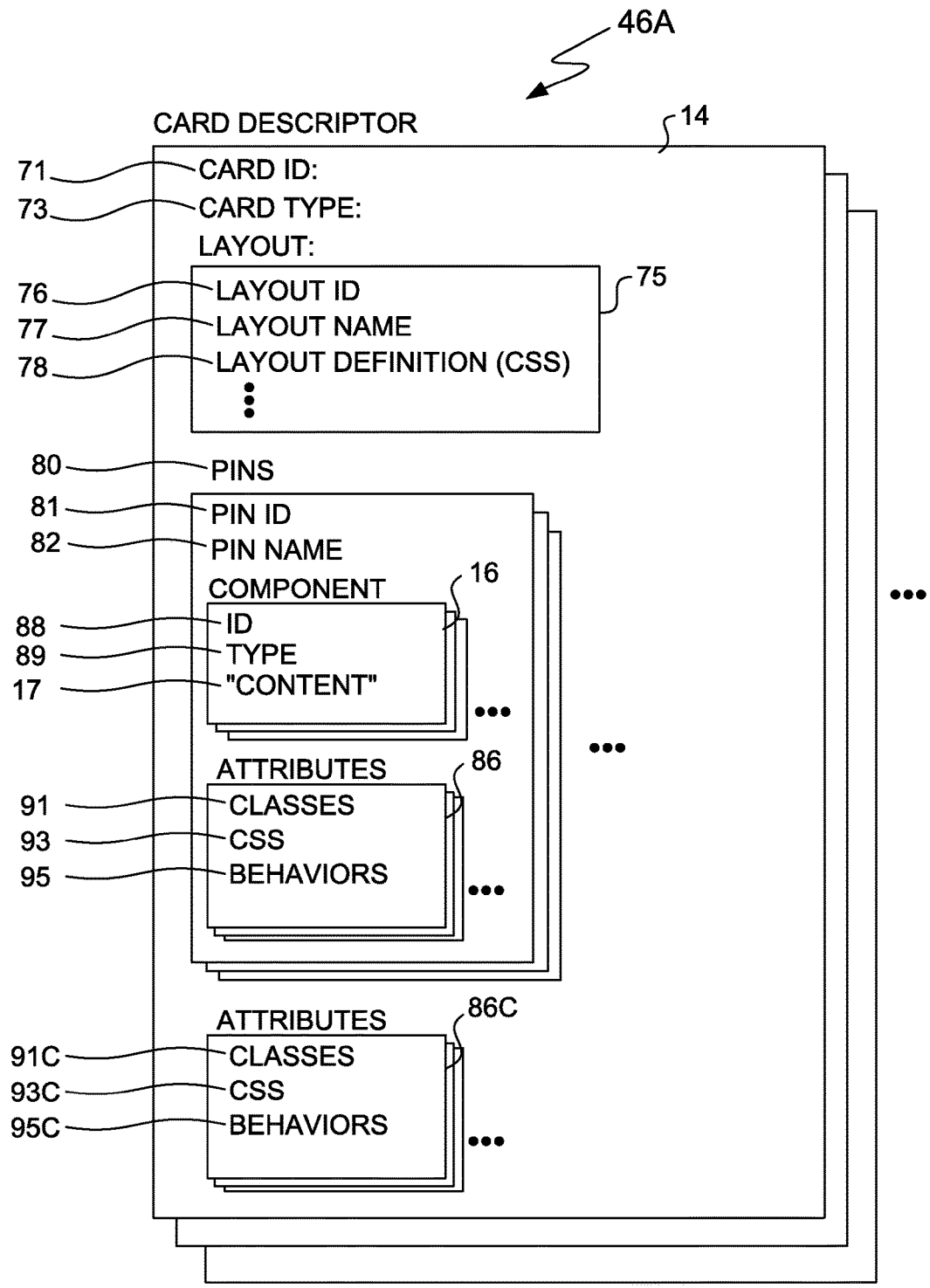
FIG. 6A is a diagram illustrating the hierarchy of a particular card descriptor in accordance with the principles of the present invention.
Figure 6B:
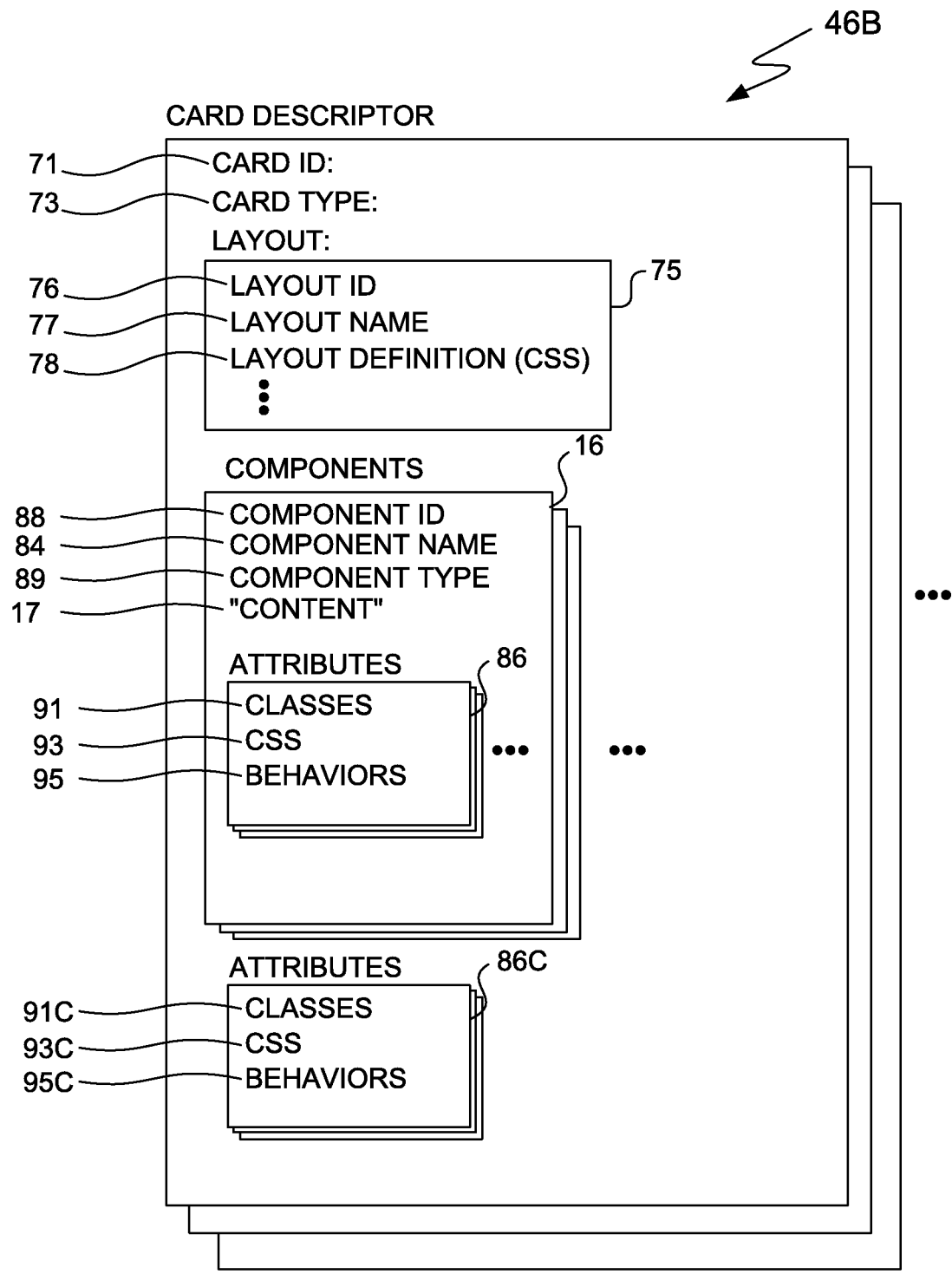
FIG. 6B is a diagram illustrating the hierarchy of a second card descriptor embodiment.
Figure 6C:
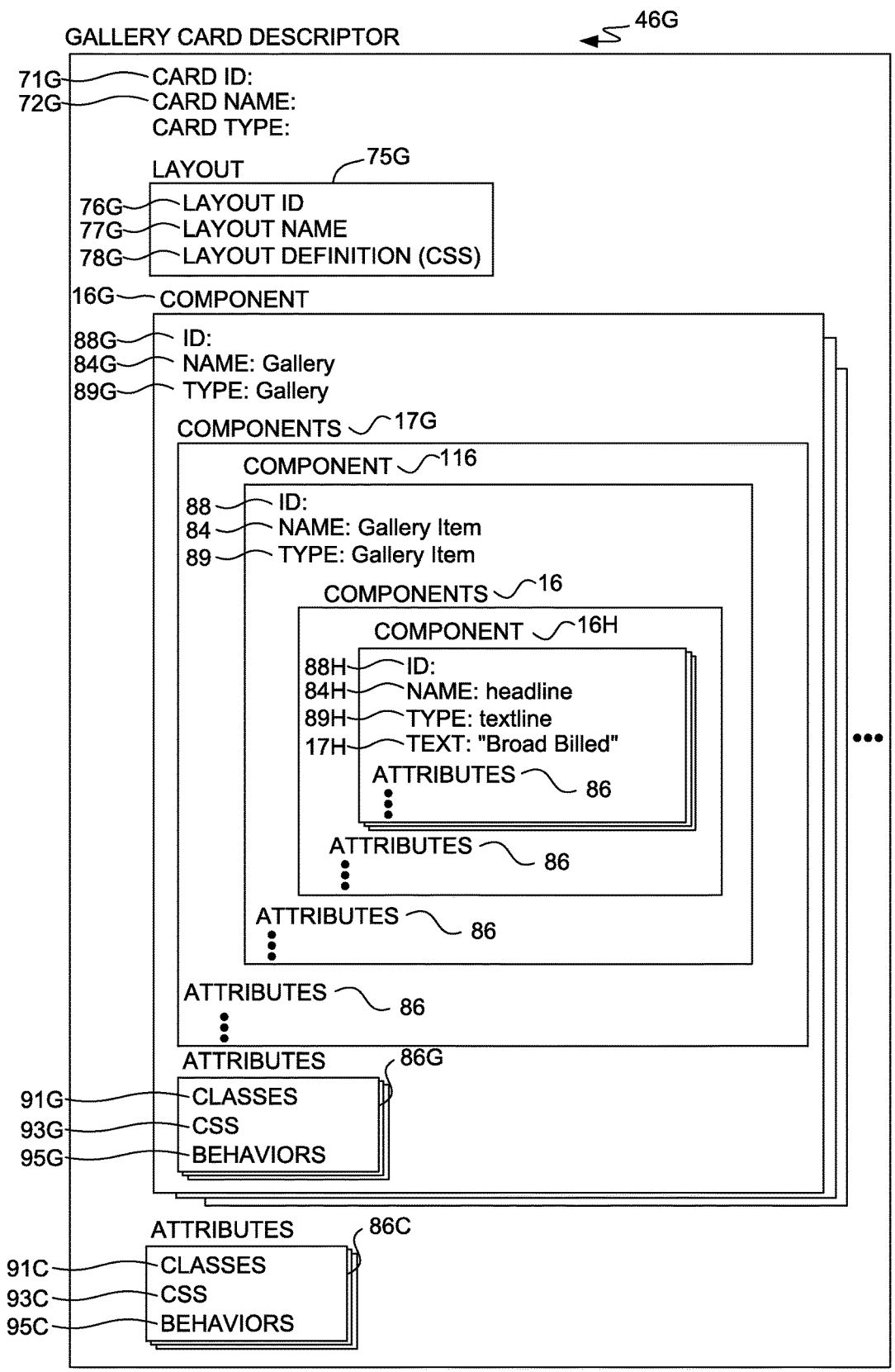
FIG. 6C is a diagram illustrating the hierarchy of a gallery card wrap descriptor embodiment.
Figure 6D:
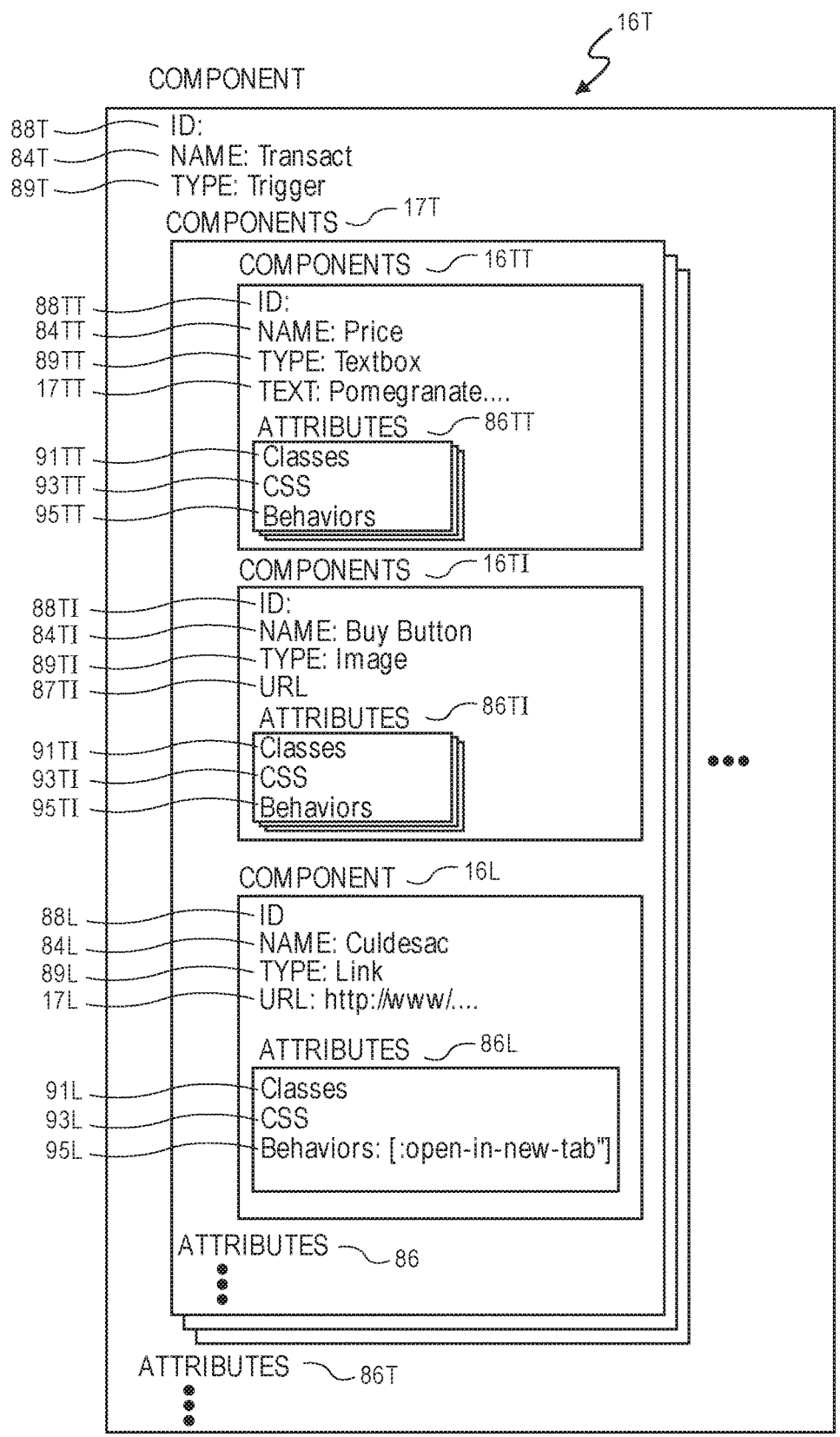
FIG. 6D is a diagram illustrating the hierarchy of a trigger component descriptor embodiment.

Referring next to FIGS. 6-6D, a variety of specific descriptor structures suitable for use in defining various wraps, cards and/or components will be described. Although specific descriptor structures are illustrated, it should be appreciated that the structure of the various descriptors can be widely varied. In general, the descriptors are arranged to define the structure, layout, content and behaviors of the wrap without details of its presentation on a particular device. That is, the descriptors capture the functional and behavioral intent of the author, in a platform independent way, such that the runtime may implement the described structures and behaviors in a way optimal for the platform in question.

A wrap generally will include multiple cards and the corresponding wrap descriptor will typically have discrete descriptors for each of the cards. The card descriptors each include a unique card identifier and define the structure, behavior, layout and content of the corresponding card. Behaviors associated with any particular card can be applied at the card level (i.e., associated with the card as a whole), at a component level (i.e., associated to a particular component alone—which may or may not include subcomponents) or at any subcomponent level. Since the card descriptors are discrete, self-contained, units with a unique identifier, it is very easy to mix wraps (i.e., use cards created for one wrap in a second wrap). When cards are mixed, their components and associated behaviors remain the same— although it is possible to define behaviors that are context or state aware and therefore exhibit different states/properties/responses/etc. in different circumstances.

The components are encapsulated units that may have defined content (although such content may be dynamic) and, when desired, specific defined behaviors, styles and/or other attributes. In some preferred embodiments, each component has a unique identifier and could optionally also have an associated type and/or name. The use of encapsulated components with unique component identifiers makes the components highly modular such that an authoring tool can readily use and reuse the same components in different cards and/or wraps. Behaviors can be associated with the component and any component can be composed of one or more subcomponents which themselves are fully defined components.

Regardless of the level to which they are applied (i.e., wrap level, card level, component level, subcomponent level, etc.), the behaviors are preferably declared in the descriptor rather than being explicitly defined within the descriptor. In that way, the behavior declaration acts as a hook which can be used to associate virtually any programmable logic with a card/component/etc. The behaviors are preferably defined (or at least obtainable) by the runtime viewer.

FIG. 6, diagrammatically illustrates the structure of a first representative wrap descriptor 40. In the illustrated embodiment, the wrap descriptor 40 includes the wrap ID 42, the wrap title 44, and a card descriptor 46 for each of the cards 14. Each card descriptor 46 describes of the structure, layout and content of the associated card. The wrap descriptor 40 may also optionally include cover identifier(s) 43 and/or any other desired information or metadata 45 relevant to the wrap. The cover identifier(s) 43 identify any cover(s) 15 associated with the wrap. Other information and metadata 45 may include any other information that is deemed relevant to the wrap, as for example, an indication of the creation date and/or version number of the wrap, attributions to the author(s) or publisher(s) of the wrap, etc.

The card descriptors 46 may be arranged in an array, deck, or in any other suitable format. In the diagrammatically illustrated embodiment, each card descriptor 46 includes: a unique card identifier (card ID 71); a card layout 75; and optionally, an associated card type 73. The card layout 75 preferably includes at least one of a layout identifier (layout ID 76) and a layout definition 78 and optionally, a layout name 77. When the layout definition is not explicitly provided in the card descriptor 46, it may be obtained by reference through the layout ID 76. The layout definition 78 may be provided in a variety of different format. By way of example, Cascading Style Sheets (CSS) works well. As will be appreciated by those familiar with the art, CSS is a style sheet language used for describing the look and formatting of a document. Of course, in alternative embodiments, other style sheets and/or other now existing or future developed constructs may be used to define the layout of the cards.

The card ID 71 is preferably a unique identifier that uniquely identifies the associated card 14. An advantage of using unique identifiers as card IDs 71 is that the cards 14 are not wed to a particular wrap package 10, but rather, can to be used in or shared among a plurality of wrap packages. That is, once a card is created it can be used in any number of different wraps by simply placing that card's descriptor 46 at the appropriate locations in the card decks of the desired wrap package. Thus, the unique card IDs 71 can be used to help streamline the process of using one or more cards 14 from one wrap package 10 in a second wrap (sometimes referred to as the "mixing" of cards 14 and/or wrap packages 10), which can help simplify the process of creating the second wrap package. In some implementations, the card IDs 71 may also take the form of URLs, although this is not a requirement. A potential advantage of using URLs as the card IDs 71 is that the URLs can potentially be used to allow a card in the middle of the wrap to be more directly accessed from outside of the wrap.

The card layout 75 defines the layout of the components 16 of the associated card 14. Preferably the card layout 75 includes a card layout ID 76 which uniquely identifies the associated layout. In some embodiments, the descriptor itself defines the layout using a conventional web presentation definition mechanism such as Cascading Style Sheets (CSS). In other embodiments, the layout definition may be accessed from a server using the layout ID 76. As will be familiar to those skilled in the art, CSS is a style sheet language used for describing the look and formatting of a document written in a markup language. CSS enables separation of document content from the document presentation, including elements such as the layout, colors and fonts. Thus, CSS is very well adapted for inclusion within the wrap descriptor 40.

It should be noted that the layout ID 76 is also useful in the context of the aforementioned authoring tool used to create and author wrap packages 10. Specifically, in some embodiments, the authoring tool is provided with a number of pre-defined templates (card layouts) from which an author of a new card can choose. Each template has one or more containers/components 16, which are arranged on the card in a predetermined manner for holding card content 17. The template itself can have any particular layout, or can be used to create a particular layout. In either case, the particular layout can be assigned a unique layout ID 76, and thereafter, be used and reused in conjunction with different cards thereby simplifying the card creation process.

The card type 73 (which is optional in the descriptor) relates primarily to such an authoring tool. For convenience, the templates may be categorized into different groups or classes. By way of example, the classes/groups may relate to their intended uses, the entity for which the templates are to be used, to the creator of the templates or any other logical grouping of templates. For example, card type 73, can be assigned to one or more predefined card templates, depending on their intended function. For instance, an authoring tool may include one or more card templates, each centric for the display of text, visual media such as photos or images, the playing of video, live or streaming media, application functionality (e.g., scheduling appointments, GPS, etc.), or supporting e-commerce (e.g., displaying products and/or services for purchases, chatting with online sales representative, etc.) respectively. Thus for each template type and class/grouping, card type ID 73 may be assigned.

With the template-based approach, the author(s) of a wrap package 10 can easily select a desired template/card layout that meets their need from a set of available templates and create a new card by readily inserting or otherwise associating the desired content, functionality and/or services into the predefined containers. Such a template based approach can greatly simplify the authoring of cards 14 and wrap packages 10, since the author(s) need not be an expert in HTML, scripting or other typical web page language constructs required in order to create the card(s) 14 as typically required with creating conventional web pages. Rather, those details are embodied in the selected template itself, which translates to a specific layout 75, which in turn is identified by the layout ID 76. When a run-time instance of the wrap package 10 is created, layout 75 is used to format the associated card 14.

The associations between components 16 and their contained content objects 17, whether explicit in the card descriptors, or implicit and anonymous, are sometimes referred to herein as "pins" 80. When explicit, pins 80 are identified in the card descriptors 46 by a universally unique Pin ID 81, and by a symbolic pin name 82. When implicit, pins are anonymous at runtime, but may at design time be instantiated in order to provide operable constructs to the authoring tools, in which case they will share the name and ID of the component they bind and associate.

Whether implicit or explicit, these conditions are equivalent, and one representation may be trivially transformed into the other and vice versa, with no loss of meaning. The runtime, authoring environment and other tools are free to transform the object graph as they see fit, and whether the association is treated as intrinsic or extrinsic is irrelevant for the purposes of the determination of the structure of the wrap and its contents, this transformation being a matter of convenience.

The symbolic name of a pin (pin name 82) or component is both Human and Machine-Readable, for example, "Headline", "Glyph", "Body", "Image", "Video", "Cul-de-sac", or any other heading that the template designer deems appropriate. The symbolic name is used to identify its function; can be used and bound to by constraints and layouts to further constrain their display, behavior and function; and is used by the authoring tools to identify the role of the thus-associated component and map fields from one layout to another when changing the layout associated with a card. Multiple pins or components can share the same symbolic name. When they do, it implies that they serve the same role in the system, and that the same rules will apply to them.

Components 16 contain there associated content 17 and may also contain or reference zero or more attributes or constraint objects, specifying metadata to manage or modify the display of, or behavior of, that component. Constraint objects may specify abstract symbolic data used by the runtime to determine how to display or manage the object containing it, (the Constrained Object) or the behavior of that object. Examples of such abstract symbolic data are CSS class names, behavior names, or other symbolic names acted on by other objects in the system. Constraints may also contain concrete specifications to modify the display or behavior of the object, or its container or any contained objects. An example of the former is containing CSS rules applied to the content. An example of the latter is inclusion inline or by reference of JavaScript code that acts on the constrained object.

The various constraint objects may be thought of as attributes that define the style, format, behaviors, source/feed, and/or constraints associated the corresponding content 17. In the illustrated embodiment, these attributes include style attributes 86, source attributes 87 and other constraint objects such as behaviors 60, 62. Of course, other attributes of a component can be defined and declared as appropriate for the associated content.

The style attributes associate various styles with the content 17 and may take the form of style sheets (e.g. CSS) or other conventional style definition mechanisms. By way of example, if the content 17 is a text string, the style attributes 86 may include features such as the font, size, case, color, justification, etc. of the text. If the content is a glyph, the style attributes may include the color of the glyph, the size, etc.

The source attributes 87 indicate the source of the associated content 17. In some circumstances, the source attribute may simply be a reference or pointer (e.g. a URL) that identifies the location of a static content object (e.g., an image, a photo, a video, etc.). However, it should be appreciated that the content can also be dynamic. For example, the content object associated with a component of a wrap could be the current price of a particular stock. In such a case, the source attribute identifies the feed from which the current price will be retrieved when the card is rendered.

The ability to incorporate feeds into a wrap is a powerful construct that facilitates a wide variety of different functionalities including the dynamic updating of information presented in a wrap after the wrap has been rendered. In general, a feed is a structured source having content that can be dynamically updated after the wrap has been rendered. As will be appreciated by those familiar with the art, there are a wide variety of different types of feeds and different feed structures. For example, a live streaming feed may present a live stream that is progressively rendered as the stream is received. Examples of live streams include live video streams, audio streams, biometric streams, stock ticker streams, etc. Other feeds are server side event driven as is commonly used to facilitate live updates—as for example, sports score updates, stock price updates, etc. Still other feeds are polling feeds in which the wrap periodically polls a source.

The source attribute 87 may take the form a feed descriptor that defines the nature and structure of the feed as well as its feed characteristics including source location, data format(s), update semantics, etc. For example, some feeds (e.g. live feeds and live update feeds) require that a socket be opened and kept open as long as the feed is active. Polling feeds require the identification of the desired polling frequency. In other embodiments, the source attribute may include a reference to a feed object (note shown) that defines the feed.

It should be appreciated that there are a very wide variety of different types of information/content that a wrap author may desire have updated dynamically while a wrap is being displayed. These might include items that may be expected to update frequently and others that may update very slowly.

By way of example, a few examples of items that may be desirable to update dynamically include sports scores, stock prices, the number of tickets still available for purchase for an event, number of units of a product that are available or simply an indication of whether a product is in our out of stock, breaking news headlines, etc. A number of services can also benefit from the ability to dynamically update content based on information that can change while a wrap is displayed such as, the user's geographic location, social networking group information (e.g. friends or peers that are nearby, online, etc.), featured information, etc. For example, a card in a wrap for a sports stadium could show the nearest concession stands, restrooms, etc. which can vary as the user roams around the stadium. Another card could show the stats of a baseball player currently at bat. A social networking card may inform a user when their friends or others sharing similar interests are nearby. A retailer may wish to run special offers that update periodically. Of course, these are just a few examples. The types of content that an author may wish dynamically update is limited only by the creativity of the author. Other constraint objects may include declarations of specific behaviors that are intended to be associated with the component 16 and/or content 17. Such behaviors may include behaviors 60, 62 known to or accessible by the runtime viewer 50 as discussed above.

FIG. 6A diagrammatically illustrates an alternative pin based card descriptor structure 46A. Appendix II of U.S. Provisional Application No. 62/133,574 illustrates a representative wrap descriptor 40A that takes the form of a JSON object that utilizes the pin based card descriptor structure 46A illustrated in FIG. 6A. FIGS. 14A-14E illustrate the wrap defined by the wrap descriptor of Appendix II of the referenced provisional. To facilitate correlation between the Appendix and FIG. 6A, various descriptor elements are labeled with corresponding reference numbers in Appendix II of the referenced provisional.

In the embodiment of FIG. 6A, the card descriptor 46 includes a unique card ID, 71, a card name 72, card type 73 and a card layout 75. The layout 75 includes a layout ID 76, optionally a layout name 77 and an explicit layout definition 78. In the illustrated embodiment, the layout definition takes the form of style sheets (e.g., cascading style sheets (CSS)). Although the illustrated embodiment includes both the layout ID 76 and an explicit layout definition 78, it should be appreciated that either could be eliminated from the descriptor if desired. For example, if the explicit layout definition is not part of the descriptor structure, it could be accessed through the use of the layout ID. Alternatively, when the layout definition 78 is explicitly provided, the explicit use of the layout ID 76 may be eliminated. However, it is generally preferable to explicitly provide the layout ID.

The descriptor 46A also includes an array of zero or more pins 80, with each pin 80 corresponding to a first level component 16. Each pin 80 includes a pin ID 81, a pin name 82 and an associated component 16. The component 16 includes a component ID 88, a component type 89, and the component content 17. As indicated above, the content may be provided in-line or by reference. Any desired attributes and behaviors may then be associated with the component through a set of zero or more component attributes 86 which potentially include any desired component style class declarations 91, component style sheets (CSS) 93 and component behavior declarations 95. In the illustrated embodiment, the style class declarations 91 refer and bind to CSS classes defined in the layout definition 78 that are used to define the format of the associated component 16. Numerous examples of this binding can be seen in the Appendix II of the referenced provisional. By way of example, the first pin 80(1) in Appendix II has an associated component style class declaration 91(1) that refers to and binds the font size style "font size-x1" 96 defined in layout 78 to the associated text content 17(1).

Component style sheets 93 provide an alternative component level mechanism for associating specific styles and formatting with a component 16. In general, it is expected that the card layout definition 78 will define the styles and formats associated with each component in a robust manner that is satisfactory to the card author. In such implementations, there is no need to include any component level style sheets 93, and it is expected that in many (indeed most) such card implementations, no component style sheets would be provided. Rather, the associated styles may be bound through the use of class declarations 91. However, the component style sheets 93 provide a mechanism by which the style assigned to the component by the layout definition 78 may be overwritten, which gives card authors great flexibility in defining the stylistic presentation of their content without altering the card layout definition. In other implantations, it may be desirable to define some of the style attributes at the component level rather than the card level. In such implementations more aggressive use of component level style sheet 93 would be expected. In still other embodiments, the availability of component level style sheets can be eliminated altogether. In the illustrated embodiment, style sheet are used to assign styles to the components since they are currently a popular format for associating different styles with HTML content. However, it should be appreciated that other now existing or later developed constructs can readily be used to associate styles with the content as appropriate.

Behaviors 60, 62 can be associated with a component on the component level in the same manner as the style sheets. This can be accomplished, for example, through the use of behavior declarations 95 which declare specific behaviors 60, 62 with their associated component. It should be appreciated that the ability to associate specific behaviors with specific components in a general manner provides tremendous flexibility in the card creation process that facilitates the creation of cards having an incredibly wide range of functionality and behaviors while maintaining a simple, compact, and highly portable wrap structure. Even though there is an ability to associate behaviors with specific components, it is expected that the behavior set may be null for many components because they would have no need to have any specific behaviors associated therewith.

The card descriptor 46A also associates any desired card level attributes and/or behaviors with the card through a set of zero or more attributes 86C that are associated with the card at the card level. Like the component attributes 86, the card attributes 86C potentially include any desired card level style class declarations 91C, card level style sheets 93C and/or card level behavior declarations 95C which work in substantially the same way as the component attributes, except that they operate at the card level. When desired, the wrap descriptor 40 can also have similar wrap level attributes 86W. Similarly, when the content of a component includes one or more subcomponent(s), the various subcomponent(s) may have their own associated component attributes 86 regardless of the tier of the component/subcomponent. Still further, when desired, attributes can be associated with groups of components.

FIG. 6B diagrammatically illustrates an alternative card descriptor structure 46B that does not utilize pins 80. The structure of card descriptor 46B is generally similar to the structure of card descriptor 46A described above with respect to FIG. 6A except for the use of pins. Therefore, the attributes (e.g., styles and behaviors) are associated with their corresponding components 16 rather than with pins 80. Like in the embodiment of FIG. 6A, the card descriptor 46B includes a card ID 71, a card name 72 and a layout 75. The layout 75 includes a layout ID 76, layout name 77 and layout definition 78. The descriptor then includes an array of zero to many components 16.

Each component 16 includes a component ID 88, a component name 84, a component type 89, the associated content 17 and the associated attributes 86. Like in the previously described embodiment, the associated attributes may include associated classes 91, component style sheets or definitions 93, behavior declarations 95 and/or their associated behaviors 60, 62. Thus it can be seen that card descriptors 46B are functionally substantially equivalent to the card descriptors 46A described above.

Appendix III of U.S. Provisional Application No. 62/133, 574 illustrates a representative wrap descriptor 40B that takes the form of a JSON object that utilizes the component based card descriptor structure 46B illustrated in FIG. 6B. To facilitate correlation between Appendix III and FIG. 6B, various descriptor elements are labeled with corresponding reference numbers in the Appendix. It is noted that the attributes container 86 is labeled "Styles" in the JSON code of Appendix III.

Although only a few particular card descriptor structures have been described, it should be appreciated that equivalent functionality can be obtained using a wide variety of different descriptor arrangements.

Gallery Card Descriptors

FIG. 6C illustrates a representative gallery card descriptor 46G. The illustrated embodiment uses the component based descriptor approach of FIG. 6B although it should be appreciated that other card descriptor hierarchies (such as those illustrated in FIGS. 6 and 6A can be used as well. Gallery card descriptor 46G includes card ID 71G, card name 72G (in this case "Gallery Card"), and card layout 75G with layout ID 76G, layout name 77G and CSS layout definitions 78G, which together define a layout suitable for a gallery card. The initial component is gallery component 16G, which has a component ID 88G, a component name 84G, a component type 89G, gallery component content 17G, and any associated attributes 86G (including class declarations 91G, style sheets 93G and behavior declarations 95G).

In the illustrated embodiment, both the component name 84G and the component type 89G are "Gallery." The "content" of the gallery component 16G is a set of one or more gallery item components 116. Each of the gallery item components 116 typically, although not necessarily, has the same component structure previously described and can be thought of as subcomponents. This introduces a powerful feature of the described architecture. That is, the "content" of any particular component may be one or more "subcomponents". Similarly, the content of any of these "subcomponents" may also include one or more next tier components and so on, with the components at each tier having the same generic structure. Thus, each gallery item component 116 includes: a component ID 88, which may be thought of as a gallery item ID; a component name 84, a component type 89, content and any associate attributes 86 (potentially including class declarations 91, style sheets 93 and behavior declarations 95).

In the illustrated embodiment, the component name 84 and component type 89 for the gallery item 116 is "Gallery Item". The content of the gallery item 116 is a set of components (subcomponents) that make up the gallery item (that is, gallery items 116, which are subcomponents of the gallery component 16G, themselves have subcomponents which might be thought of as third tier components). Each of these gallery item components has the same structure as any other component. By way of example, the gallery item components may include a headline component 16H, and an image component 16I (shown in Appendix III of U.S. Provisional Application No. 62/133,574). Only the headline component 16H is shown illustrated in FIG. 6C, but the corresponding JSON descriptor is shown and labeled in Appendix III.

With the described structure, specific behaviors or styles can be associated with components at any level. Thus, for example, a behavior can be associated at the card level, the gallery item level, the component of a gallery item level or at any other level at which components are used. An example of a card level behavior might be the aforementioned gallery card "snap to item" behavior 60C, which can be seen in the aforementioned Appendices I, II and III. An example of a gallery item subcomponent level behavior might be a trigger as described below.

Although a particular gallery card descriptor structure has been described, it should be appreciated that equivalent functionality can be obtained using a wide variety of different descriptor arrangements.

Trigger Descriptors

Referring next to FIG. 6D, a descriptor structure for a representative trigger component will be described. Like other components, the trigger component 16T includes an optional trigger component ID 88T, a component type 89T, a component name 84T, content 17T and any associated attributes 86T (including any class declarations 91T, style sheets 93T and behavior declarations 95T). In the illustrated embodiment, the component type 89T is labeled "trigger" and the component name 84T is labeled "transact" indicating that the trigger is a transaction trigger.

The content 17T of the trigger component 16T in this illustrative example includes three subcomponents. The subcomponents include a text box 16Tr, an image 16TI that takes the form of a "buy button" and a link 16L. The link 16L has an associated behavior "open-in-new-tab", which causes the browser to open the target URL in a new tab when the trigger is activated by tapping on a touch sensitive display anywhere within the region defined by the trigger or by otherwise activating the trigger. The described link trigger behavior is a good example of a component level behavior.

In the illustrated embodiment, the link component 16L is a first level component of the trigger and therefore the link is activated by tapping on (or otherwise selecting) any component within the trigger—as for example either the text box 321 or the buy button 327. If the card creator preferred to have the link activated only by selection of the buy button 327, that can readily be accomplished by making the link 327 a component of the buy button rather than a first level component of the trigger—or, by moving the text box component definition out of the trigger—as for example to the same component level as the trigger itself. Any tap or click in the bounding rectangle of the trigger, as defined by the components contained by the trigger, results in the trigger being activated.

It should be apparent that the trigger component may be included as a first tier component in the card descriptor or as a subcomponent at any level within the card descriptor hierarchy. Although a particular trigger descriptor structure is illustrated, it should be appreciated that equivalent functionality can be obtained using a variety of different descriptor arrangements. It should further that FIG. 6D is illustrative for providing an example for the purchase of an item for sale. It should be understood, however, the cards can be authored with triggers for a wide variety of actions besides purchasing an item, such as the reservation or booking of goods and/or services, online chats, GPS related services and functionality, etc.

Feed Descriptors

As indicated above, there are a wide variety of different types of feeds and feed structures that may be desirable to incorporate into any particular wrap. To facilitate the use of feeds, any wrap descriptor 40 or individual card descriptor 46 may include one or more feed descriptors. As described below, each feed descriptor has a number of descriptive elements that together define an associated feed in a manner that can be used by the runtime to integrate information from the feed into a rendered wrap instance in the manner desired by the wrap author.

Figure 6E:
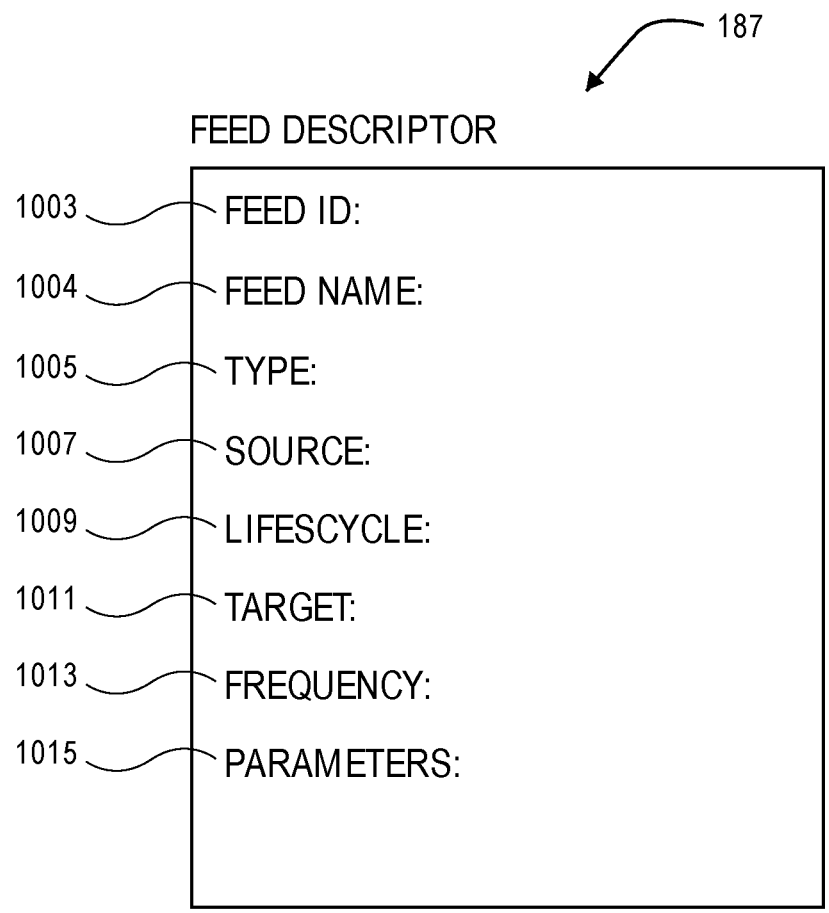
FIG. 6E is a diagram illustrating a feed card in accordance with another non-exclusive embodiment of the present invention.

Referring next to FIG. 6E, a representative feed descriptor 187 in accordance with a nonexclusive embodiment will be described. In the illustrated embodiment, the descriptive elements of feed descriptor 187 include a feed type 1005, a feed source 1007, a desired lifecycle 1009, a feed target 1011, an update frequency indicator 1013 and any required feed parameters 1015. Of course, not all of these descriptive elements are required in every feed descriptors and any particular feed descriptor may include one or more additional descriptive elements as appropriate. The feed descriptor 187 may also optionally include a feed ID 1003 and/or a feed name 1004.

The feed type 1005 indicates the type of the associated feed. In general, most feeds can be categorized into categories or "types" that share similar traits and/or requirements. As previously discussed, some of the feed types might include "live" (server side event driven) feeds, polling feeds, streaming video feeds, streaming audio feeds, etc. When the feed descriptor is processed by the runtime, the feed type can be used to help identify the resources that may be required to support the feed. For example live streaming feeds and server side event driven feeds may require the opening of a socket for the feed and keeping the socket open for the duration of the defined feed lifecycle 1009.

The feed source 1007 indicates the location from which the feed can be obtained. Often, the feed source 1007 takes the form of a URL, although other endpoints or source identifiers may be used in alternative embodiments.

The lifecycle 1009 indicates the feed's lifecycle semantics. That is, when and how the feed in activated, the conditions under which it remains active and potentially, when it is closed. For example, a few potential lifecycles might include: (a) "while-card-visible" which opens the feed when that associated card is displayed and keeps the feed active as long as the associated card is the visible card within the wrap; (b) "always" which opens the feed when the associate wrap is rendered and keeps the feed active as long as the wrap is displayed; (c) "on-card-open"—which activates a feed any time the wrap transitions to the associated card; (d) "on-wrap-load" which opens the feed when the wrap is loaded; (e) "on-user-selection" which opens and/or updates the feed in response to a user input (e.g., the selection of a displayed button or other user activated trigger). Some of the lifecycles, such as "while-card-visible" and "always" may be more appropriate for live and streaming feeds, or feeds that affect globally-visible wrap state (e.g. in a globally visible sports score ticker or stock ticker) whereas others, such as "on-card-open" or "on-wrap-load" may be more appropriate for polling feeds. Which type of feed is most appropriate is highly context-dependent, and will be determined by wrap authors.

In addition, the lifecycle 1009 may optionally include functionality to terminate the feed. In accordance with various embodiments, the termination may occur in any number of ways. For example, the feed may "time-out" after a predetermined period of time or manually in response to an input from the viewer of the wrap. For example, if the viewer closes and is no longer consuming the wrap, then the feed may be terminated. Alternatively, the feed may automatically terminate 10 minutes after a baseball game that is being streamed has ended. Again, these are just a few examples. The terms and/or conditions for termination of a feed may widely vary.

The target 1011 indicates the callback endpoint for the feed—which may be the method to call when an event happens. In many implementations, the target will be a container within the wrap that the feed is to be associated with. In many circumstances, the intended container will be the component or other structure (e.g., card/wrap) within which the feed descriptor 187 is defined within the wrap descriptor 40. That is, when the feed descriptor 187 is included as part of a particular component definition, it might be assumed that the feed is intended to be bound to that particular component. Alternatively, if the feed descriptor 187 is included as part of a card descriptor 46 outside of any of the associated component descriptions, it might be assumed that the feed is intended to be bound to the associated card. Still further, if the feed descriptor is included as a part of a wrap descriptor 40 outside of any of the associated card descriptors 46, it might be assumed that the feed in intended to be bound to the wrap as opposed to any particular card or component.

The frequency 1013 is particularly relevant to polling feeds and indicates how often the feed should be polled. In some circumstances it will only be desirable to poll the feed once—e.g., when the associated card is opened, which can be uniquely defined by the combination of Lifecycle: on-card-open and Frequency: once. In other circumstances it may be desirable to periodically poll the feed, as for example, every minute, every 15 seconds, every 5 minutes, etc. In still other circumstances it may be desirable to poll when the card or wrap is first opened and thereafter only poll in response to user inputs or other events, as for example in response to the user selection of an "update" button (not shown). Of course, a very wide variety of other update rules can be defined through the use of different frequency and lifecycle constraints, and the feed may itself update the polling frequency for subsequent reads, over the life of the interaction.

Some feeds may require the passing of specific parameters to the server that may be used by the server for various control, tracking or authentication or other purposes. Feed parameters 1015 can be used to pass such parameters to the feed server. In the illustrated embodiment, the feed parameters take the form of name/value pairs although other data structures can be used in other embodiments. In some circumstances, the feed parameters 1015 may be static and explicitly included in the wrap descriptor. For example, if a card employing a feed is associated with a particular ad campaign, it may be desirable to identify the ad campaign through the use of campaign identifier passed a feed parameter. In other circumstances the feed parameters may be variables. For example, a card arranged to provide current MLB scores sports may use team identifier parameters to identify the teams of interest to the user, with the user being given the ability to select the teams of interest—as for example, through a menu of teams provided on the card. Of course the specific parameters that are appropriate for any given feed and the manner in which the parameters are obtained may vary widely and will often depend in large part on the APIs associated with the feed.

Maintaining State Information

In many circumstances it may be desirable to transitorily or persistently maintain state information associated with a user of a wrap 10 and/or state information associated with a wrap 10. Some information, such as general information about the user, may be shared state information that is relevant to a number of different wraps. Other state information may be specific to a particular wrap (e.g., a particular user selection or input within a wrap, etc.). Still other relevant state information can be more global state information that is relevant to all instances of a particular wrap independent of the specific user.

State information can be stored in a number of ways and the appropriate storage techniques will vary in part based on the nature of the state information. By way of example, general information about a user and other user specific shared state data can be maintained in a cookie, or when the user has a persistent viewer application, the user state information can be persistently stored locally in association with the viewer application. If desired, any or all of the shared state information can also be stored on the server side. The shared state information may be useful to support a wide variety of different services including: user login and/or authentication; e-commerce applications where the identity, contact info, mailing address, credit card information etc. of the user may be necessary; integration with other applications (e.g. a calendar application, a chat application, etc.); and many other services. User specific shared state information can also be used to affect the navigation within a wrap. For example, user demographic information can be used to determine which card to display next in a set of cards.

There are also a variety of circumstances where it will be desirable to persistently maintain state information about the state of a particular wrap. For example, if a card includes a dialog box that receives a user selection or a textual input, it may be desirable to persistently store such selections/inputs in association with the wrap itself so that such information is available the next time the wrap is opened by the same user (or same device).

In a nonexclusive embodiment, a state descriptor 68 is created and used to maintain state information associated with a particular wrap as illustrated in FIG. 5B. The state descriptor 68 is associated with both a specific wrap and a specific user and thus can be used to store state information relevant to that specific user's interaction with the wrap. When persistent state descriptors are used, the state descriptor 68 may be stored with the wrap on the publication server 22. When the user has a persistent viewer application, the state information can additionally or alternatively be stored locally in association with the viewer application either in the state descriptor form or in other suitable forms. Generally, a state descriptor 68 will include a wrap ID 42 and a user ID that identify the wrap and user that the descriptor is associated with respectively. The state descriptor 68 also stores the relevant state information in association with the card and component IDs for which the state information applies.

In certain embodiments, it may also be desirable to synchronize different instantiations of state information, depending on the where the state information is stored. For example if a user updates their credit card or shipping address information at a publication server 22, then the corresponding state information residing within any particular wraps associated with the user, or within a persistently stored wrap viewer residing on a communication device belonging to the user, would preferably automatically be updated. Conversely, any state information locally updated within a wrap and/or a persistently stored viewer would also selectively be updated in any other instantiations of the state information, such as but not limited to, other wraps, publication servers 22, on a network, or any other remote data processing location for example.

Authoring Tool

Wrap packages 10 are composed by authors 34 using an authoring tool 100. In various embodiments, the authoring tool may operate in a desktop computing environment or a mobile communication environment, such as on a mobile or cellular phone, a tablet, or other mobile device, such as a laptop computer.

Referring to FIG. 7, an exemplary "home screen" 102 of a computing device running the authoring tool 100 is illustrated. In this example, the home page includes a number of existing wrap packages 104A through 104N. For each wrap package 104, options are provided to "Copy", "Preview", "Edit" and "Share". By selecting any of these options, the corresponding wrap package 104 may be copied, previewed, edited or shared respectively.

For the purpose of explaining the operation of the authoring tool 100, the authoring of a new wrap package is described below. By selecting a "New Wrap" icon 106 appearing within the home screen 102, an author can begin the process of authoring a new wrap package.

Figure 8:
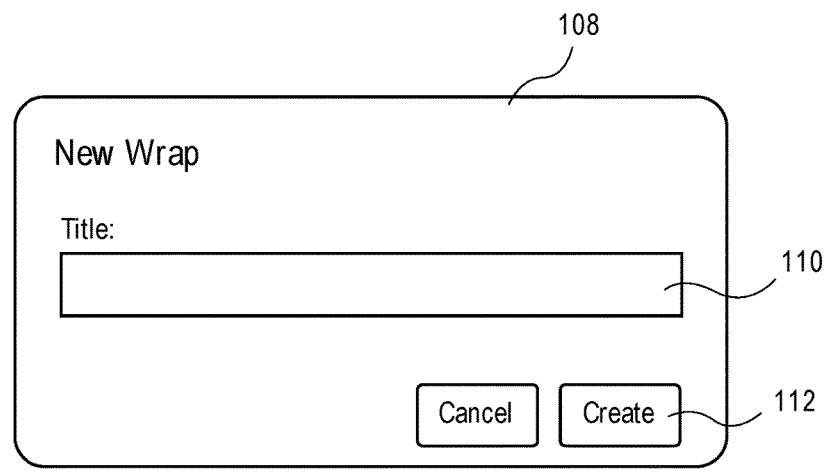
FIG. 8 illustrates an exemplary window for defining a title for a new wrap to be authored according to a non-exclusive embodiment.

Referring to FIG. 8, a window 108 for assigning a title for the new wrap appears on the screen of the computing device running the authoring tool 100 after the icon 106 is selected. Within this screen, a text field 110 is provided for entering an appropriate name or title for the new wrap package. Once the title has been entered, the author 34 selects the "Create" icon 112 to begin the authoring process for the new wrap package.

Figure 9:
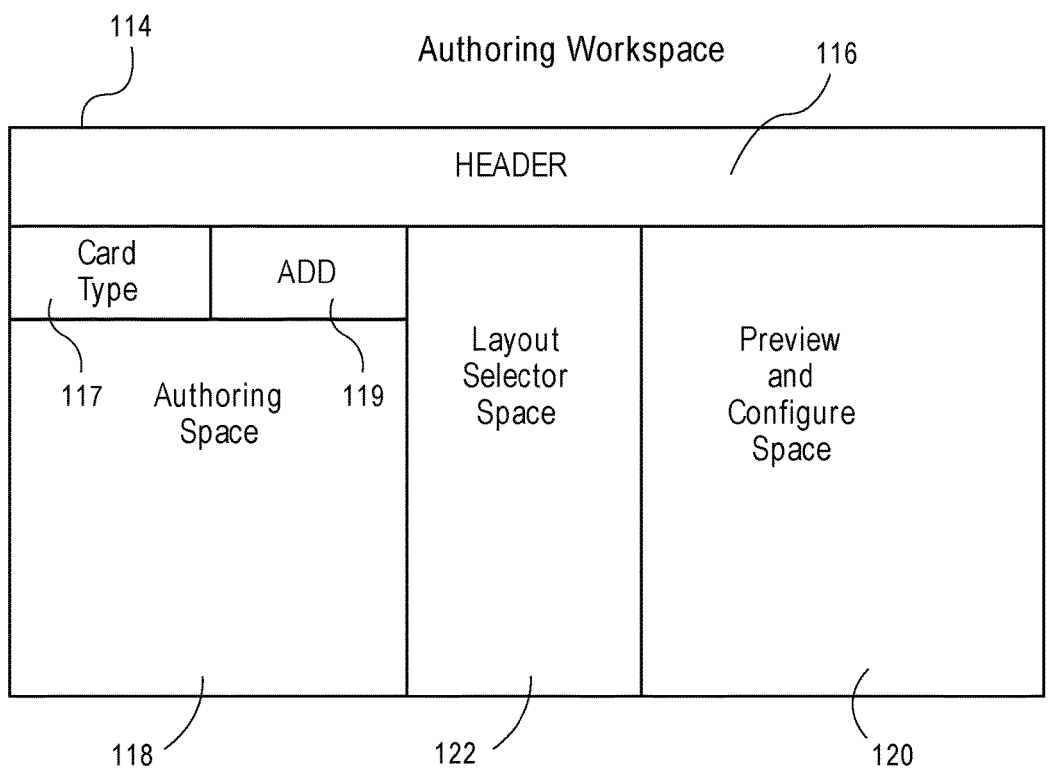
FIG. 9 illustrates a non-exclusive embodiment for an authoring workspace space for the authoring of wrap packages using the authoring tool of the present invention.

Referring to FIG. 9, an exemplary authoring workspace 114 is shown, which appears on the display screen of the computing device executing the tool 100 after the title for the new wrap has been defined. Within the workspace 114, the author 34 is provided a work area and a set of tools for the composing of wrap packages.

The workspace 114 includes a header field 116, a card type selector field 117 for specifying the type of card to be authored, an authoring space 118 for defining the components and content of cards the of the wrap package as they are authored, an add component field 119 for adding component(s) to the cards appearing in the space 118, a preview and configure space 120 for previewing and configuring the card defined in the authoring space 118, and a layout selector space 122 for defining various card templates used for creating and configuring the various card types of the wrap package.

Figure 10A:
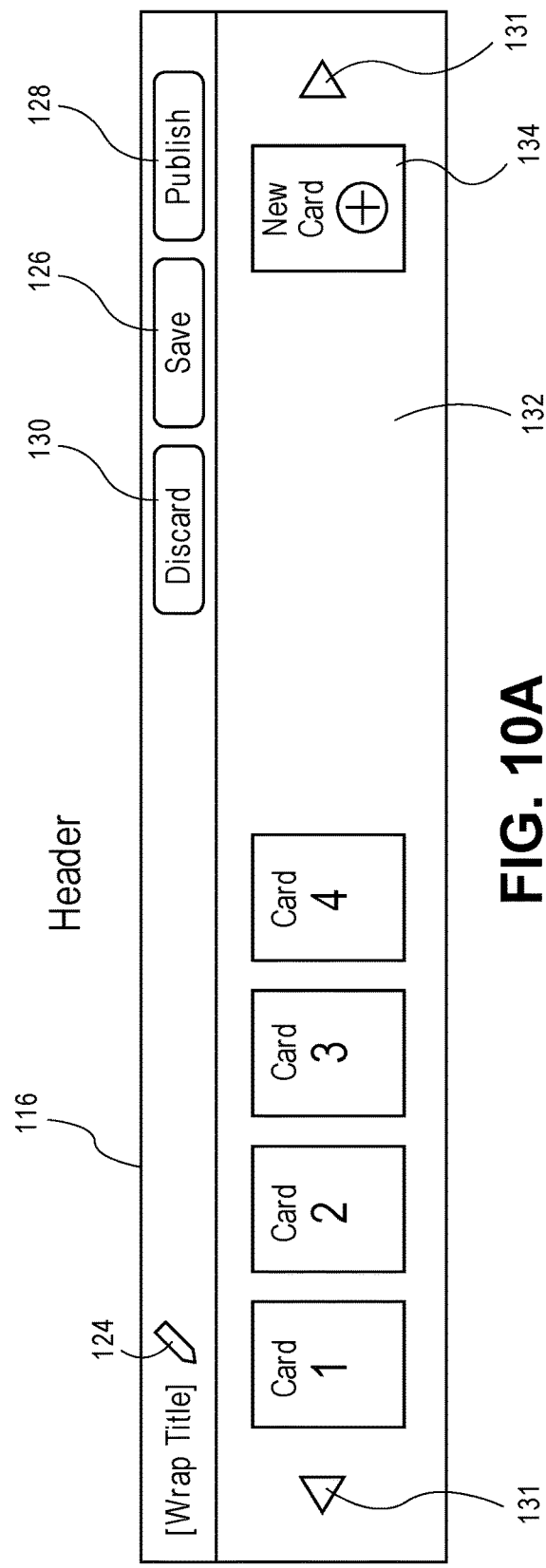
FIGS. 10A through 10C illustrate a header of the workspace for the authoring of wrap packages using the authoring tool of the present invention.
Figure 10B:
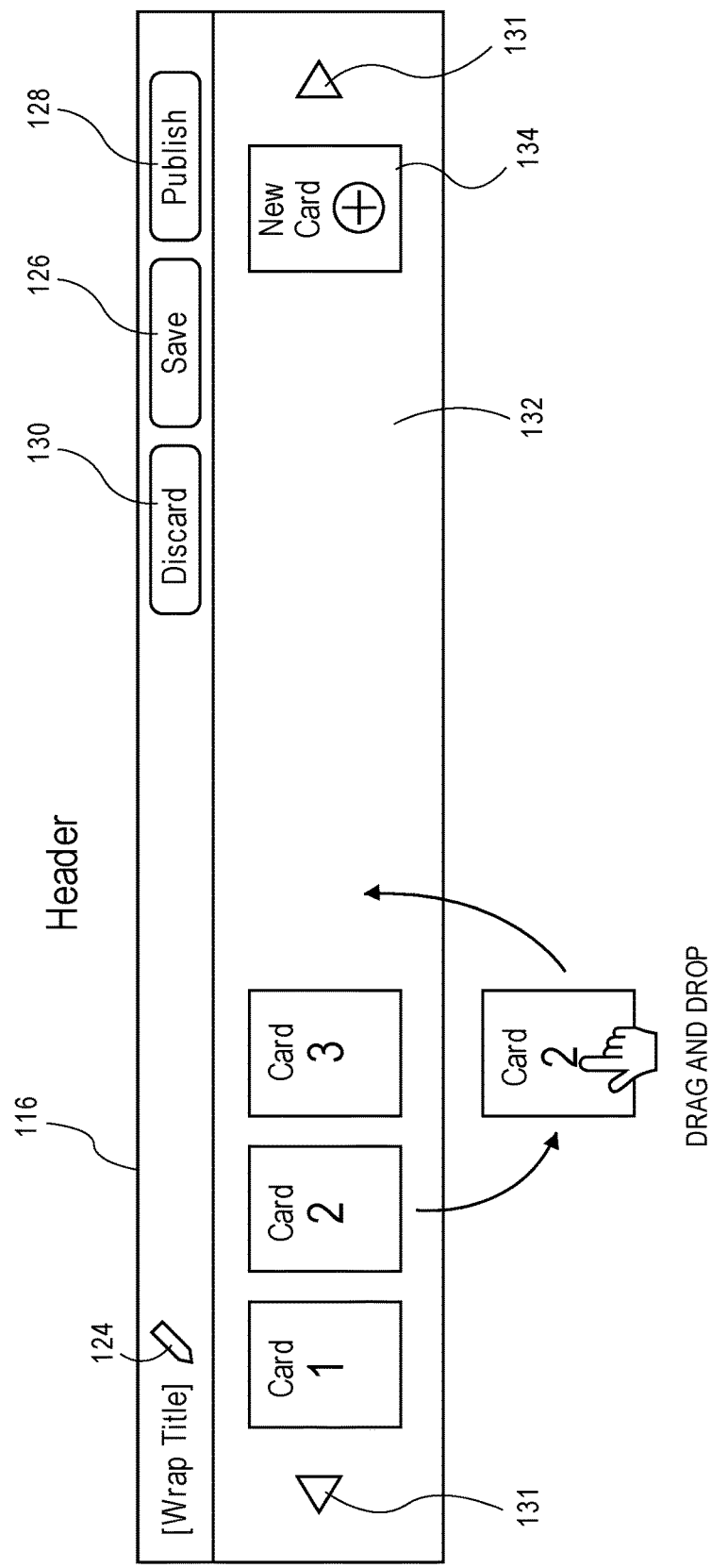
Figure 10C:
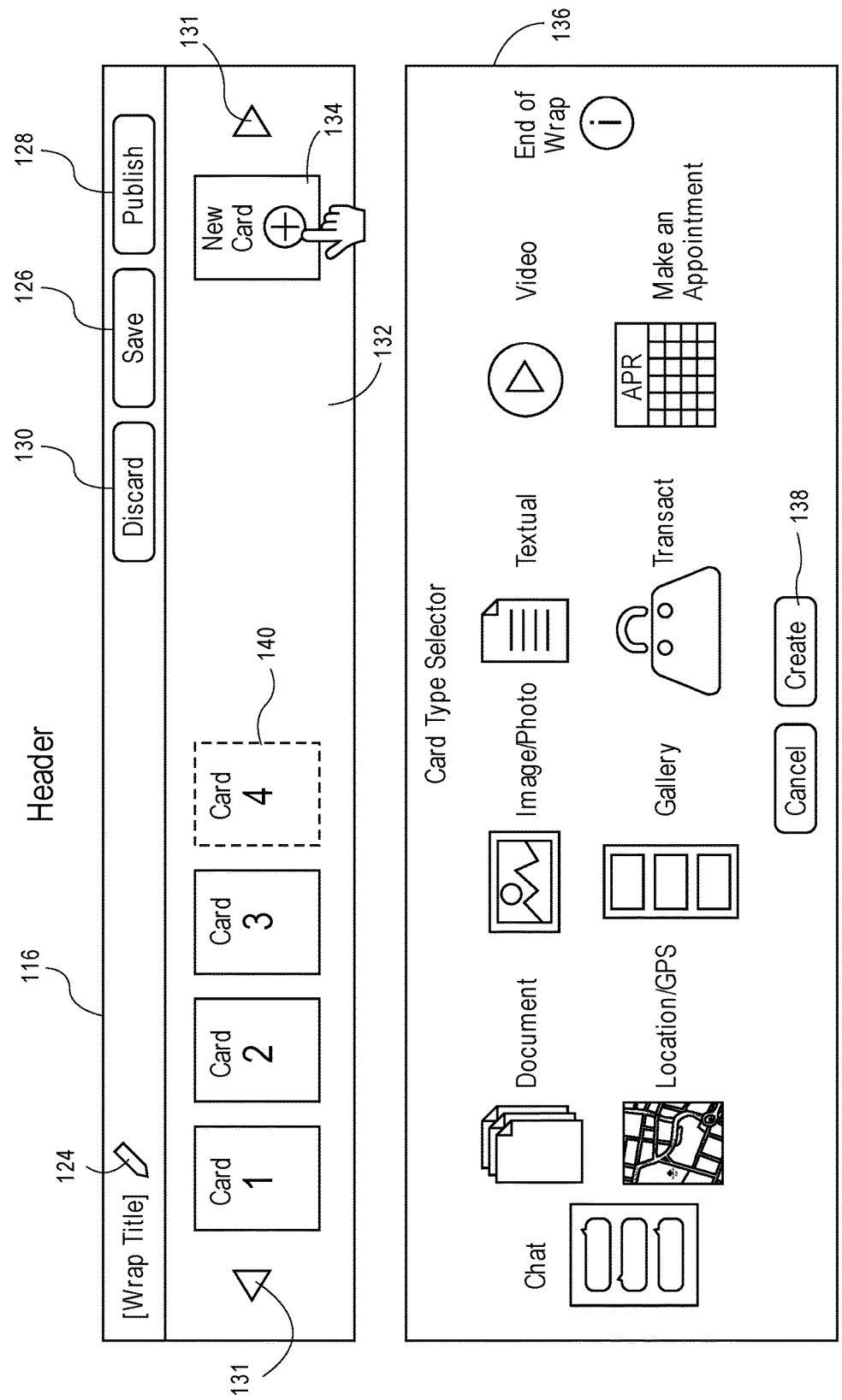

Referring to FIGS. 10A through 10C, features of the header field 116 of the workspace 114 are illustrated.

As shown in FIG. 10A, the header field includes the previously defined title of the wrap package 10, a title editing tool 124 for revising or changing the title of the wrap package, a save tool 126, a publish tool 128, and a discard tool 130. The tools 126, 128 and 130 are respectively used for saving, publishing and discarding cards 14 of the wrap package 10 as they are authored.

The header field 116 also includes a card sequencing space 132. Within this space 132, the author can arrange the cards and define the one or more linear sequences in which the cards are to be rendered when the wrap package is consumed.

As the individual cards of the wrap package are authored, they are added to the sequencing space 132 in the numerical order (e.g., 1, 2, 3, 4, etc.) in which they are created. In the event the author 34 wishes to re-order the sequence, one of several operations may be used.

As shown in FIG. 10B, an exemplary re-sequencing operation is illustrated. In this particular example, Card 2 is moved after Card 3 using a drag and drop operation. When the operation is complete, the cards are renumbered to reflect their new sequence order. In another embodiment (not illustrated), cards can be copied and pasted. In yet other embodiments, cards can be moved or re-sequenced using any technique.

By moving the various cards to different positions within the space 132, the horizontal sequence of the cards can be arranged in any order as determined by the author 34. In addition, one or more of the cards can also be configured as a gallery card(s), which are navigable in the vertical direction. Thus, by defining (a) any gallery cards in the horizontal sequence in space 132 and (b) the horizontal order of the cards, including any gallery cards, in space 132, the horizontal and/or vertical sequence for rendering the cards when the wrap package is consumed is defined by the author 34.

The header 116 also includes left and right scrolling icons 131. When either the left or right scrolling icon 131 is selected, the cards appearing in the card sequencing space 132 scroll in either the left or right direction respectively. By providing the scrolling icons 131, all of the cards of the wrap package can be viewed, even in situations where the number of cards in the wrap package are too numerous to conveniently all fit into the sequence space 132 at the same time. The scrolling icons 131 thus allow the author 34 to navigate, view and edit all of the cards of the wrap package.

As illustrated in FIG. 10C, the header 116 also includes a "New Card" tool 134. When the author selects this tool, two actions occur. First, a new card 140 is created in space 132. Implicitly, the new card 140 appears next in the horizontal sequence order in space 132. However, as noted above, the sequence order of the card can be changed by the author 34 if desired. Second, a new card type selector tool 136, which lists a number of different possible card types, appears. In a non-exhaustive list, the types of cards that are provided within the card type selector tool 136, include, but not limited to, a textual card, an image/photo card, a video card, a gallery card, a document card, a chat card, a transact card, an appointment card, a feed card and an end of wrap card. By selecting any one of these card types, and then the create icon 138, the new card 140 is defined as the selected type.

In this particular example, the new card 140 appears as card 4 in the sequence order. A number of examples are provided below illustrating the authoring of the new card 140 for each of the card types listed above.

Referring to FIG. 11A through 11D, the authoring of an exemplary textual card 140 is illustrated.

Figure 11A:
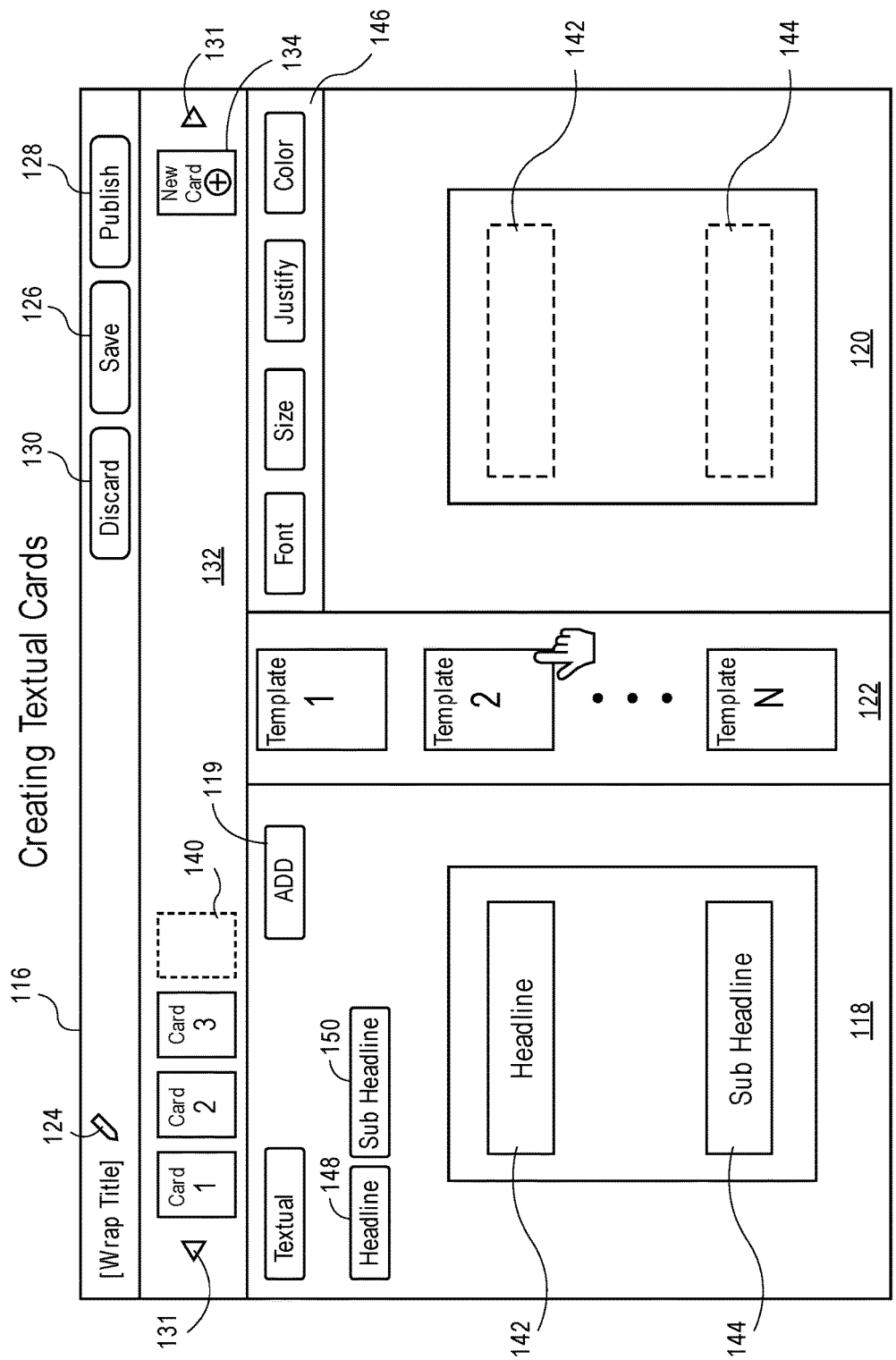
FIGS. 11A through 11C illustrates the authoring of a textual card using the authoring tool of the present invention.

As shown in FIG. 11A, a number of textual card templates are provided in the layout selector space 122. Each of the templates is labeled Template 1, Template 2, through Template N. Each of the various templates includes a different structure and layout. For example, each may include different arrangement of predefined headlines, sub-headlines, and/or components. In this particular example, Template 2 is selected, resulting in a card having the same structure and layout as the selected template appearing in the authoring space 118 and preview and configure space 120. In this particular example, the selected template includes a headline 142 and a sub-headline 144.

Figure 11B:
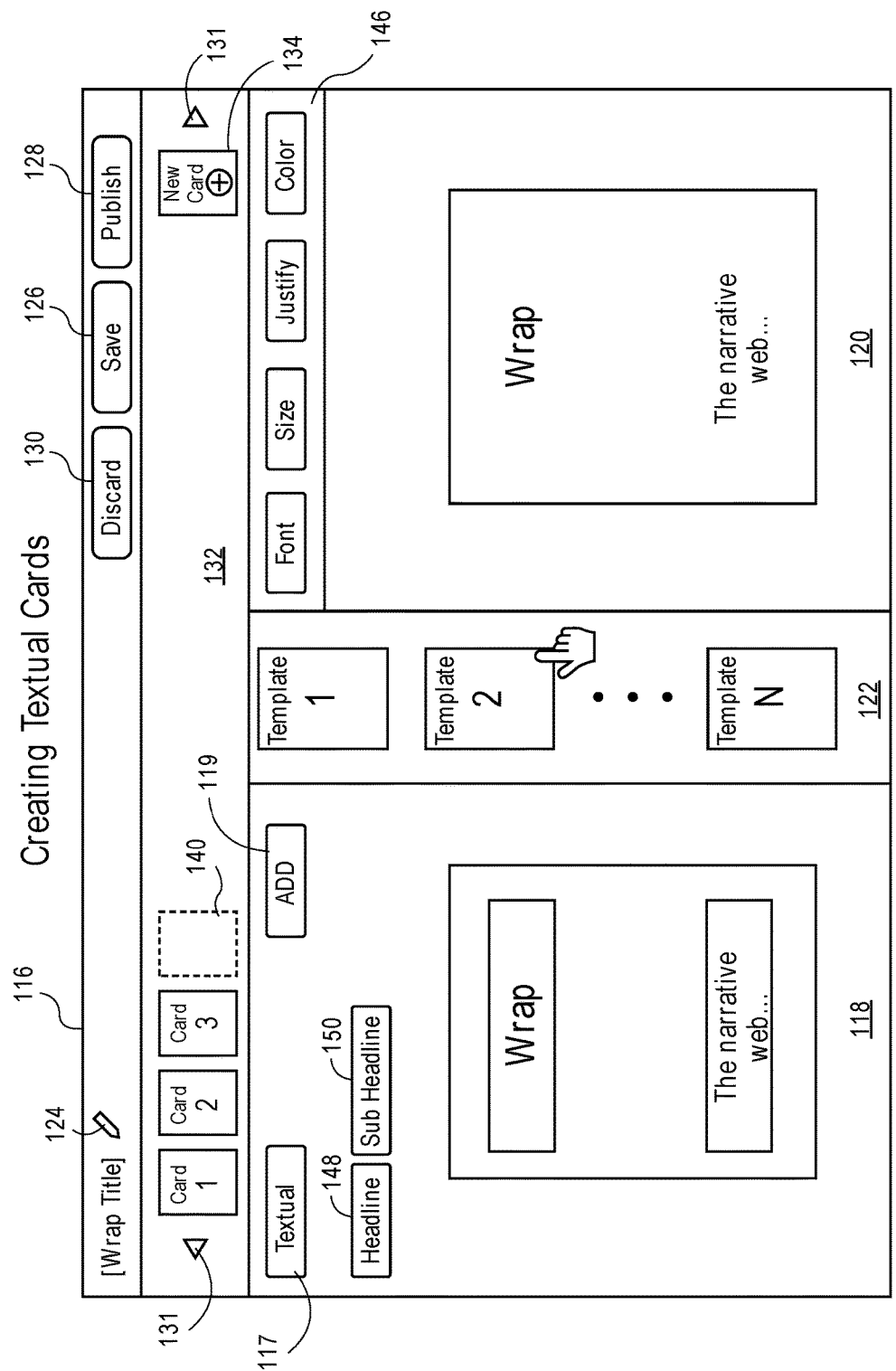

As illustrated in FIG. 11B, the author 34 types text into the headline 142 and the sub-headline 144 within the authoring space 118. As the text is typed, it appears in the corresponding headline 142 and sub-headline 144 of the card appearing in the space 120. In this particular example, the author has typed "Wrap" into the headline component 142 and "The narrative web . . . ." into the sub-component 144. Since this card includes text components, a set of style tools 146 are provided to enable the author to configure the font, size, justification and color of the text contained in the components 142 and 144 respectively. It should be understood, however, that the style tools 146 may optionally not be provided for cards that do not contain text. The style tools 146 are, therefore, not necessarily constrained to all the different card types.

Additional tools, provided in the authoring space 118, enable the author to further modify the selected card template if desired. For example, a headline tool 148 enables the author to modify the card template with another header and sub-headline tool 158 enables the author to create another sub-heading. When either is selected, a text box appears in the image of the cards appearing in space 118 and space 120. The author can then type into the text box(es), similar to that described above. In addition, the text box(es) can be positioned or moved in the image of the card appearing in space 120 to any location desired by the author and the style tools 146 can be used to define the style of the entered text.

Figure 11C:
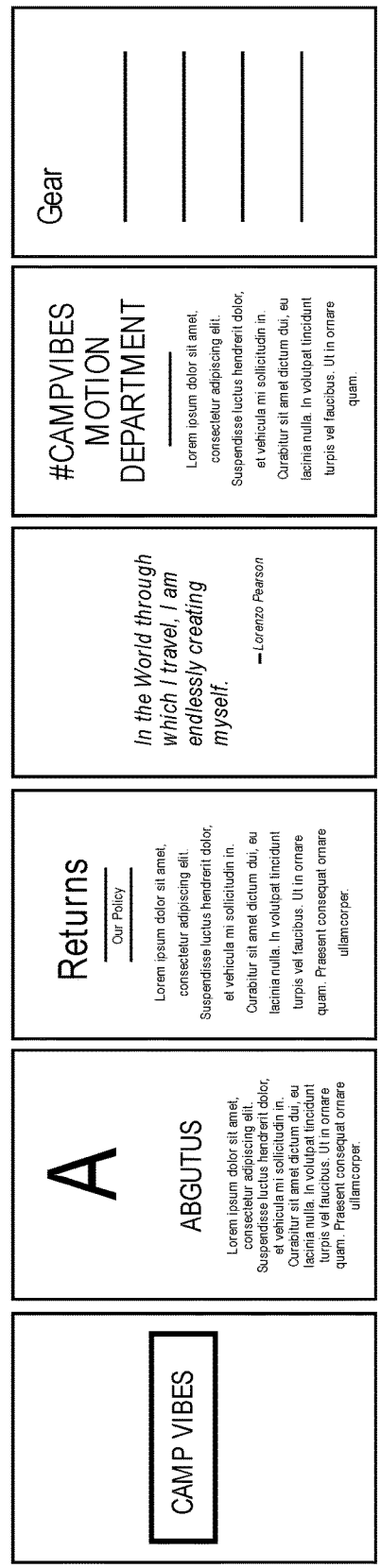

Referring to FIG. 11C, a number of exemplary textual cards are illustrated. In each instance, a different card, each derived from a template with different layouts, structures, headers and/or sub-components, is illustrated. Also in each case, the style tools 146 are available to the author to define the different fonts, sizes, justification and potentially color (not visible) of the text in each of the cards. It should be noted that these examples are not exhaustive. Various templates of different structures, layouts and/or arrangements of components can be used to create an almost infinite number of textual card styles.

Figure 12A:
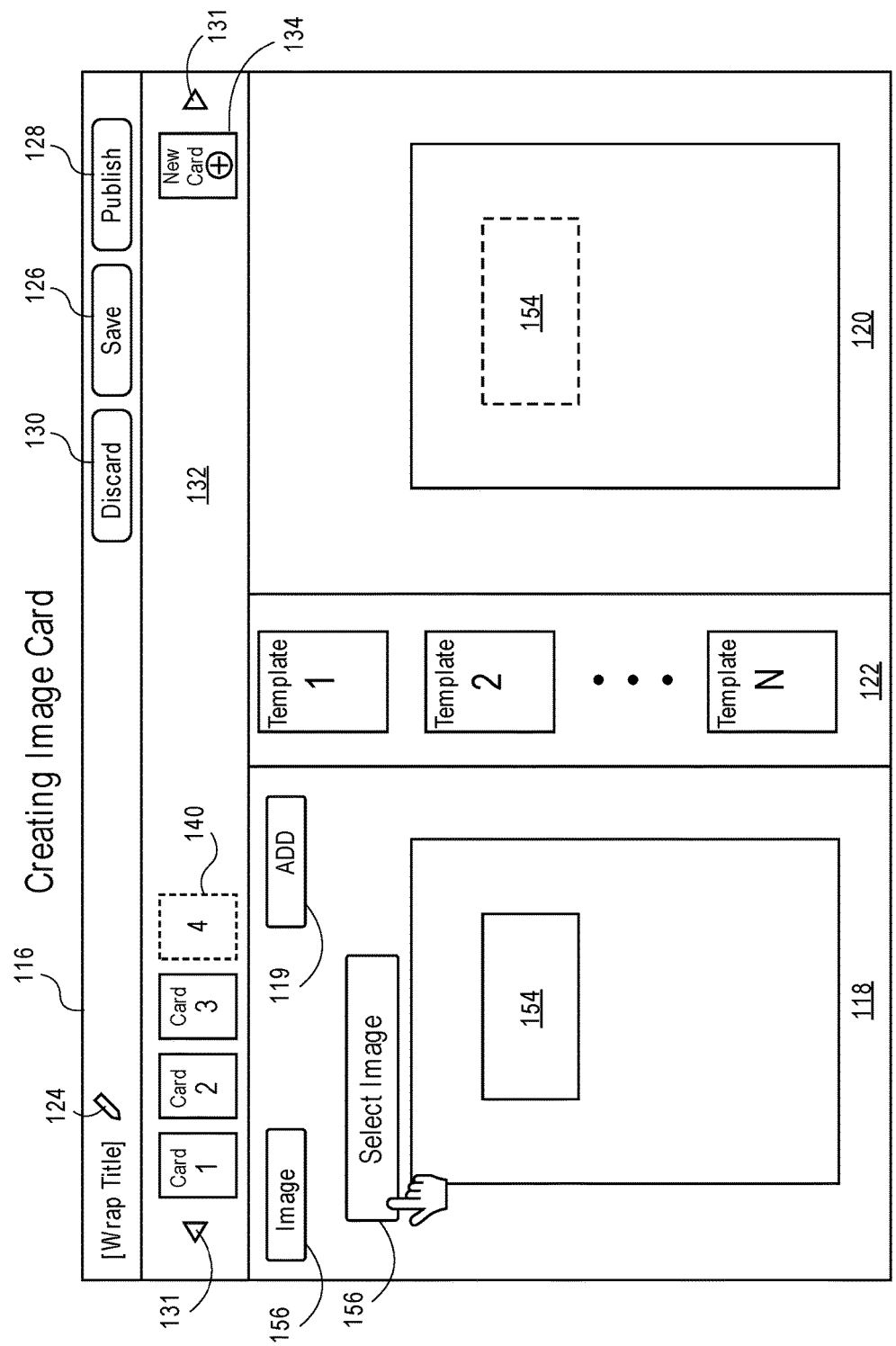
FIGS. 12A through 12C illustrate the authoring of an image card using the authoring tool of the present invention.
Figure 12B:
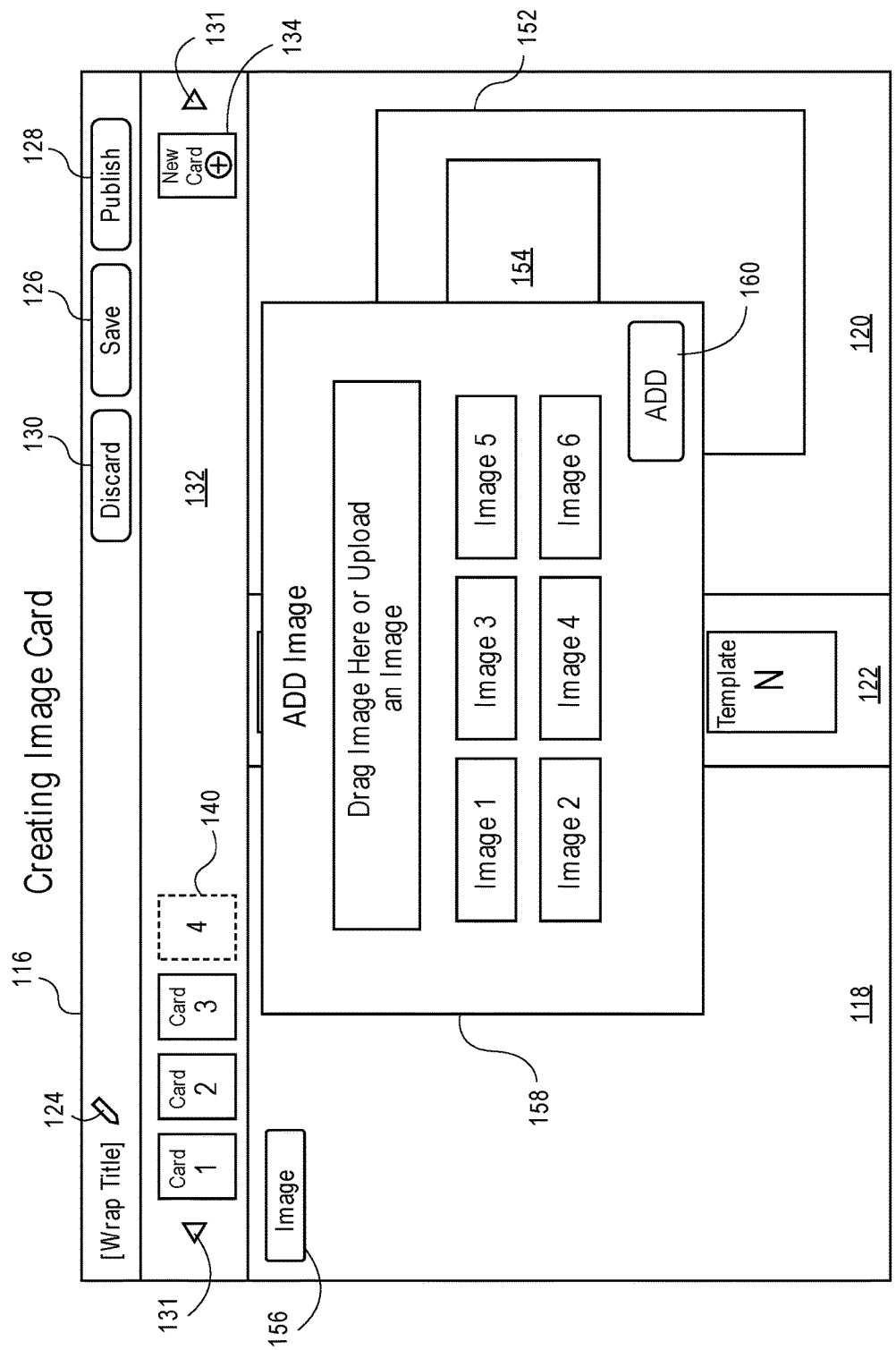
Figure 12C:
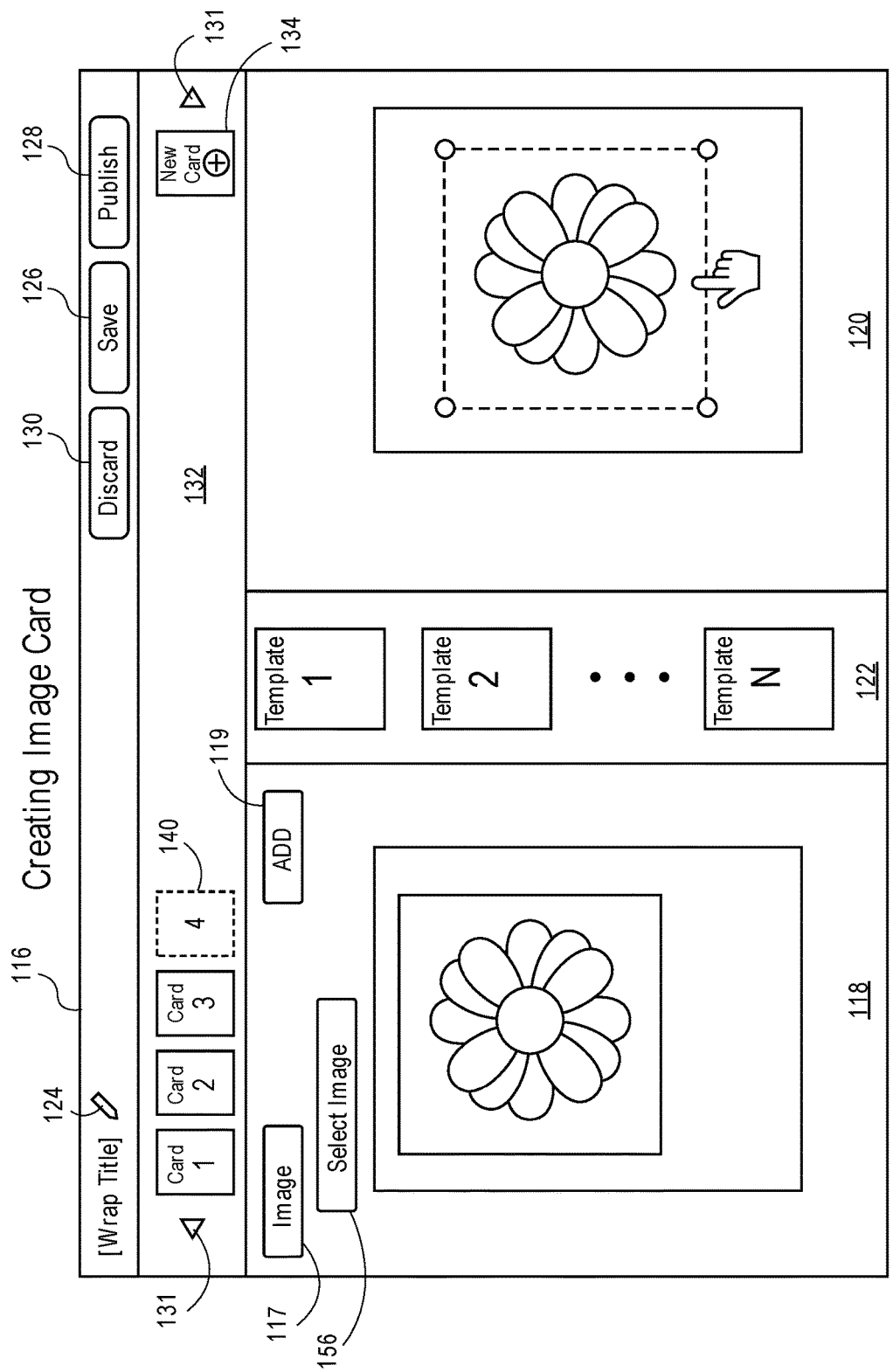

Referring to FIGS. 12A through 12C, a series of diagrams showing how the new card 140 is configured as an image card is illustrated.

As illustrated in FIG. 12A, in this particular example, the author selects a particular image template from space 122. In response, a card corresponding to the selected template with an image box 154 appears in spaces 118 and 120 respectively. To define the image to include in the image box 154, the author selects the select image icon 156.

As illustrated in FIG. 12B, an "Add Image" box 158 appears in response to the selection of the select image icon 156. Within the box 158, the author may selectively either (i) drag and drop or otherwise select and image or photo from an existing library (i.e., image 1, image 2, image 3, etc.), upload and image, or provide a URL or other identifier for accessing the image from a remote location when the card is rendered when the wrap is consumed. The defined image is then inserted into the component box 152 when the Add icon 160 is selected.

As illustrated in FIG. 12C, the added image appears in both the card template provided in space 118 and space 120. Furthermore, within space 120, the author 34 may further stylize the image by adjusting its size and/or location within the card, as represented by author manipulating the image box containing the image.

Figure 13A:
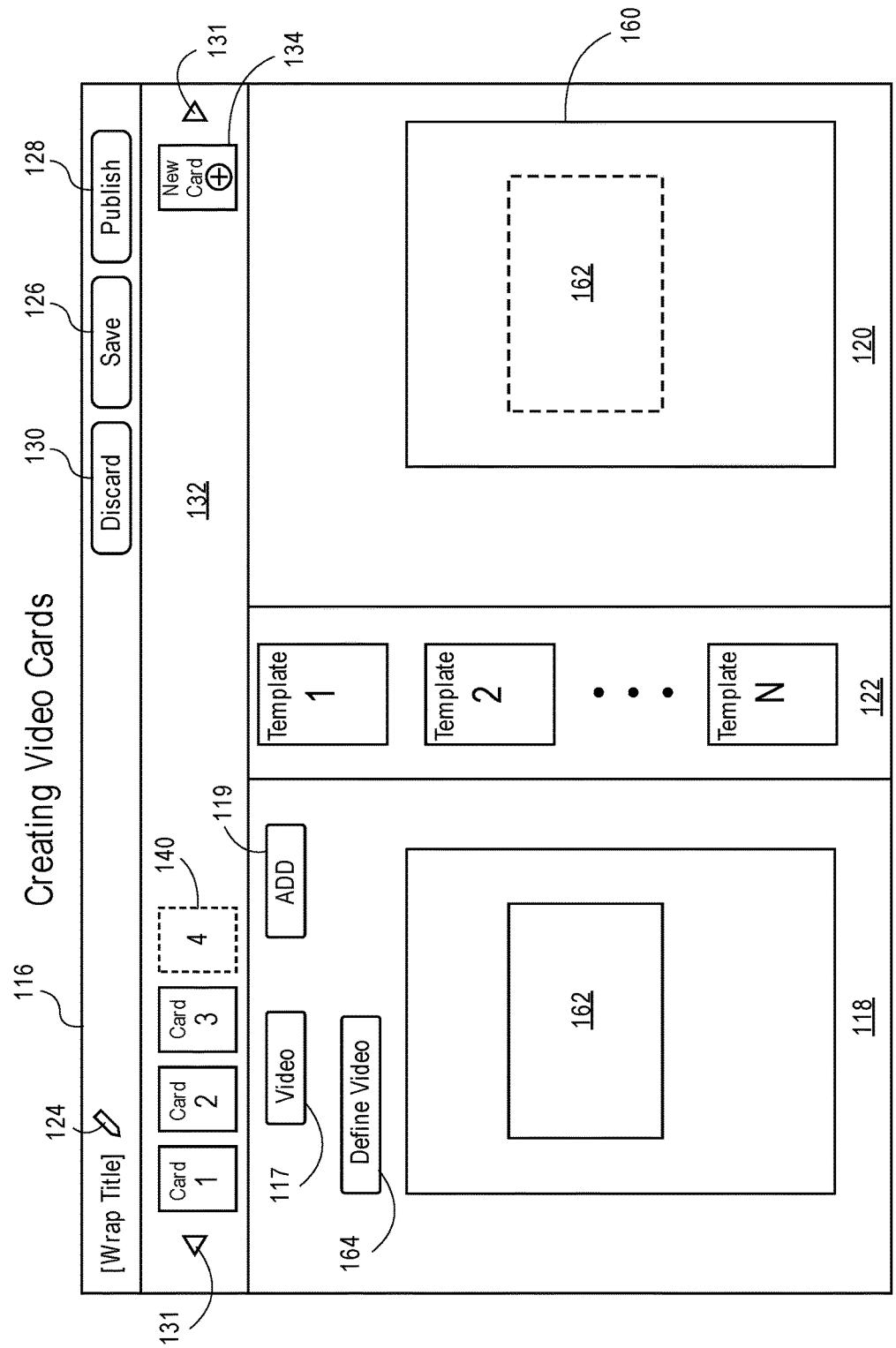
FIGS. 13A through 13B illustrate the authoring of a video card using the authoring tool of the present invention.
Figure 13B:
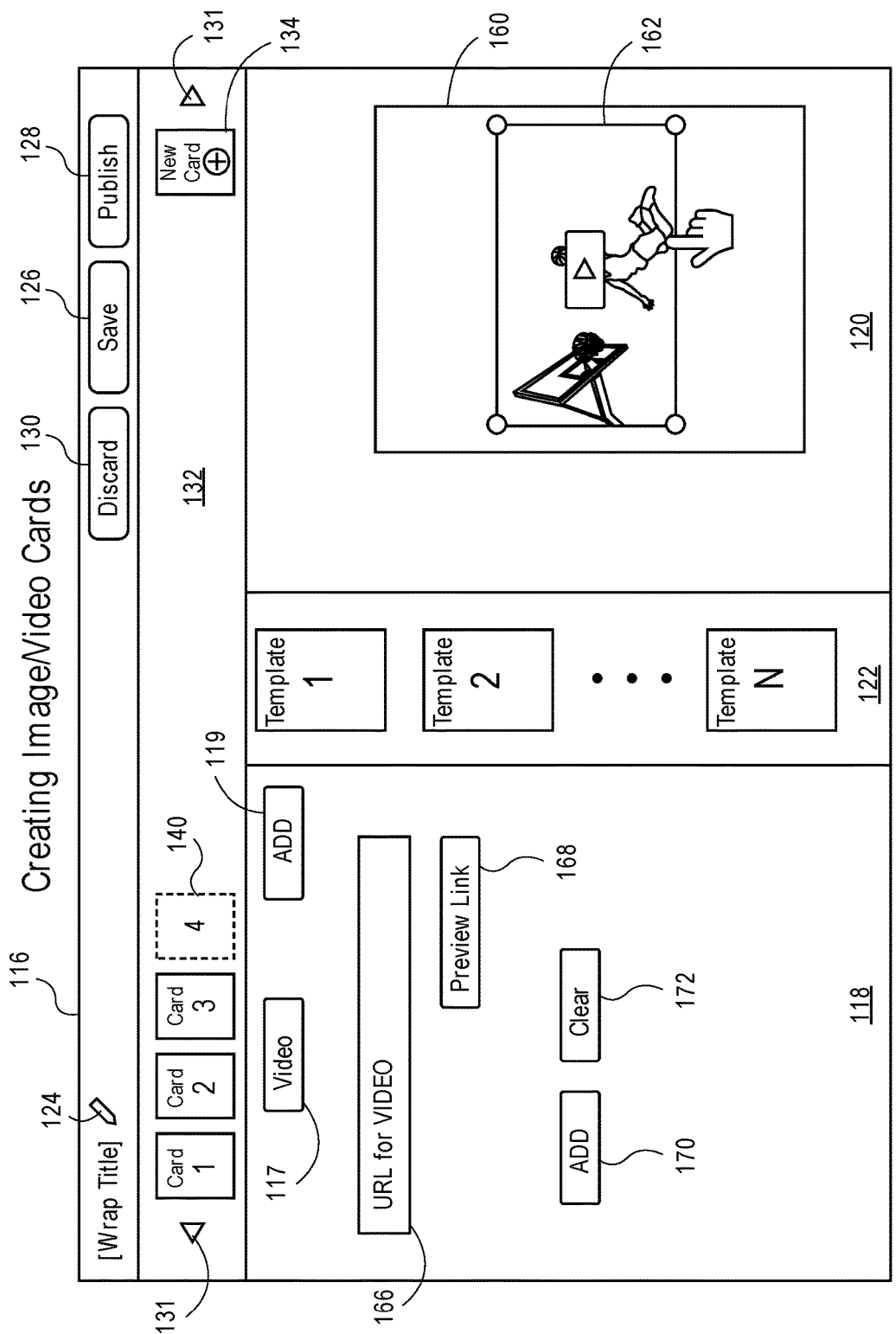

FIGS. 13A and 13B are diagrams showing how the new card 140 is configured as a video card is illustrated.

As illustrated in FIG. 13A, the author selects a particular video template from space 122. In response, a card corresponding to the selected template, including a video component box 162, appears in the preview and configures space 120. Next, the author 34 selects the icon 164 for defining the video for insertion into the component box 162.

As illustrated in FIG. 13B, a box 166 for inserting a URL or other identifier for a chosen video appears. In addition, a preview icon 168, and add icon 170 and a clear icon 172 also appear. By selecting the preview icon 168, the selected video defined in box 166 can be previewed in the component box 162 of the video card 160 appearing in the space 120. The add icon 170 results in the video being inserted into the card 160, whereas the clear icon 172 will remove the URL. Again, the author may resize and position the video within the card in the space 120 as illustrated.

It should noted that with each of the examples provided above, an add component tool 119 appears in the space 118. The add component tool 119 allows the author to add a new component to a card that was not previously defined by whatever template was used to create the card in the first place. Thus, by using the add component tool 119, the author 34 has the option to add additional text, an image, video or other action component beyond what was originally defined in the starting template, as described in more detail below.

Figure 14A:
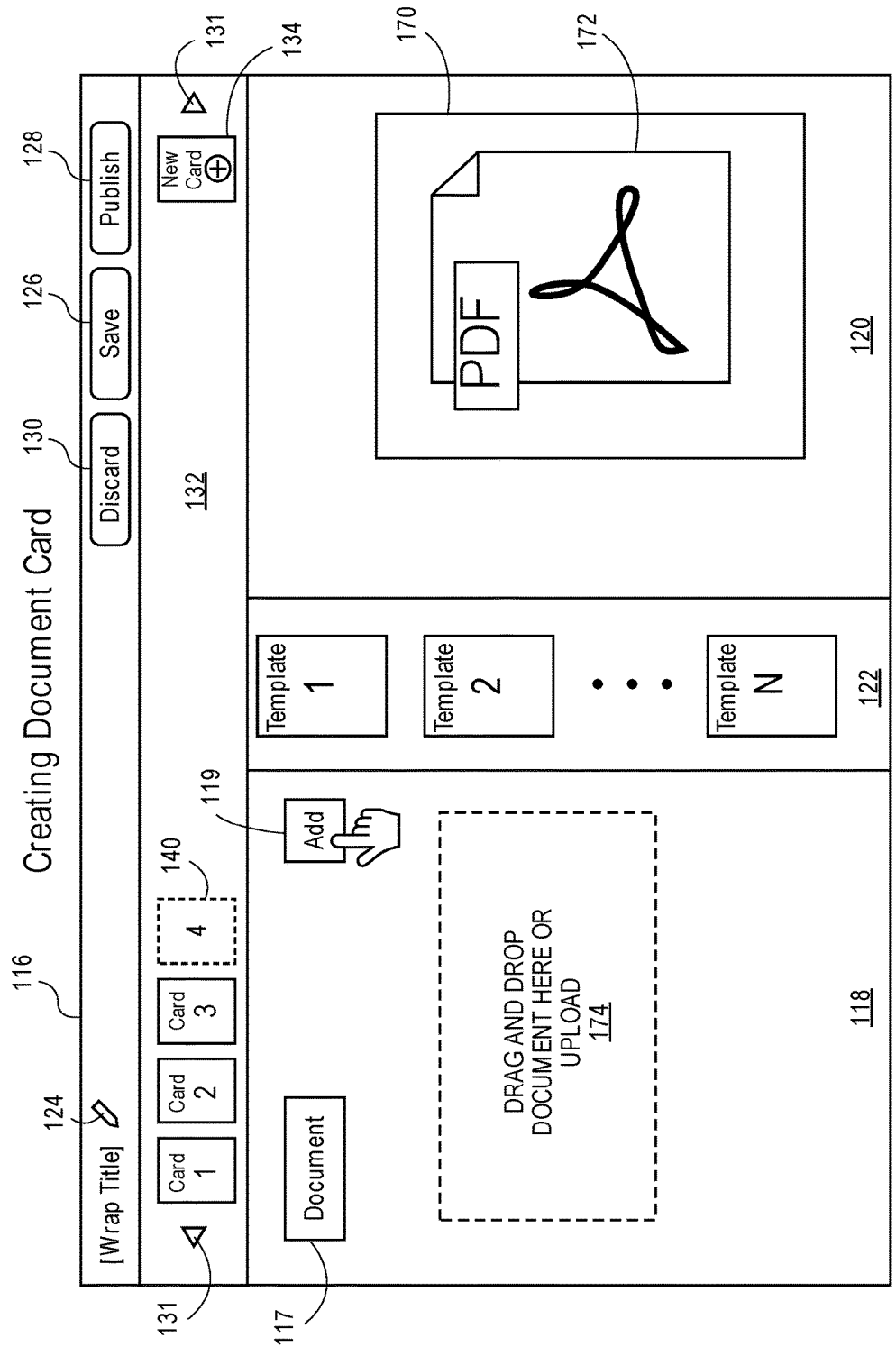
FIGS. 14A through 14C illustrate the authoring of a document card using the authoring tool of the present invention.
Figure 14B:
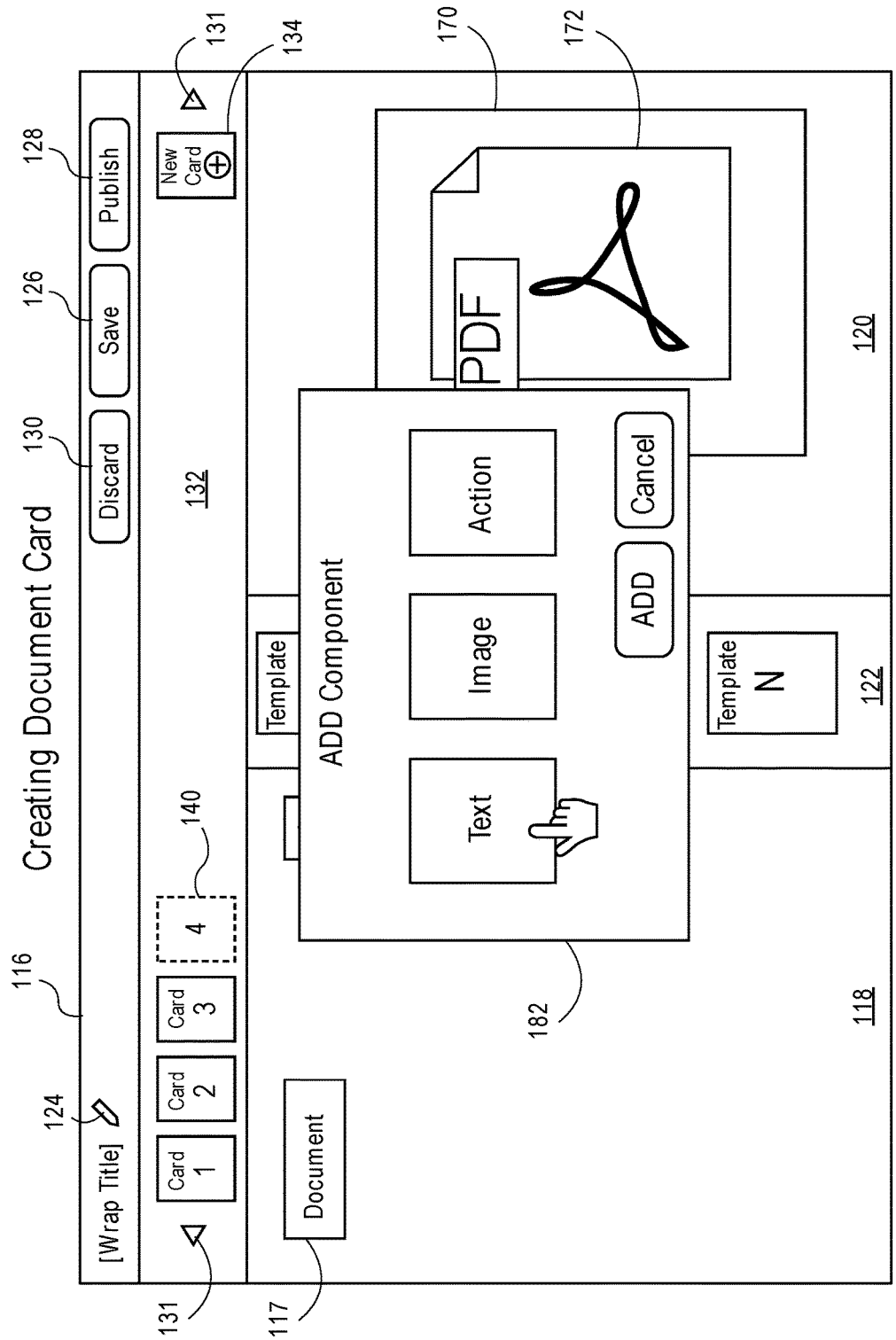
Figure 14C:
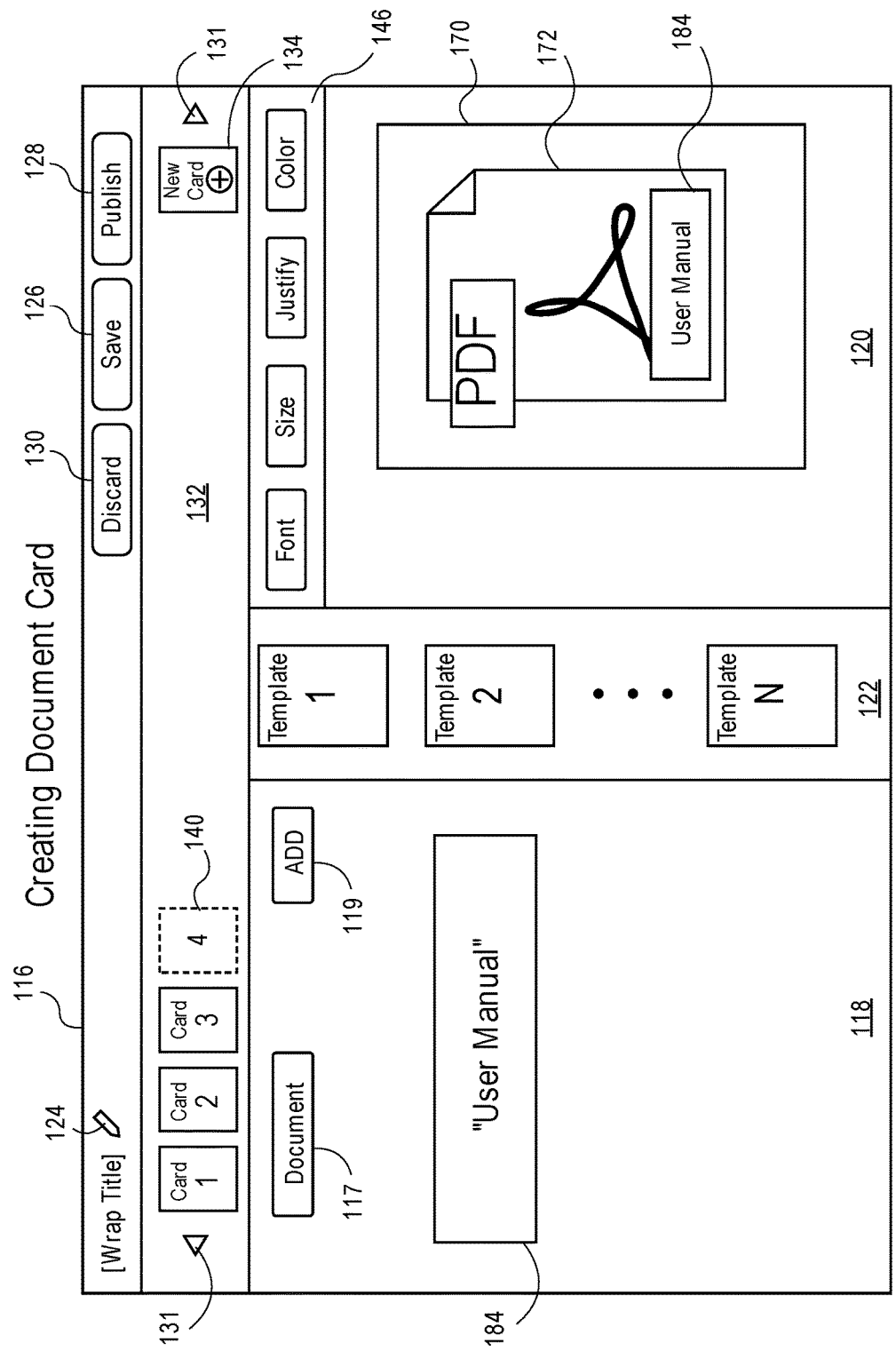

Referring to FIGS. 14A through 14C, a series of diagrams showing how the new card 140 can be configured as a document card is illustrated.

As illustrated in FIG. 14A, the author selects a particular document template from space 122. In response, a card 170 corresponding to the selected template, including a document component box 172, appears in the preview and configure space 120. By selecting the document icon 174, and either dragging and dropping or uploading the document, the author can define the document for insertion into the component box 172. In the particular example shown, the author has selected a PDF document, which appears within the component box 172 of the document card 170.

The author may also elect to add an additional component to the document card 170, for example, a descriptor or title for the uploaded PDF file. To do so, the author selects the Add tool 119, as also illustrated in FIG. 14A.

As illustrated in FIG. 14B, an add component window 182 appears in response to the selection of the Add component tool 119. Within the component box 182, the author may select text, image or some other action component. In this particular example, the author selects the text component.

As illustrated in FIG. 14C, a text box 184 in the authoring space 118 and a text box 184 appearing within the card 170 in the space 120 appear in response to the selection of the text option in box 182. By typing into text box 184 (e.g., "User Manual", the corresponding text appears in the text box 184 of the card 170. Again, the author may adjust the style of the card 170 by resizing and positioning both the PDF document and/or the text box in space 120. Also, the author may change the font, size, justification and color of the text using style tools 146.

In various embodiments, behaviors or tools may also be inherently provided within document templates that enable or facilitate navigation of any inserted document within a card. For example, for PDF, Word or PowerPoint documents, scrolling bars, pointers, or a page flipping behavior may be embedded in the card templates so that a view of the wrap package can flip from page to page within the document when the card is consumed.

Figure 15A:
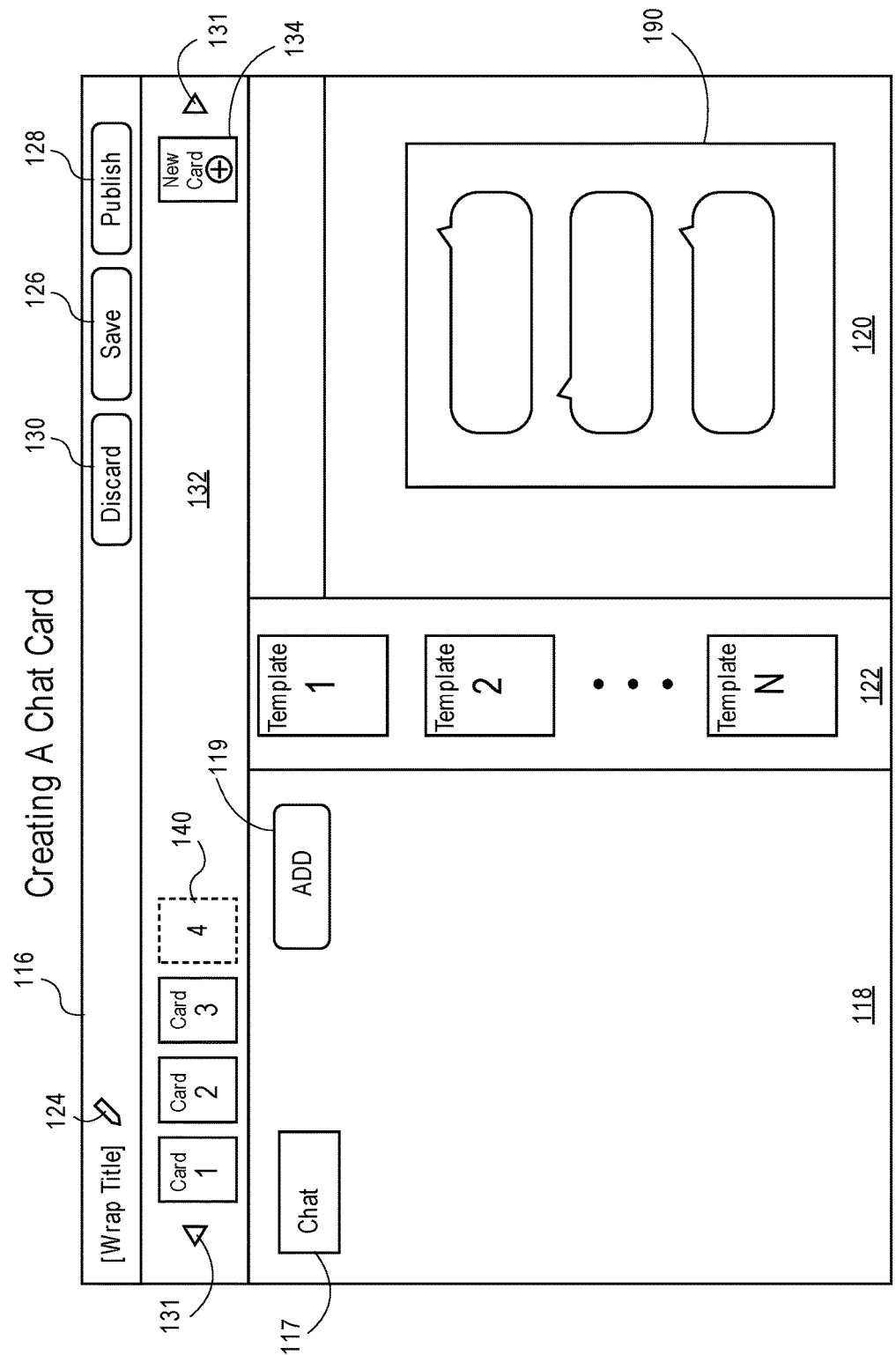
FIGS. 15A through 15C illustrate the authoring of a chat card using the authoring tool of the present invention.
Figure 15B:
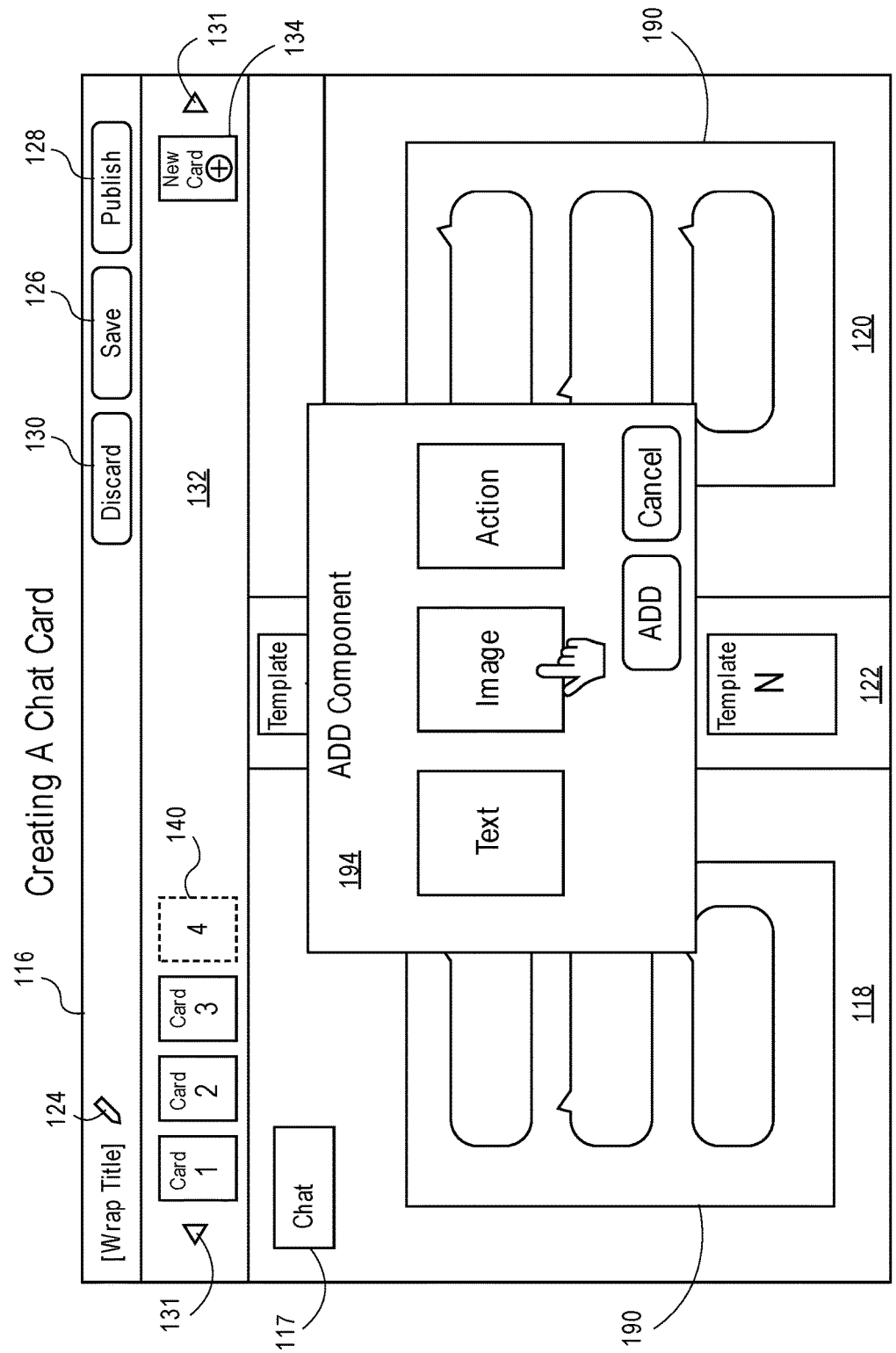
Figure 15C:
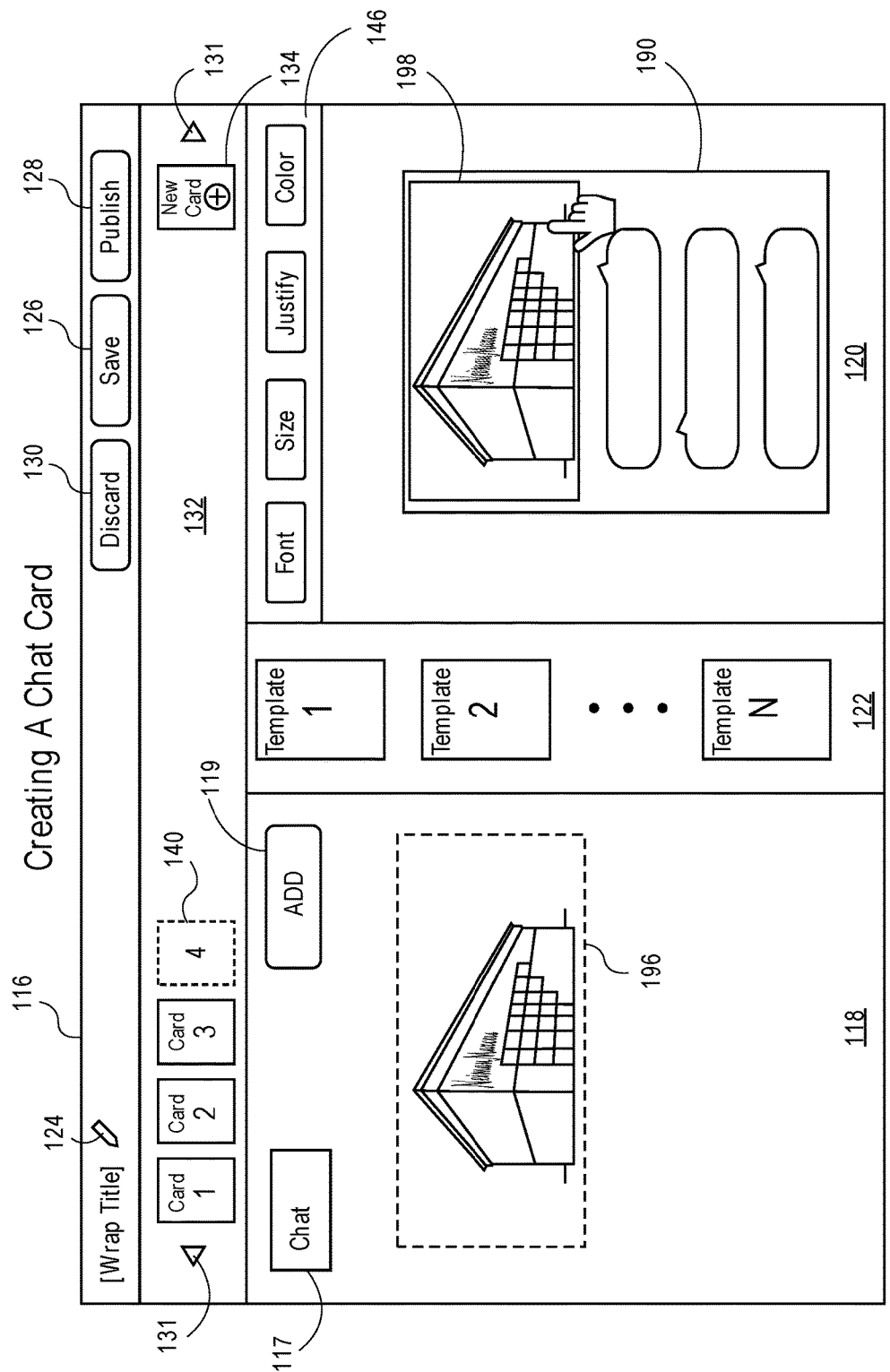

Referring to FIGS. 15A through 15C, a series of diagrams illustrating how new card 140 is configured as a chat card is illustrated.

As illustrated in FIG. 15A, the author selects a particular chat template from space 122. In response, a chat card 190, corresponding to the chat template, appears in the preview and configure space 120. The card 190 includes a chat function that enables a chat session to take place between a consumer of the wrap package and a remote person when the card 190 is rendered. The chat functionality of card 190 can be implemented in a number of different ways. For example, the chat function can be embedded as a widget that appears in an i-frame within the card 190. When the viewer interacts with the widget, a chat server is accessed, and the viewer may engage in a chat session with another party via the chat server. For more details on implementing widgets into cards of wrap packages, see U.S. Provisional Application No. 62/193,830, entitled "Card Based Package for Distributing Electronic Media and Services", filed Jul. 17, 2015, incorporated by reference herein for all purposes. In another embodiment, the chat may be implemented using a cul-de-sac method. In other words when the viewer is consuming card 190 and would like to engage in a chat, the viewer is taken to another web page or location to engage in the chat. When done, the viewer is returned to page 190. In yet another embodiment, the chat functionality can be built into as a component of the card 190. For example, the chat card 190 may include the ability to establish a session with a remote server and exchange media during the session. Thus, when the viewer would like to engage in a chat, a session is established between the card 190 and a chat server, enabling the chat to take place.

As illustrated in FIG. 15B, the author may also elect to add an addition component to the chat card 190 by selecting the Add tool 119, which causes the add component box 194 to appear. Within the component box 194, the author may select text, image or some other action component.

As illustrated in FIG. 15C, the author in this example selects the add image component, which results in an image box 196 appearing in the authoring space 118 and a corresponding image box 198 appearing within the card 190 in the space 120. By adding an image into box 196 (e.g., a Nieman Marcus store), the corresponding image appears in the image box 198 of the card 190. Again, the author may resize and position image box 198 within the card 190. In addition, other components may be added in a similar manner. For example, the author 34 may also elect to ad a text component, such as "Chat with an online sales representative" (not illustrated), by selecting the Text option within the add component window 194, similar to that described above.

Referring to FIGS. 16A through 16F, a number of diagrams showing the new card 140 authored as an appointment card for making an appointment is illustrated.

Figure 16A:
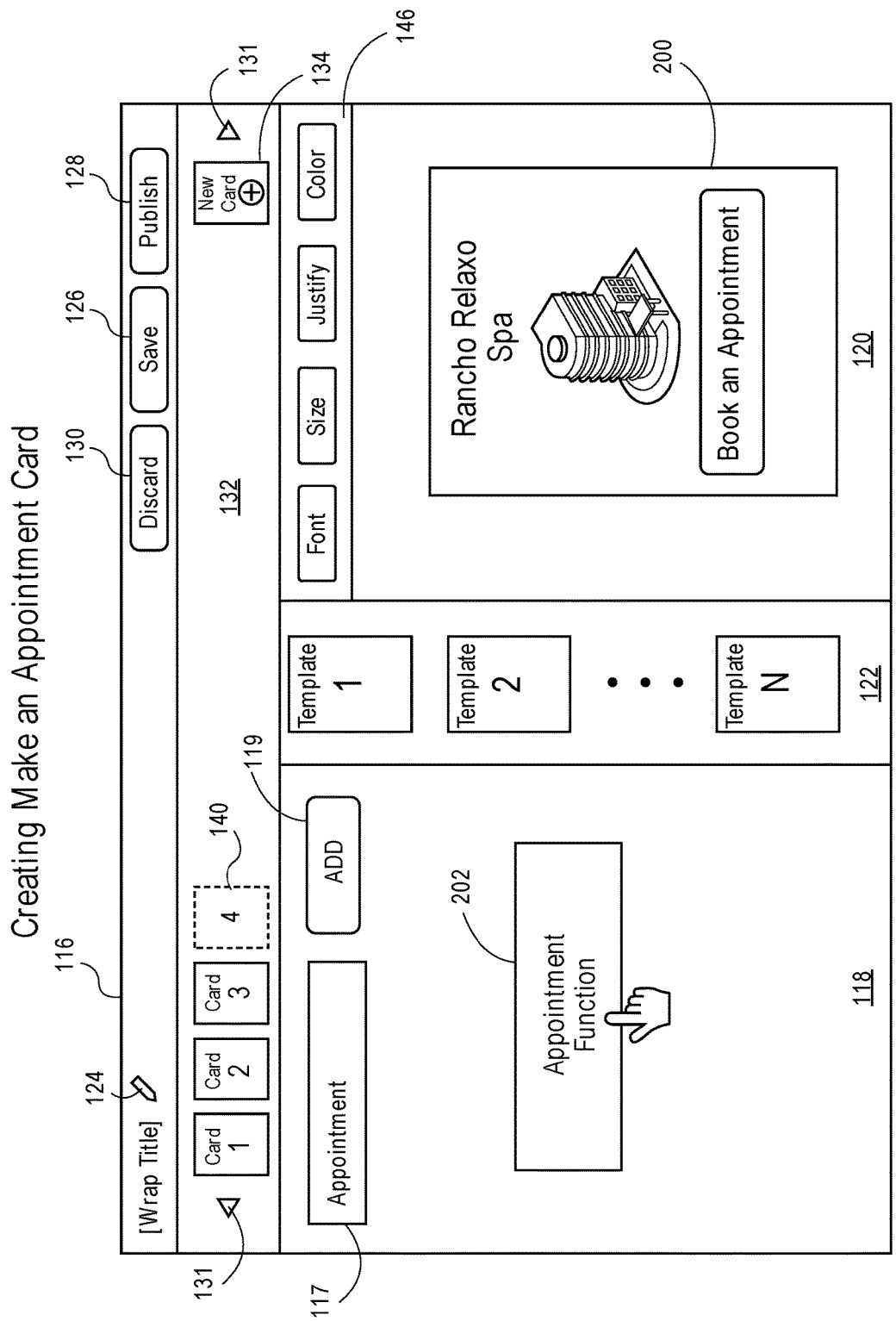
FIGS. 16A through 16F illustrate the authoring of an appointment card in accordance with multiple embodiments using the authoring tool of the present invention.

As illustrated in FIG. 16A, the author selects a particular appointment template with a built-in calendaring function from space 122. In response, an appointment card 220, corresponding to the selected appointment template, appears in the preview and configure space 120. The card 200 as shown has already been authored to include text (i.e., "Rancho Relaxo Spa"), and image, and a "Book and Appointment" button using the Add tool 119, as described above.

The card 200 may implement the appointment booking/reservation function in a number of ways. For example, the function can be implemented via (i) a widget embedded in the card and that allows interaction with a remote reservation/booking server; (ii) by cul-de-sacing to a remote location, such as a reservation/booking web site, or building the reservation/booking functionality into the card itself. With the latter embodiment, the card 200 would include the ability to create a session with a remote reservation/booking database and the appropriate information needed to book an appointment/reservation would be exchanged during the session.

Figure 16B:
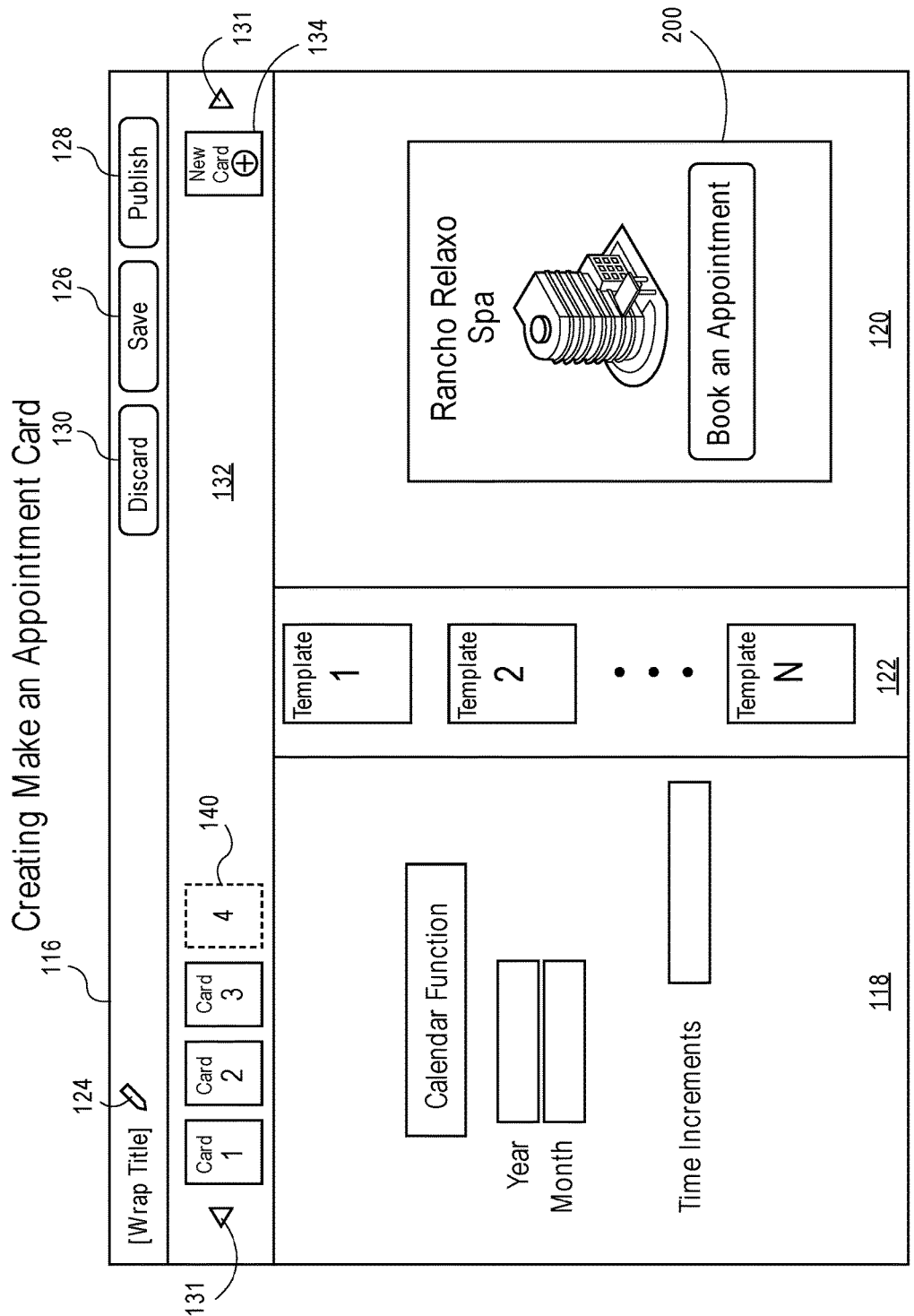

In accordance with one embodiment as illustrated in FIG. 16B, a number of calendar related icons appear in the authoring area 118 when the appointment function 202 is selected. In this example, the author can specify the year, month and time increments for receiving appointment requests from a consumer of the wrap package. In response, the selected parameters are set into the appointment function of the card 200. In this latter embodiment, a session is established between the wrap package and the remote reservation or booking database when the card 200 is being consumed. During the session, state information is exchanged, meaning the remote database provides the wrap package with appropriate feed information, such as booked and/or available time-slots for reservations. In response, the feed information is presented within the card 200, allowing the viewer of the wrap to book an available time-slot. In this embodiment, the card 200 captures the required information, such as the date and time specified by the viewer, along with optionally user information (name, contact information, credit card, etc.), and provides it to the remote database for reserving the requested time slot.

Figure 16C:
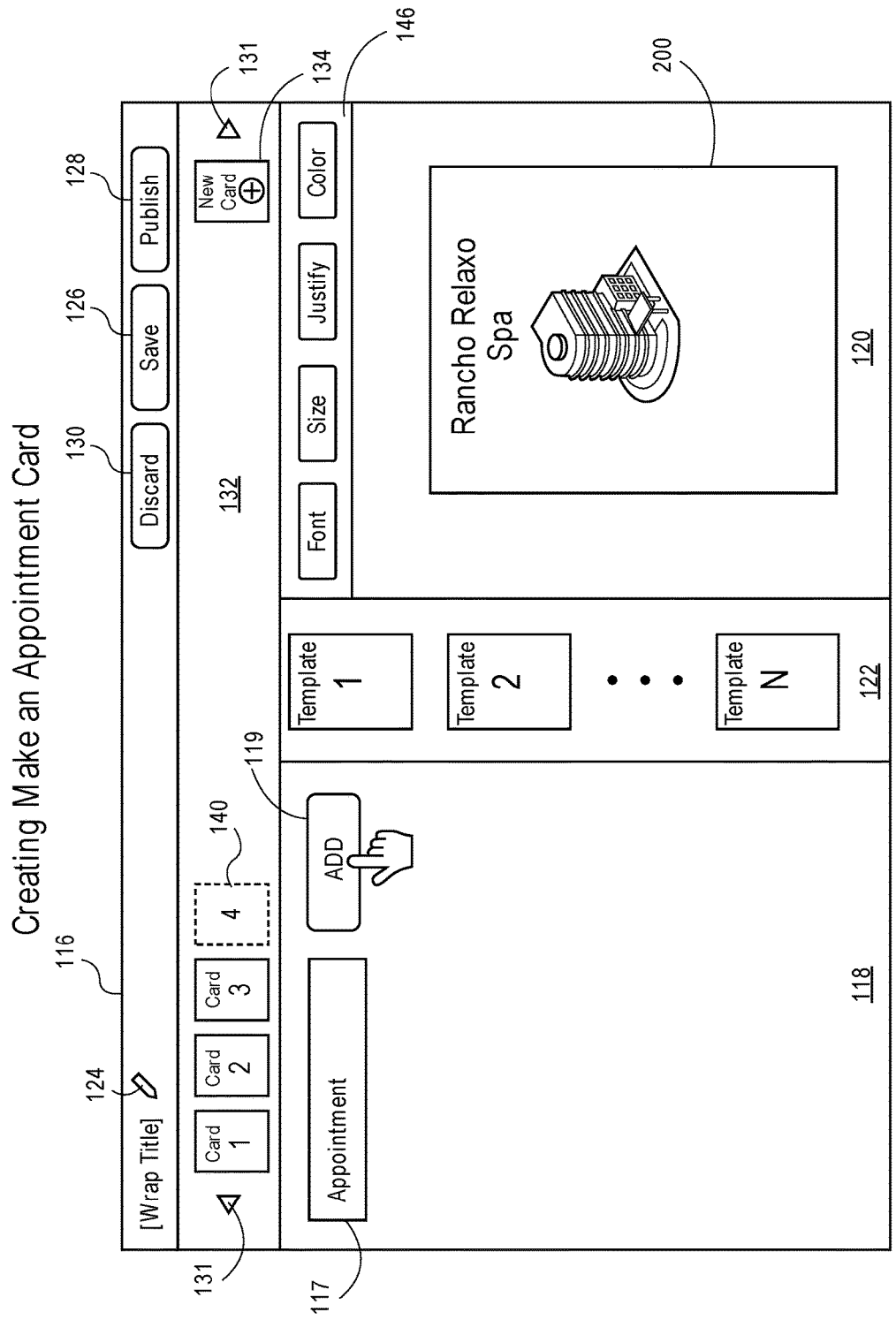
Figure 16D:
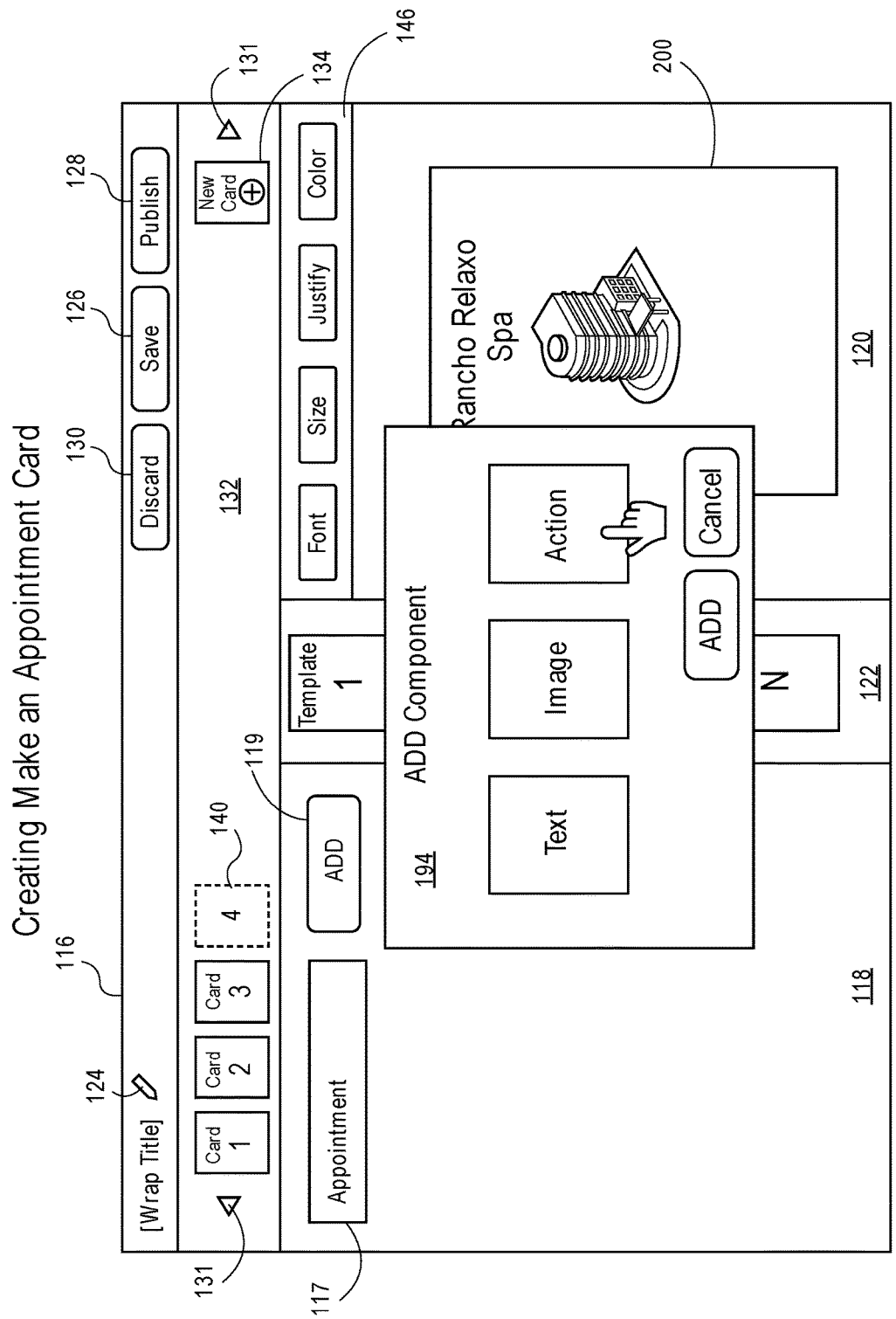
Figure 16E:
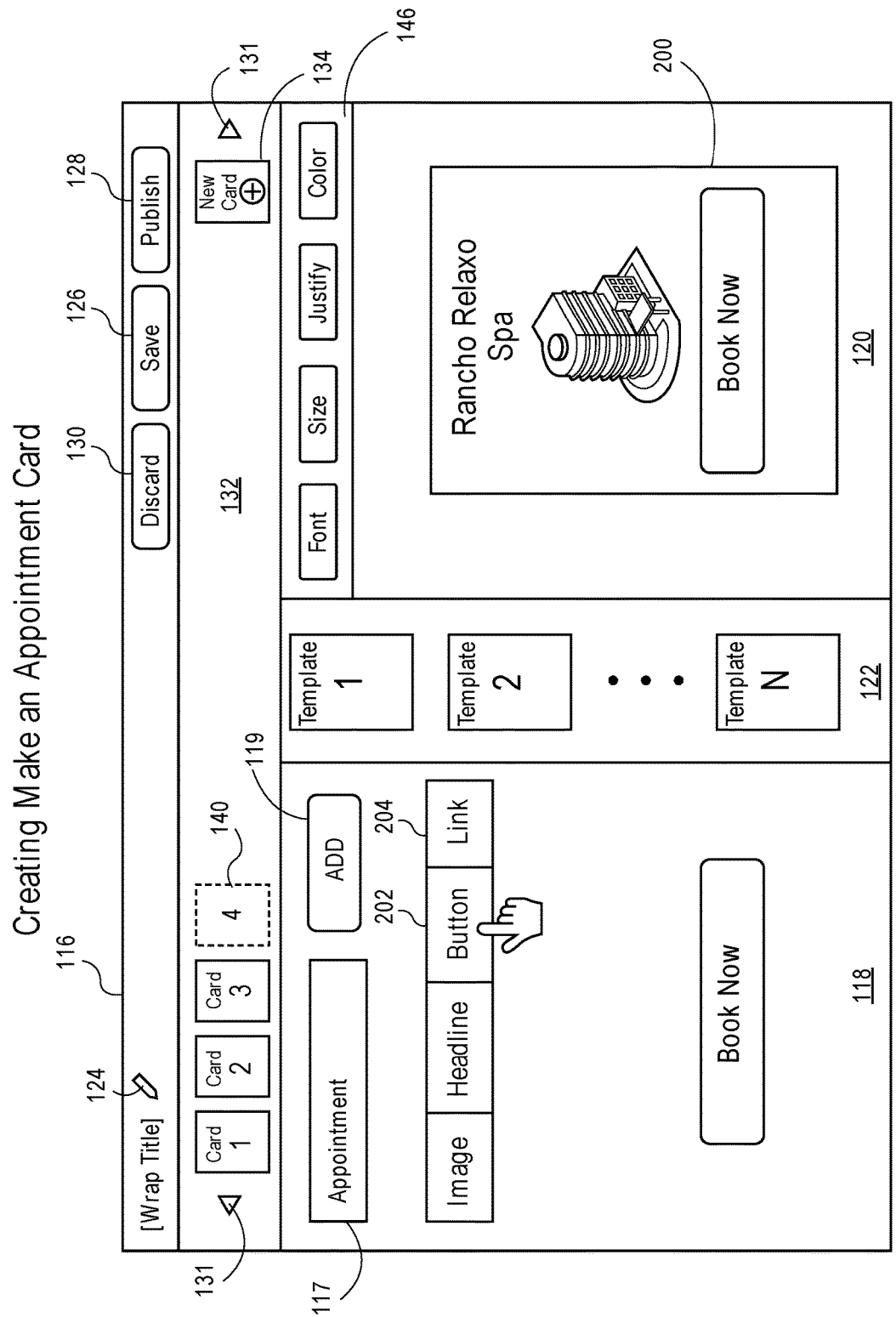
Figure 16F:
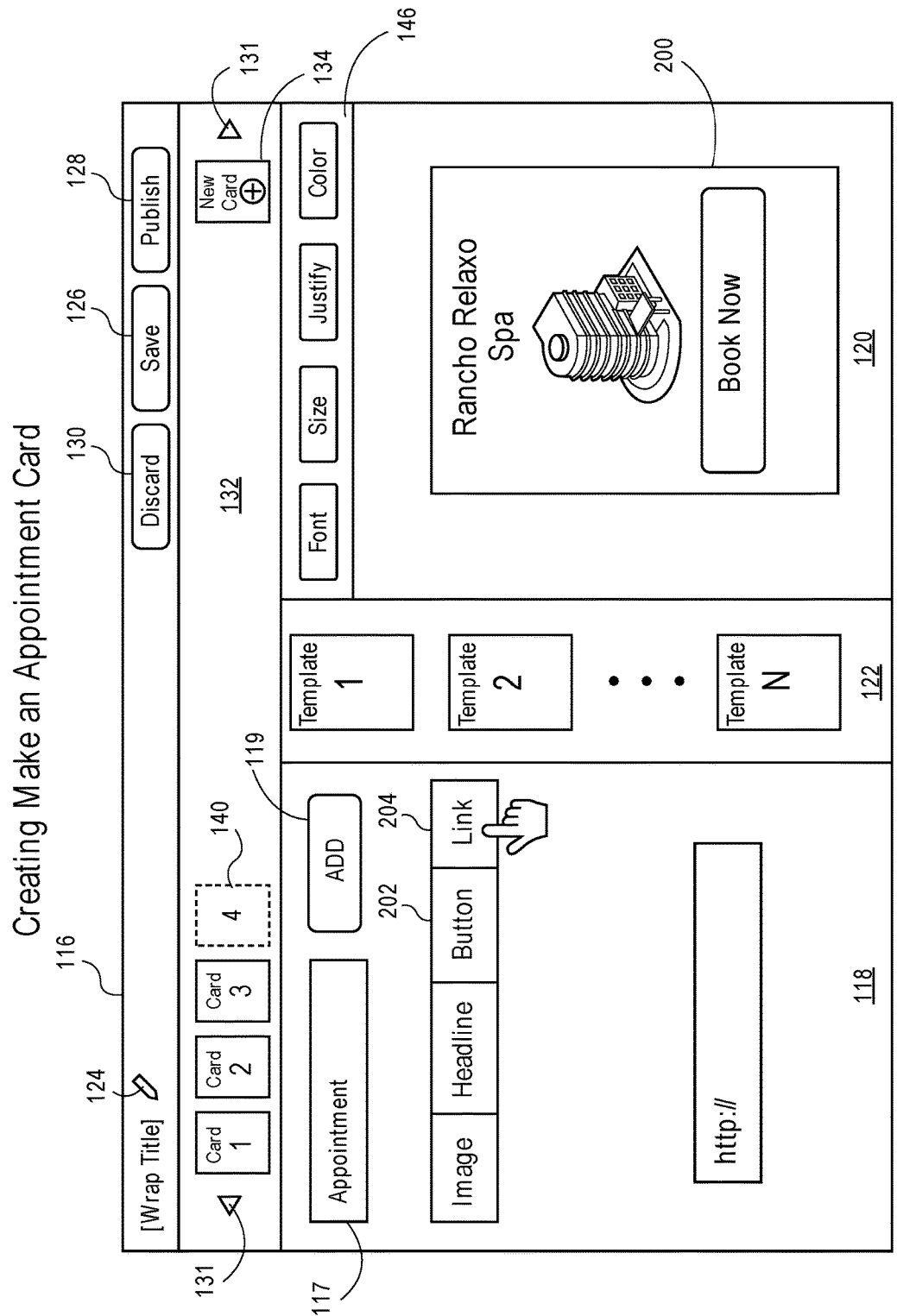

Referring to FIGS. 16C through 16F, an alternative embodiment of authoring the "cul-de-sacing" to a remote reservation-booking location is illustrated. In this example as illustrated in FIG. 16C, the author 34 selects the add component tool 119, which results in the appearance of the add component window 194, as illustrated in FIG. 16D. Next, the author 34 selects the "Action" icon, which results in the appearance of a set of tools in space 118, including a button tool 202 and a link tool 204, as illustrated in FIG. 16E. By selecting the button tool 202, the user can create a "Book Now" trigger within the card 200. By selecting the link tool 204, as illustrated in FIG. 16F, the author can define a URL of the remote reservation booking database. Thus when a viewer selects the Book Now trigger, a web page associated with the remote reservation booking system appears. Once a reservation is made, or the viewer opts to not make a reservation, the viewer is returned back to card 16F of the wrap package.

Figure 17A:
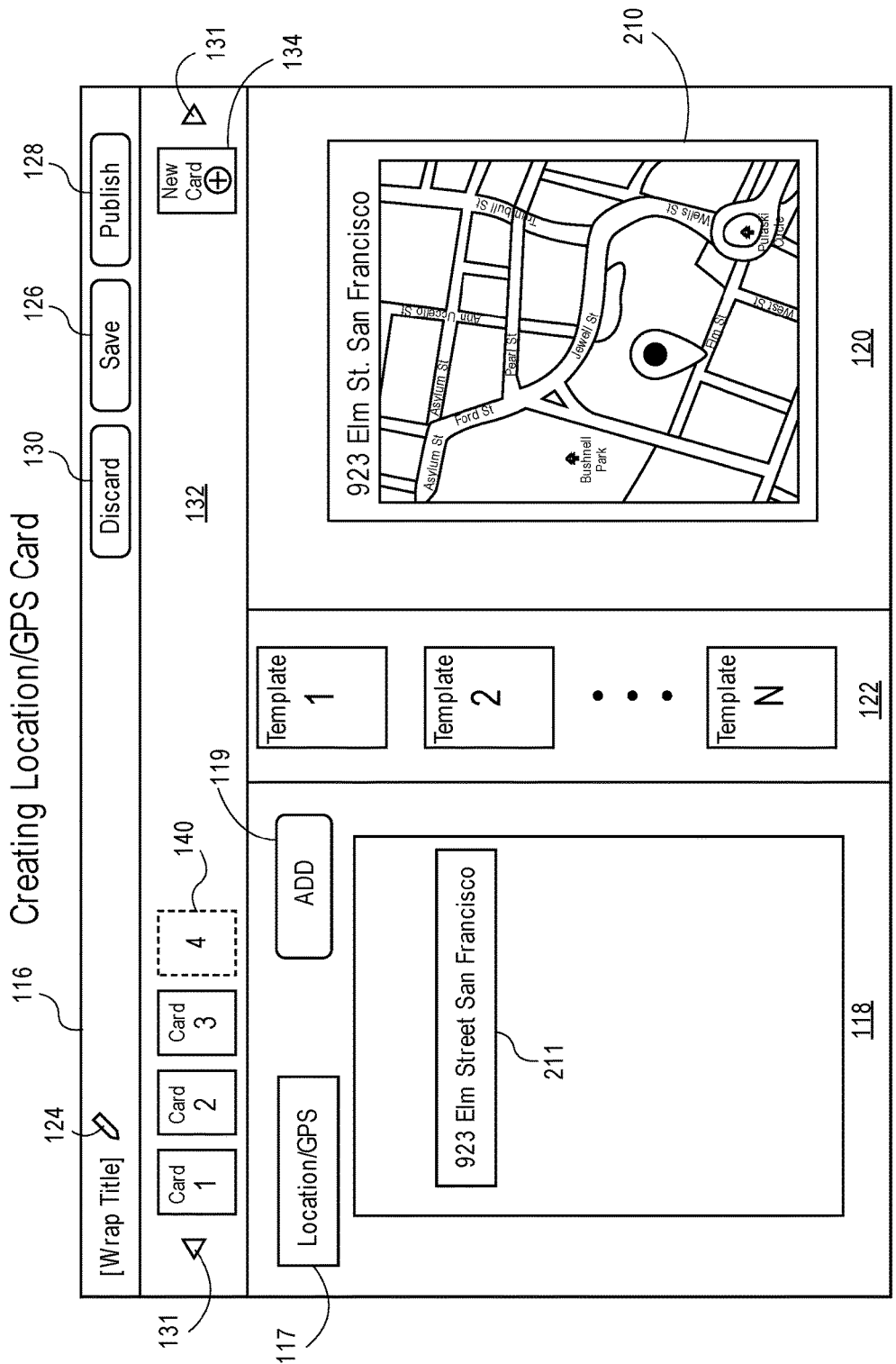
FIGS. 17A through 17F illustrate the authoring of a location/GPS card in accordance with multiple embodiments using the authoring tool of the present invention.
Figure 17B:
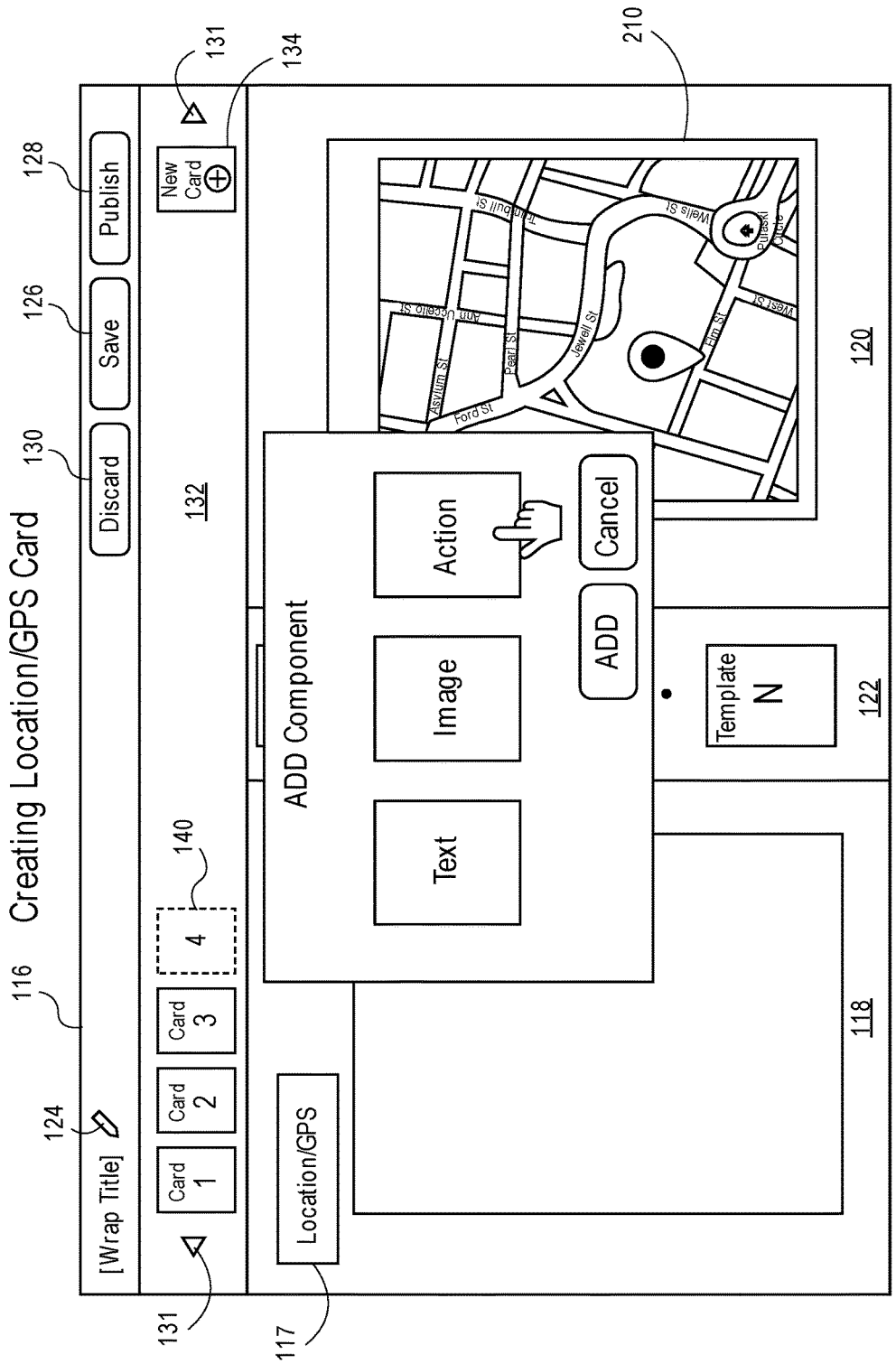
Figure 17C:
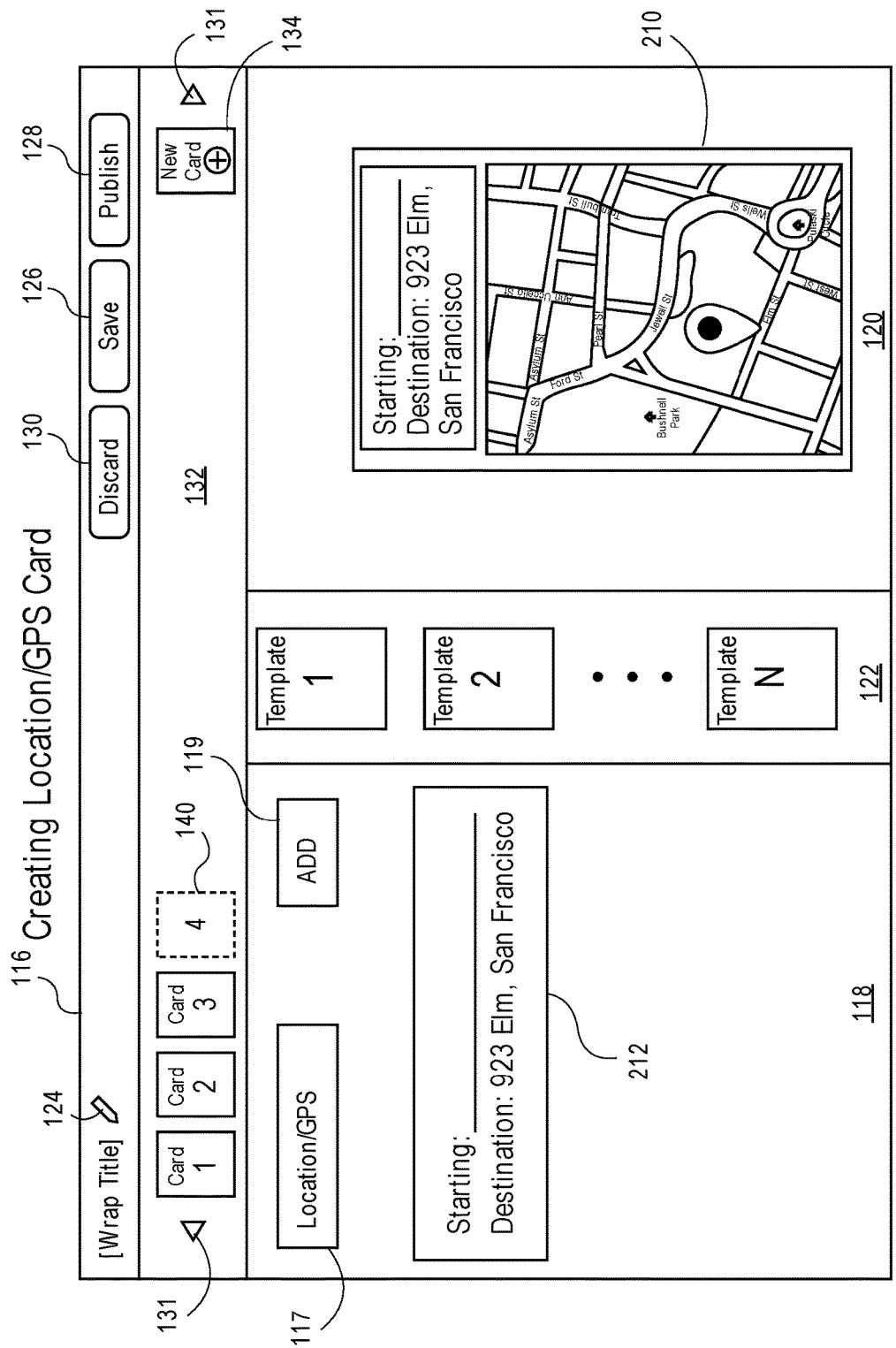

FIGS. 17A through 17C, are diagrams showing new card 140 configured as a location/GPS card.

As illustrated in FIG. 17A, the author selects a particular GPS/location template with GPS/location functionality from space 122. In response, GPS/location card 220, corresponding to the selected template, appears in the preview and configure space 120.

As illustrated in FIG. 17B, the author 34 can add additional components to the GPS/location card 210 by selecting the add component tool 119. As previously described, the author can add text and/or image component(s) as described above. In addition, the author can add a location component, as is provided in this example.

As illustrated in FIG. 17C, a component box 212 appears in the authoring space 118 and in the card 210 in the space 120. In this example, the component box 212 enables the author 34 to define GPS functionality in the card 210. For example, the wrap package may be authored on behalf of a merchant located at 923 Elm Street in San Francisco. By including an action component into the card allowing a consumer of the wrap package to enter their current address, the card 210 is configured to interact with the GPS functionality of the consuming device, such as the Google Maps application running on the device, to provide GPS related services. For example, the viewer of the wrap may enter their current location into the card 210, which would result in the card providing directions to the location of the merchant, located at 923 Elm Street in San Francisco.

Figure 17D:
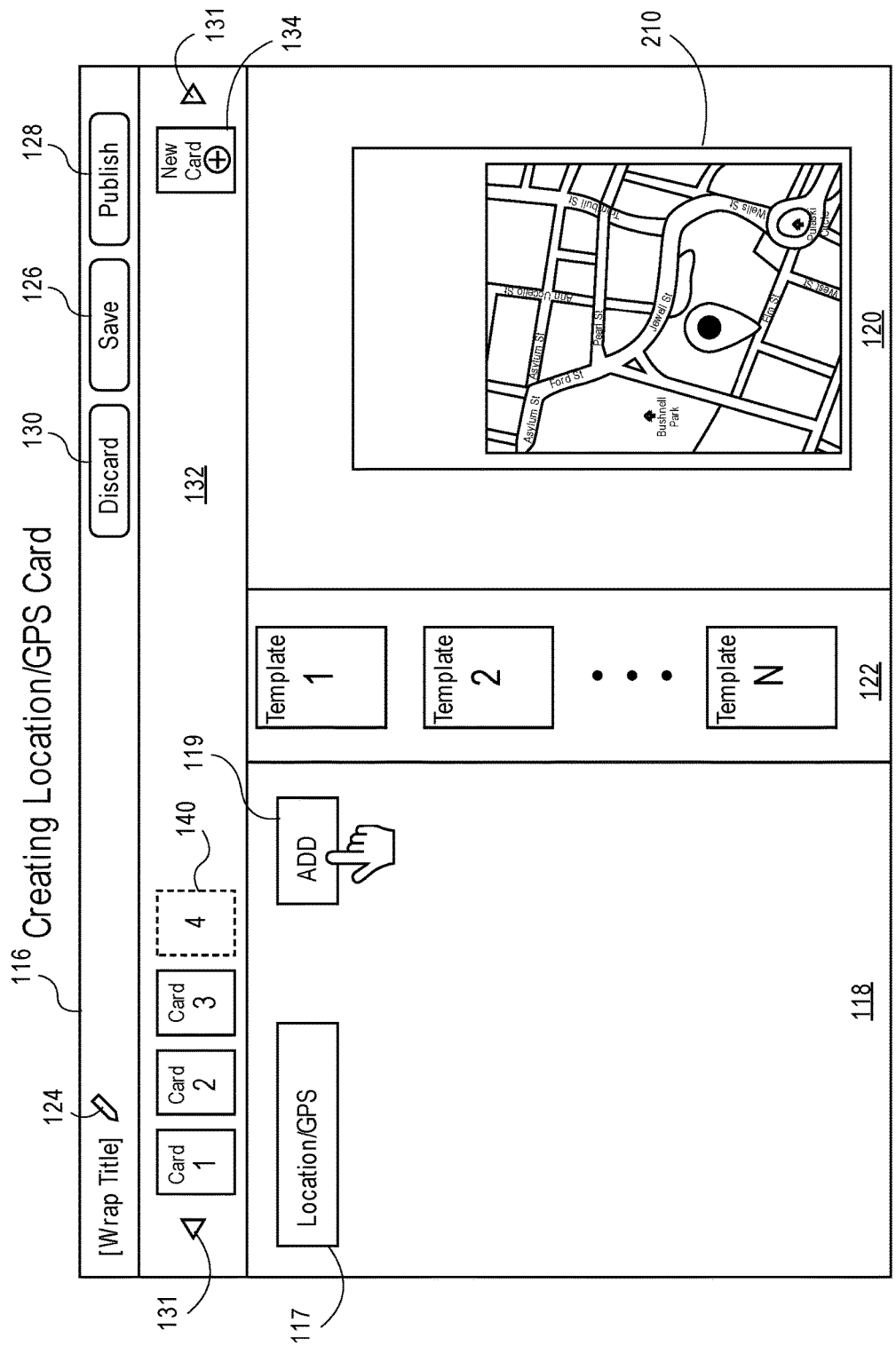
Figure 17E:
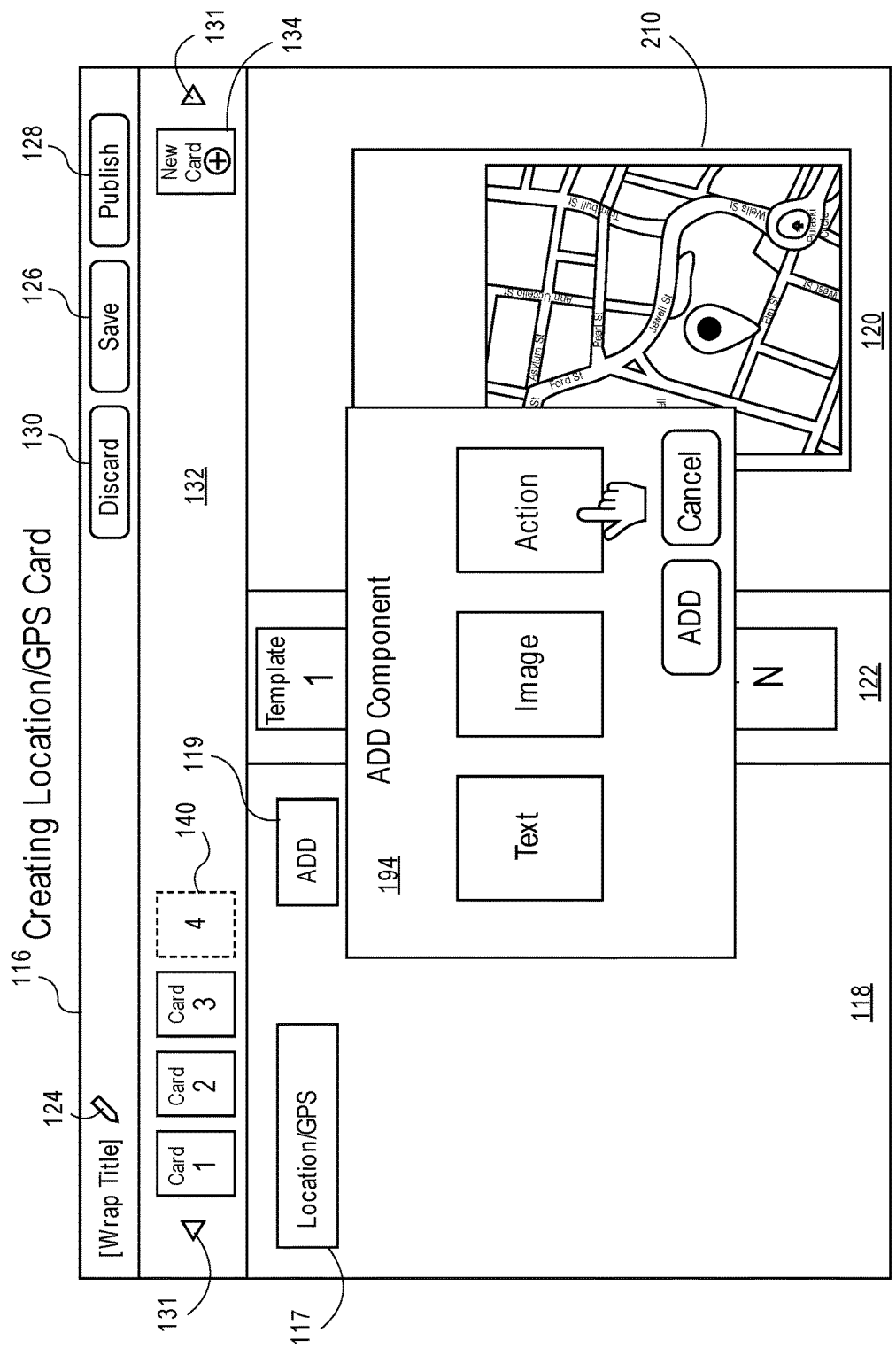
Figure 17F:
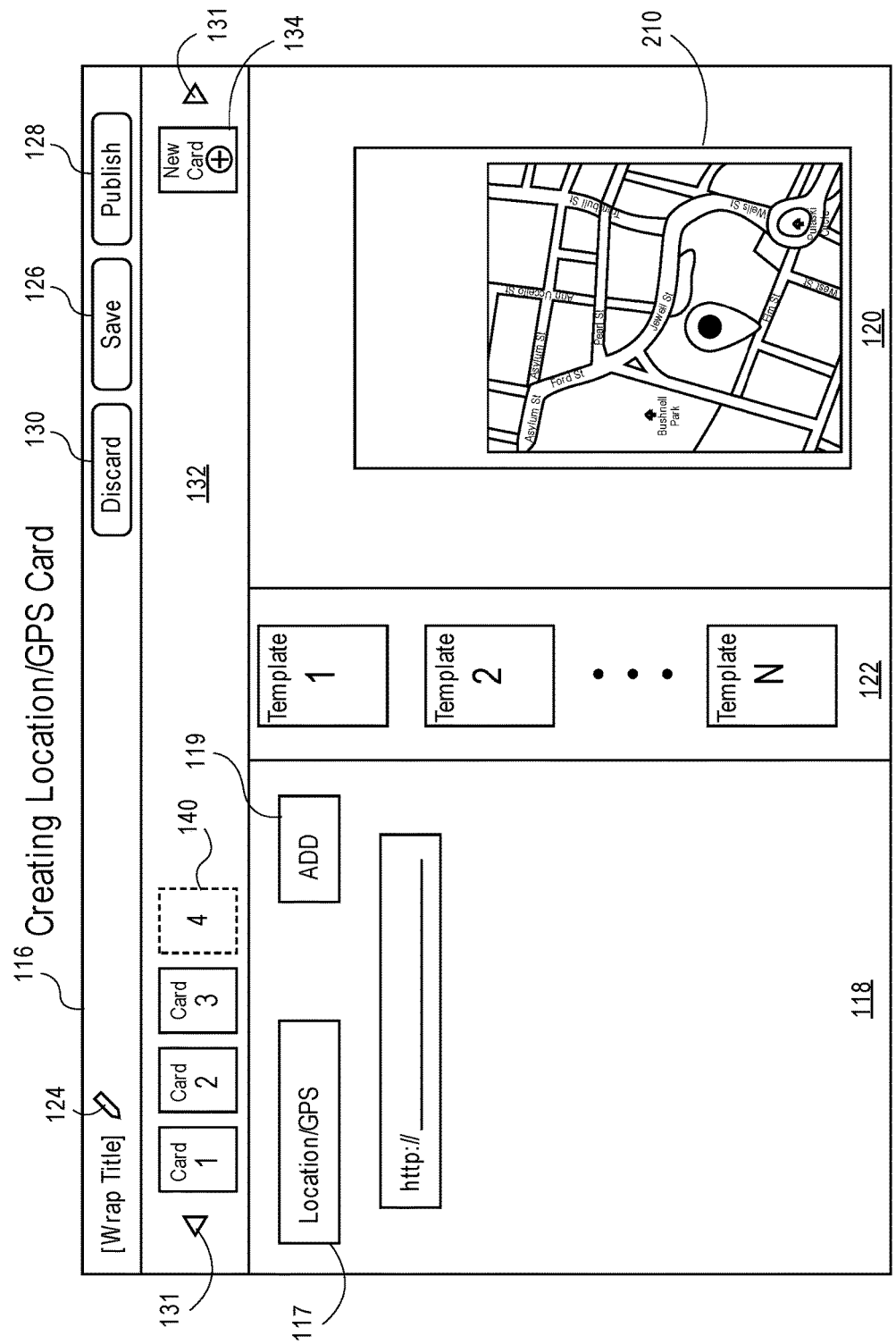

In an alternative embodiment, FIGS. 17D through 17F illustrate a sequence of diagrams for authoring a cul-de-sacing" action to a remote web site providing GPS/location functionality, such as Mapquest or the like. In this example as illustrated in FIG. 17D, the author 34 selects the add component tool 119, which results in the appearance of window 194, as illustrated in FIG. 17E. In response, the author selects the Action item, which enables the insertion of a URL to a remote web page providing GPS/location functionality. Again, as a cul-de-sac, the viewer is returned to the wrap package after they are done accessing the remote GPS/location web page by closing the window 194. In yet other embodiments, the GPS/location functionality can also be implemented using a widget or by building the functionality into the card itself.

Referring to FIG. 18A through 18F, a sequence of diagrams illustrating new card 140 authored as a transact card 220 is shown.

Figure 18A:
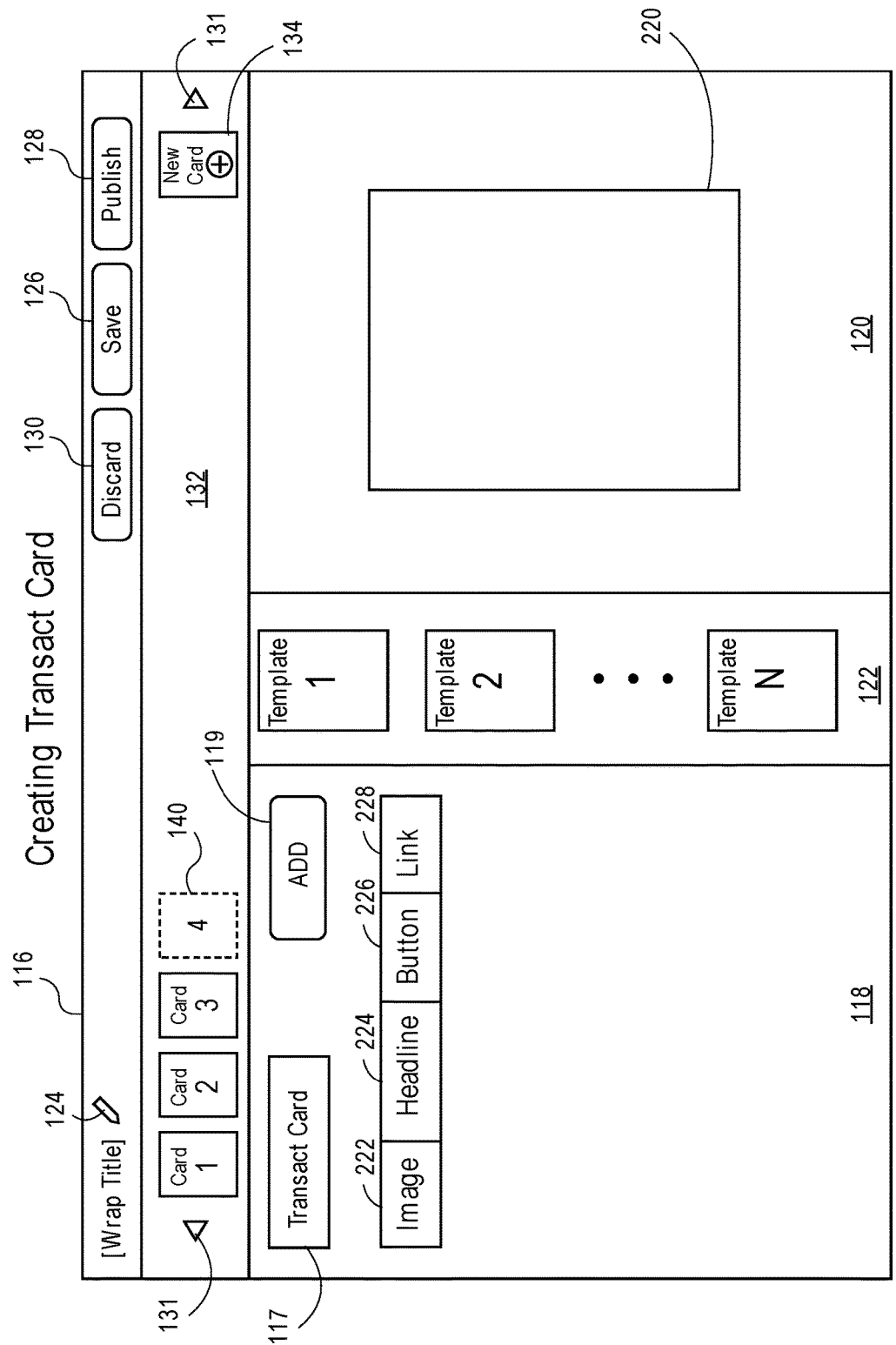
FIGS. 18A through 18E illustrate the authoring of a transact card using the authoring tool of the present invention.

As illustrated in FIG. 18A, the author selects a particular transact template from space 122. In response, a transact card 220, corresponding to the selected template, appears in the preview and configure space 120. In addition, a number of options for adding component(s) specific to transactions are provided in the authoring space 118. In this particular example, an image component 222, a headline component 224, a button component 226 and a link component 228 are provided.

Figure 18B:
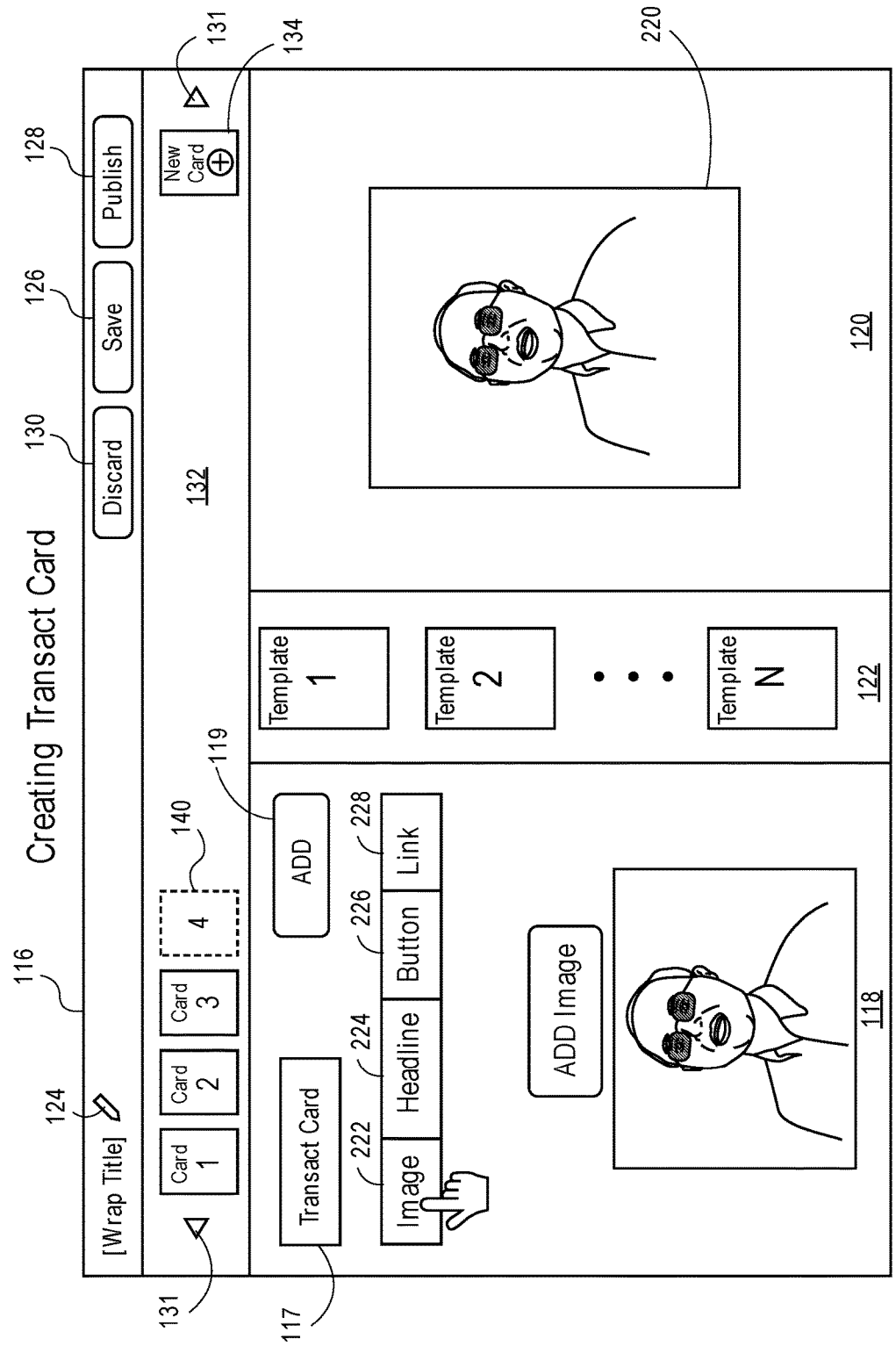

As illustrated in FIG. 18B, the image component 222 is selected. As a result, the author may add an image to the card 220, similar to that described above.

Figure 18C:
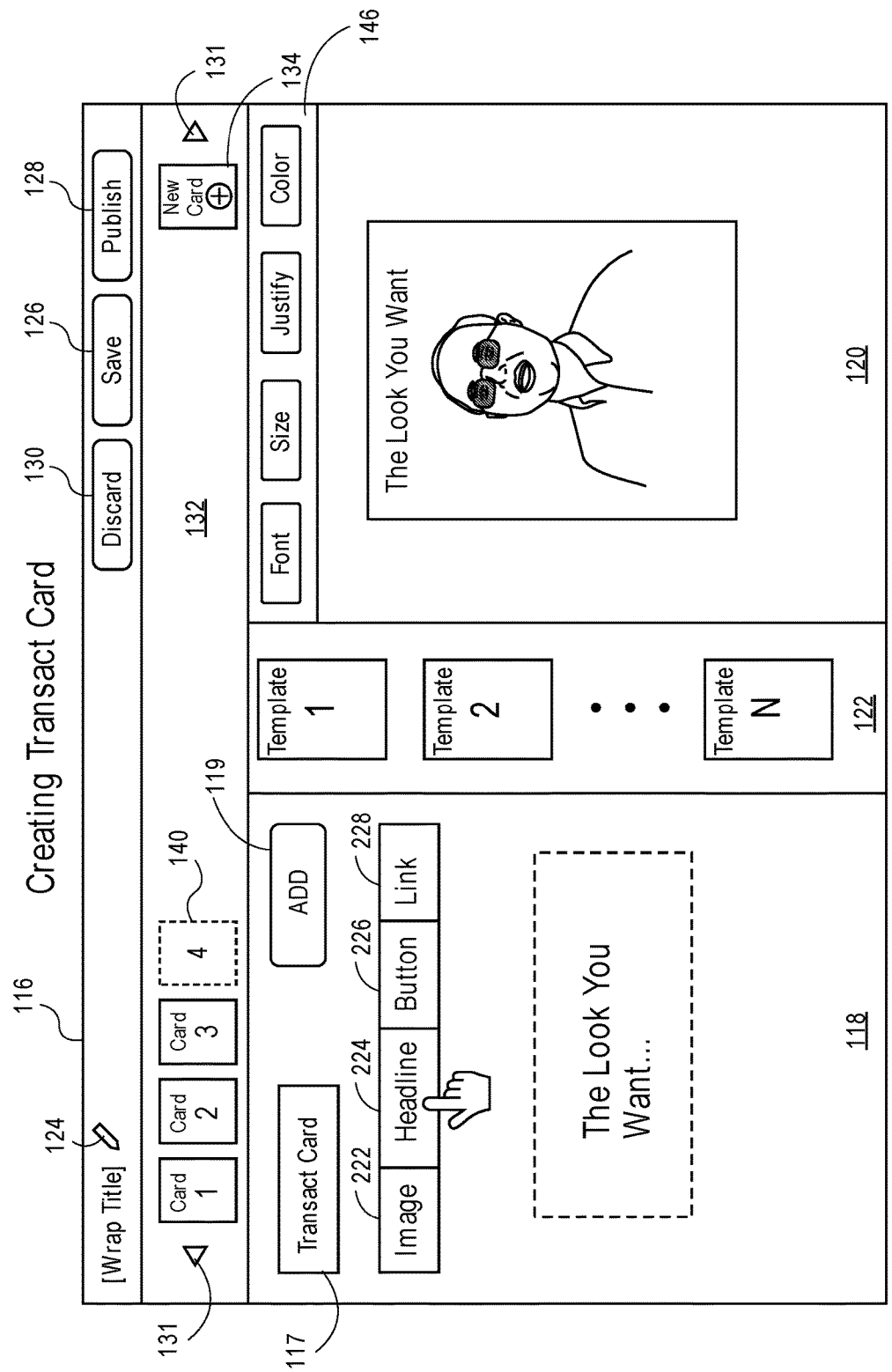
Figure 18D:
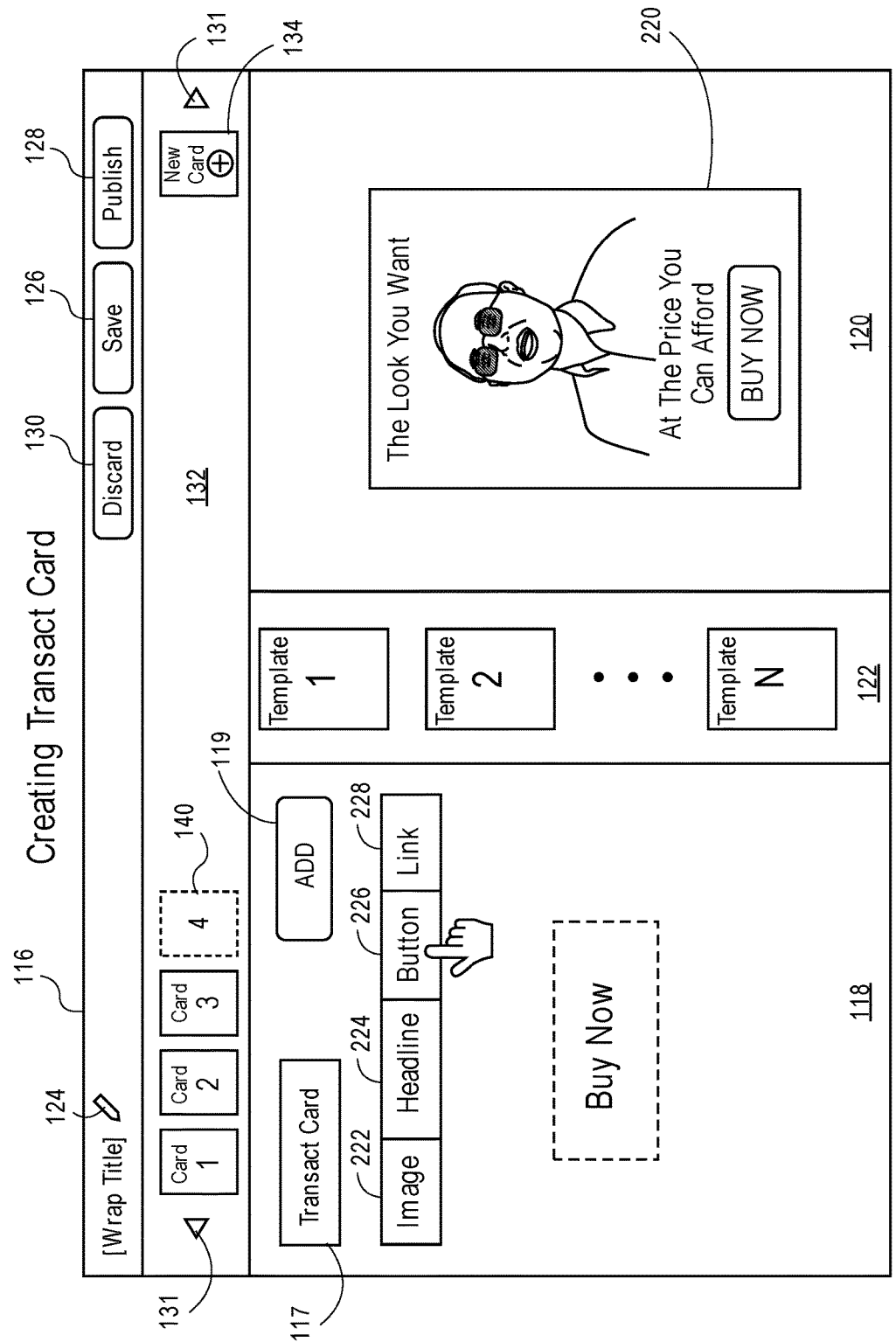

As illustrated in FIG. 18C, the headline component 224 is selected. As a result, the author may add headline to the card 220, similar to that described above.

Figure 18E:
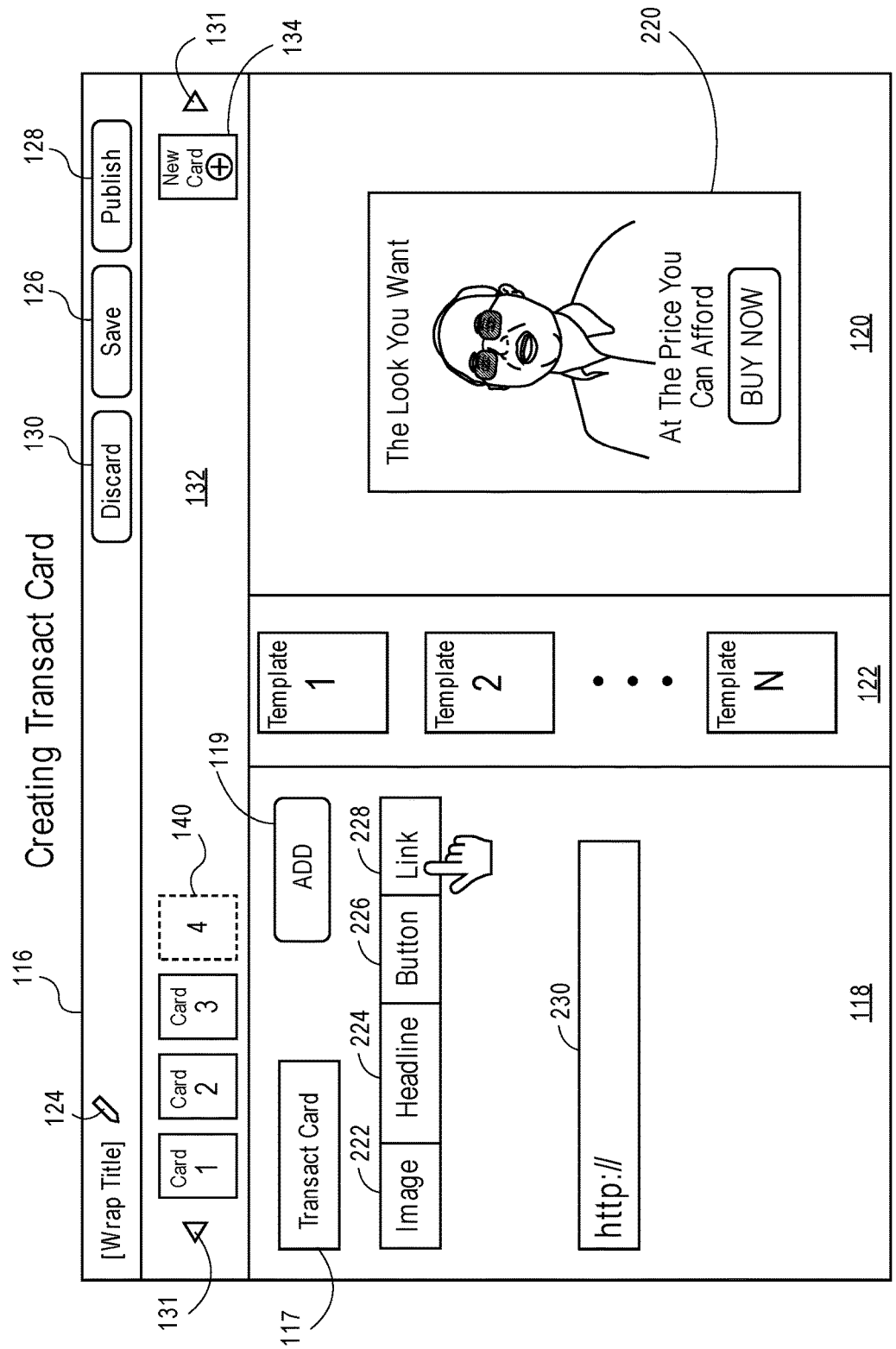

As illustrated in FIG. 18E, the button component 226 is selected. As a result, the author may add a "Buy Now" button similar to that described above.

As illustrated in FIG. 18F, the link component 228 is selected. In this non-exclusive example, the author can then enter a URL into box 230, which will result in the cul-de-sacing to a remote web site location when the Buy Now icon is selected. For instance, a web page that allows the consumer of the wrap to purchase goods and/or services appears. When the transaction is complete, the viewer is returned to the wrap package.

It should be noted that transact cards are not necessarily limited to cul-de-sacing for the processing of transactions. On the contrary, transactions can also be conducted within the context of a transact card while it is being consumed. For example, the transact card can be configured to establish a session with a back-end transaction server and the ability to synchronize data during the session. For example within the context of the wrap, the viewer may peruse a number of items for purchase. While viewing the wrap, current data pertinent to the items, such as number in stock, size information, color choices, etc., are updated and presented to the viewer while consuming the wrap. The viewer may then elect to place one or more items into a shopping cart for purchase. When ready to complete the transaction, the viewer prompted to enter the appropriate user information, such as mailing address, billing address and credit card information, to complete the transaction. Alternatively, all this information may be previously stored, in which case, the purchase can be completed with a "one-click" operation or the like.

In yet another embodiment, the processing of a transaction within a card can be implemented using a transaction widget as a component in the card. With such an embodiment, the widget appears inline an i-frame of the card. When accessed by the viewer, the content from a remote location, referenced using for example a URL, is presented in the i-frame, enabling the viewer to complete the transaction.

Referring to FIGS. 19A through 19D, diagrams illustrating the authoring of new card 140 as a gallery card are shown.

Unlike the above-described cards, the layout selector space 122 is modified to include a vertical gallery container sequencing area 123, a new gallery container icon 125 and a behavior declaration 250 that enables the author to define if the individual gallery containers of the gallery card will have a "snap" action or "rolling" scroll action when swipe navigated. In one embodiment, a gallery container may have the same frame size as the other cards in a wrap. But the size of a gallery container matching the frame size of cards is by no means a requirement. In other embodiments, a gallery container can be smaller or larger than the frame size of other cards.

When a new gallery container "N" is to be added to the vertical sequence of the gallery card, the icon 123 is selected. Thereafter, the author selects a template for the new gallery container, which could be any of the above-listed card types. In addition, the vertical sequence of the individual gallery containers of the gallery card can be changed using a drag and drop or analogous operation, similar to that described above with regard to the horizontal sequence. Consequently, the author 34 may compose a gallery card by creating, authoring and sequencing new gallery containers one after the other.

Figure 19A:
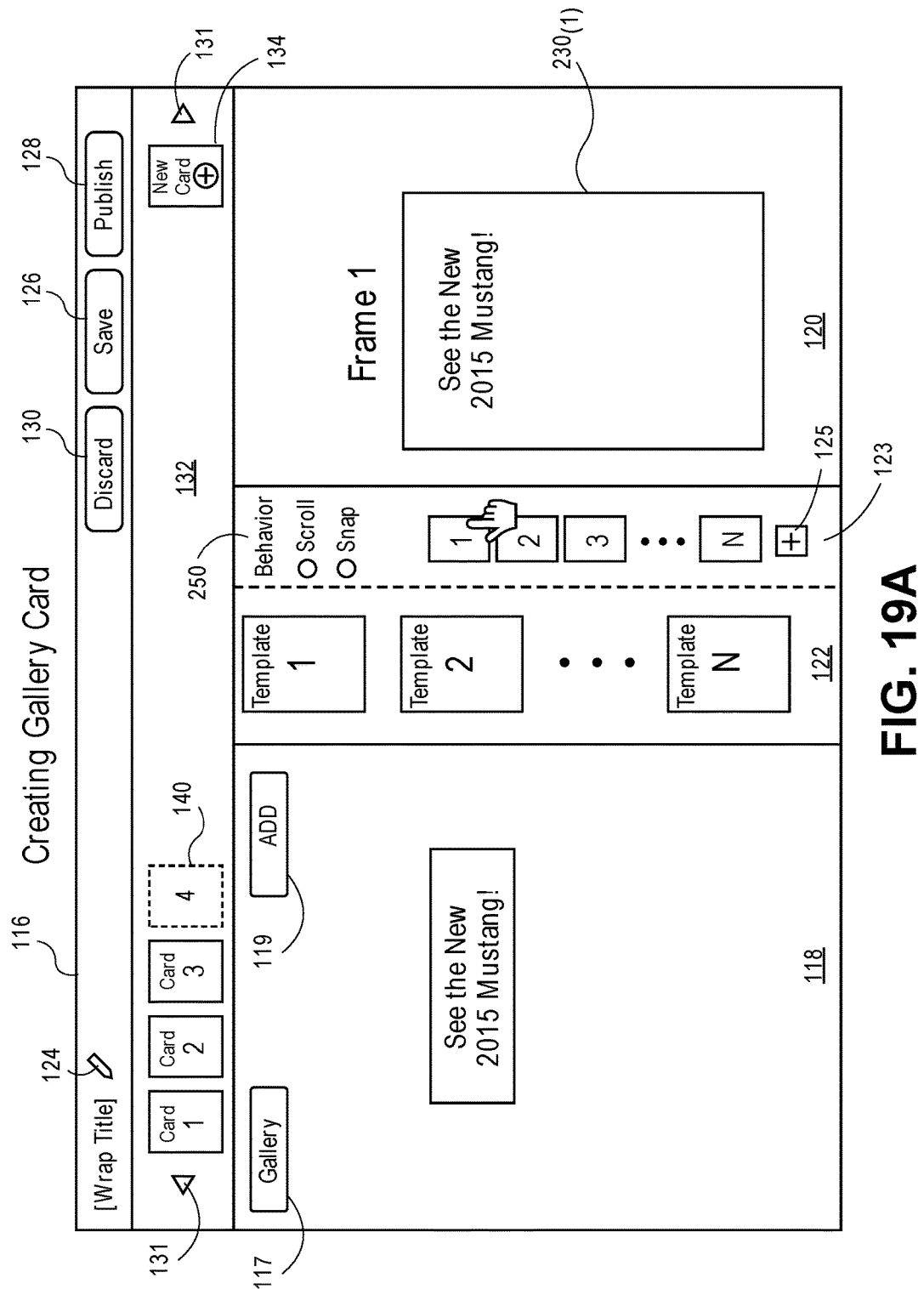
FIGS. 19A through 19E illustrate the authoring of a gallery card using the authoring tool of the present invention.

As illustrated in FIG. 19A, a first gallery container $230_{(1)}$ of the gallery card is illustrated. In this example, the first gallery container $230_{(1)}$ is selected from a text-based gallery container template that has been authored to include the text component "See the New 2015 Mustang".

Figure 19B:
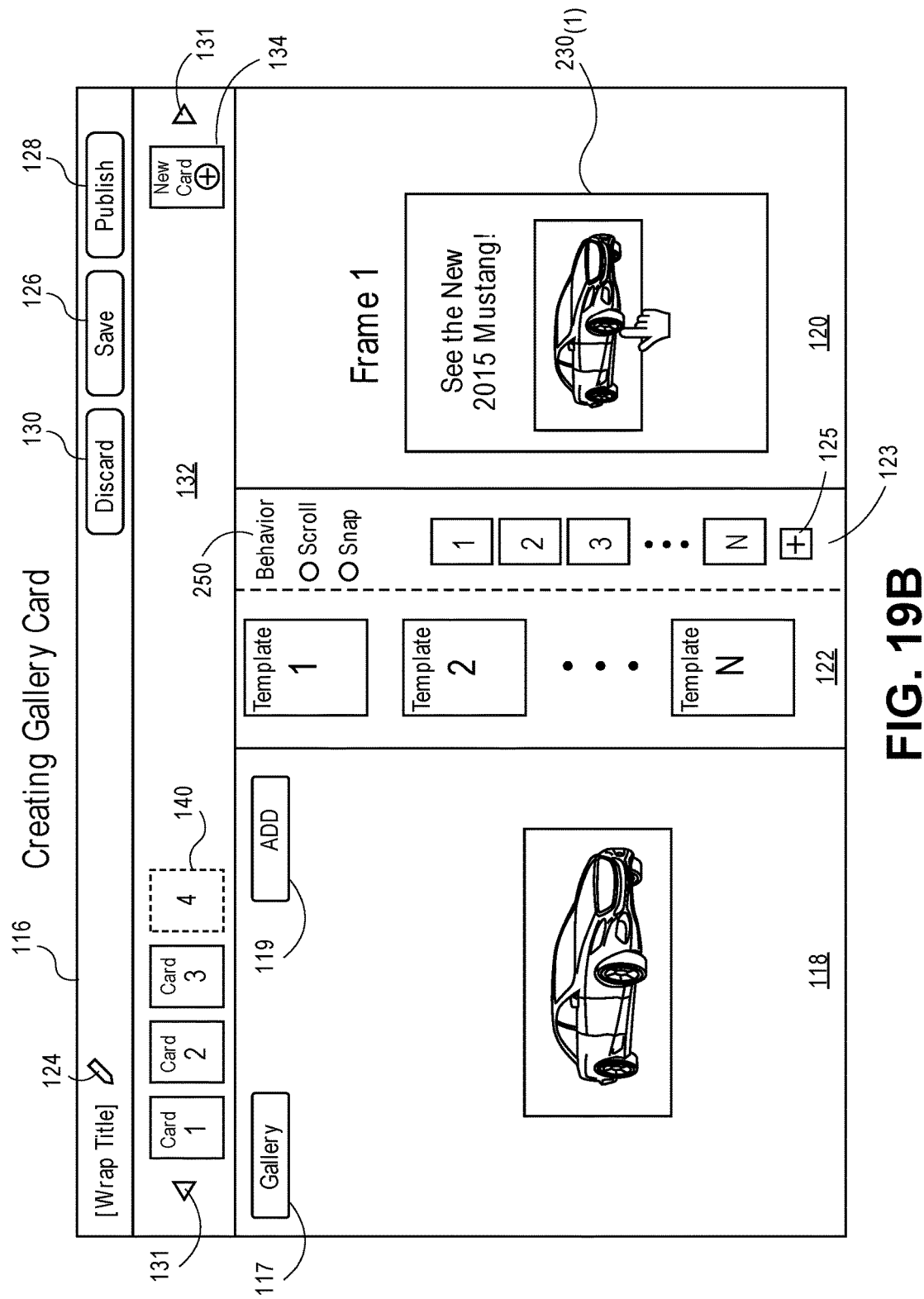

As illustrated in FIG. 19B, the same first gallery container $230_{(1)}$ of the gallery card is illustrated. In this example, the second gallery container $230_{(1)}$ is selected from an image-based gallery container template that has been authored to include an image of the 2015 Mustang.

Figure 19C:
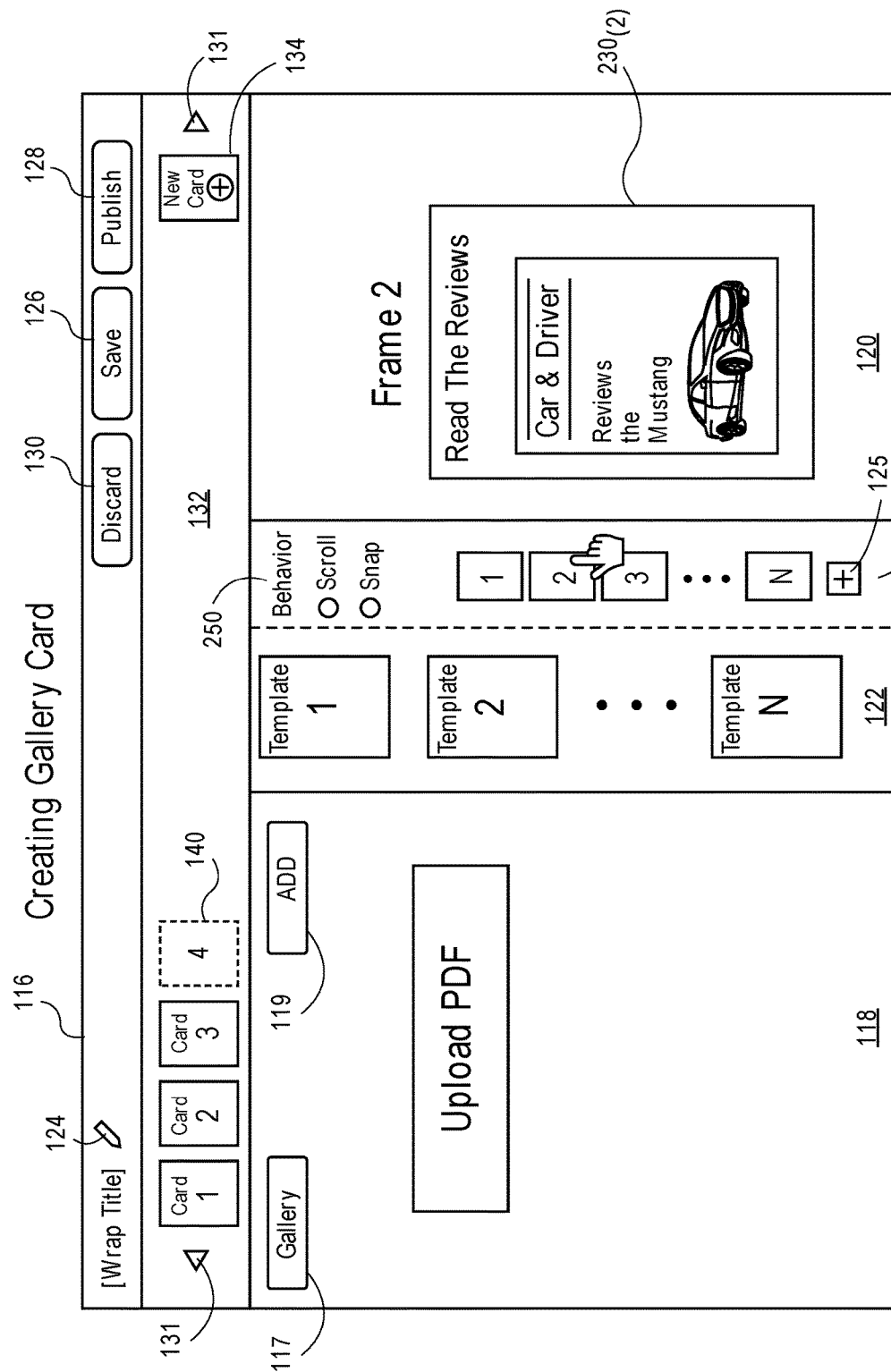

As illustrated in FIG. 19C, a second gallery container $230_{(2)}$ of the gallery card is illustrated. In this example, the second gallery container $230_{(2)}$ is selected from a document-based template that has been authored to include a PDF article about the 2015 Mustang published by the magazine Car & Driver.

Figure 19D:
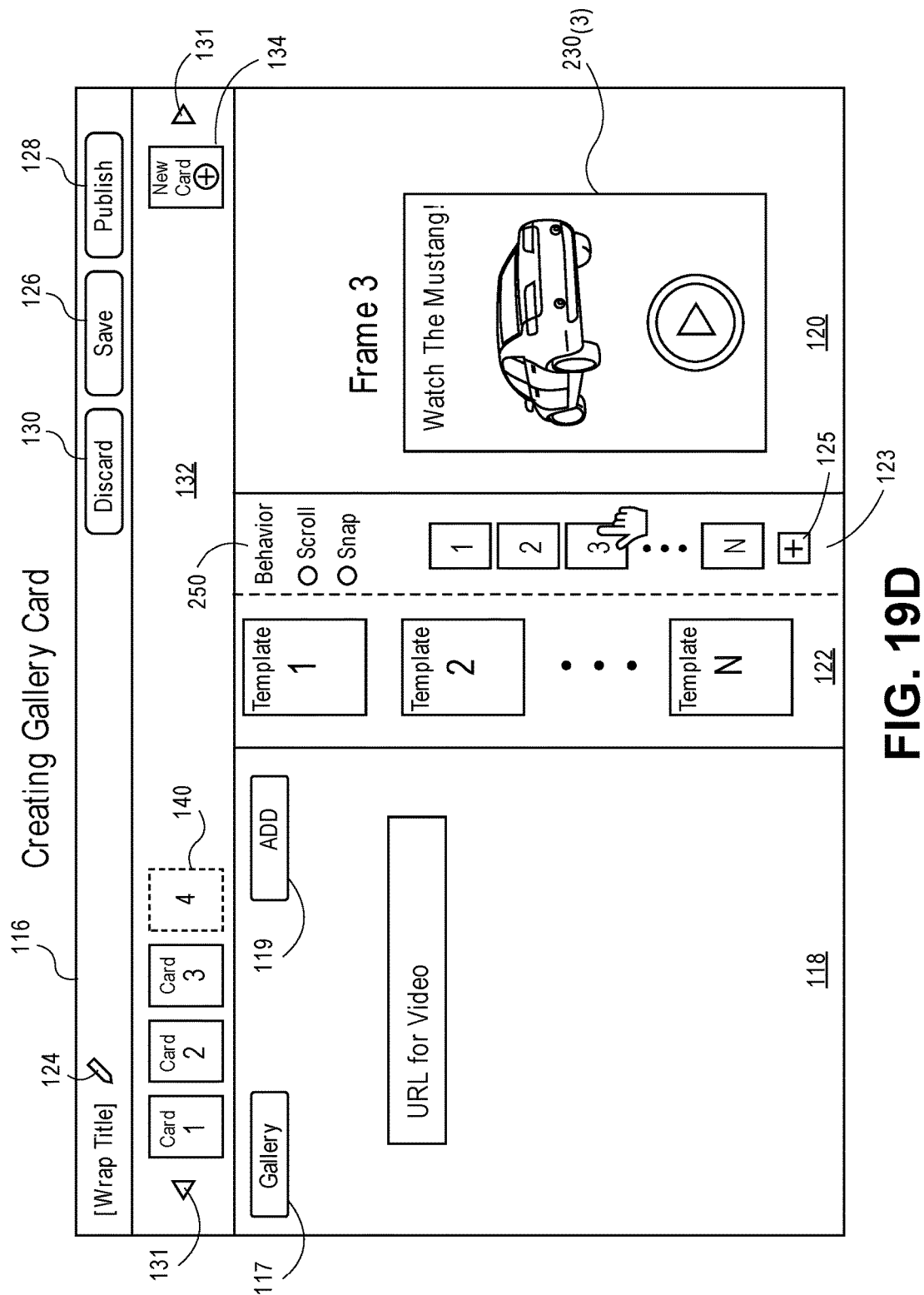
Figure 19E:
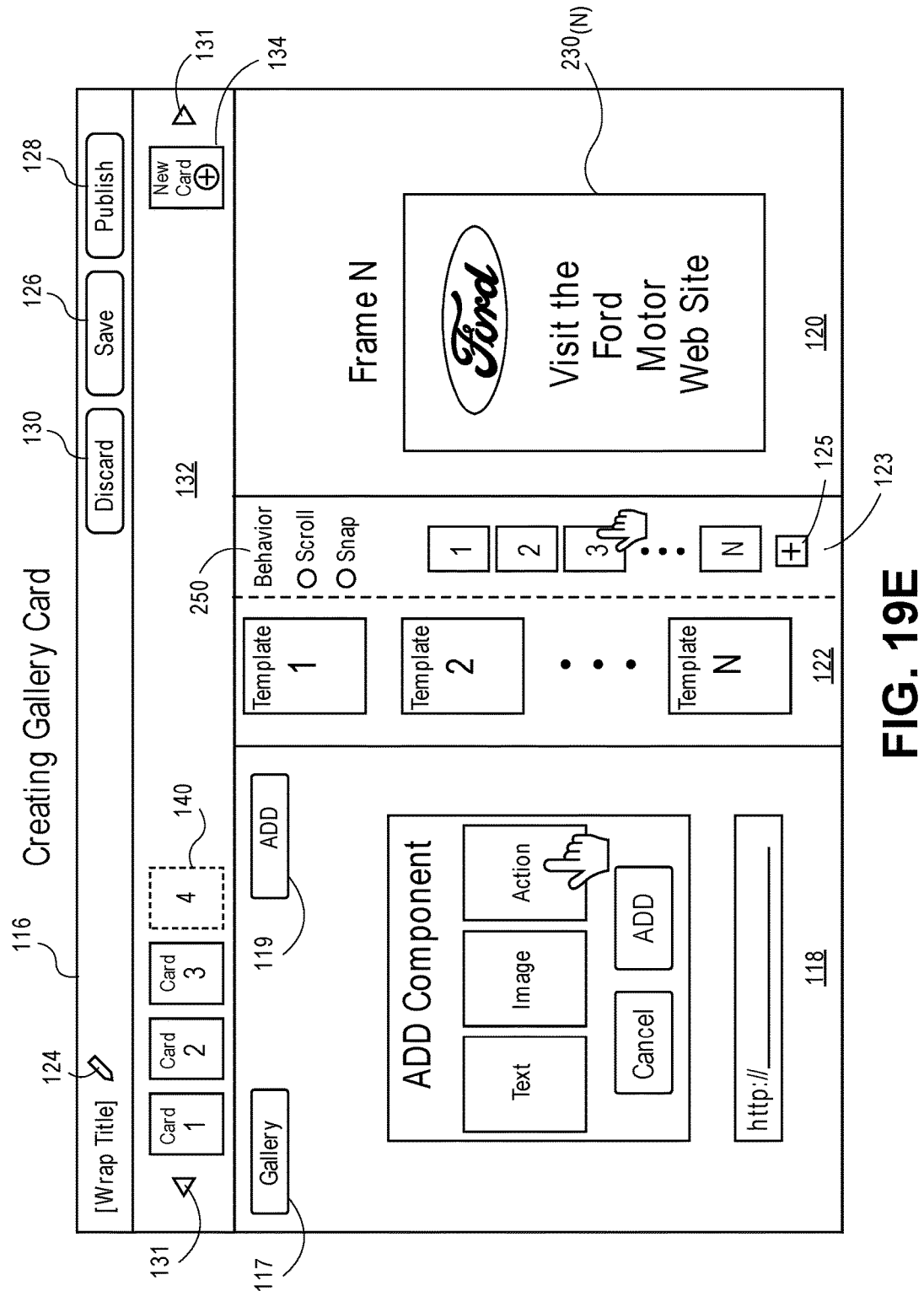

As illustrated in FIG. 19D, a third gallery container $230_{(3)}$ of the gallery card is illustrated. In this example, the third gallery container $230_{(3)}$ was selected from a video based gallery container template that has been authored to include a video of the 2015 Mustang.

As illustrated in FIG. 19D, an "N" and final gallery container $230_{(N)}$ of the gallery card is illustrated. In this example, the fourth gallery container $230_{(N)}$ was selected from an end-of-gallery template and has been authored to include a link to the Ford Motor Company web site as well as icons for sharing the wrap package.

In the above-described example, each gallery container in the gallery was authored to include different types of content, such as text, an image, a video, etc. It should be understood, however, that the above example should not be construed as limiting.

In an alternative embodiment, each of the gallery item containers may be essentially same. In other words, each gallery container of a gallery card may include the same arrangement of components, including (but not limited to) for example (i) a text container for displaying the name or label of a product, (ii) an image container for displaying an image of the product, (iii) another text box for displaying the purchase price for the product and (iv) a "BUY NOW" trigger for purchasing the product.

The above example is thus highly suitable for displaying a multiplicity of similar items. For instance with a gallery card of shoes, each gallery container would include the name or style of a shoe in the first text container, an image of the corresponding shoe in the image container, the cost of the shoe in the second text container, and the BUY NOW trigger. Since the location, styles and/or attributes of each of the components is the same, the look, feel and functionality of each of the gallery containers will essentially be the same, while only the specific content relevant to each pair of shoes will differ.

The gallery container templates used for authoring the individual gallery containers of gallery cards are similar to card templates. As such, gallery container templates have the same or similar features and functionality as described herein with respect to cards.

Figure 20A:
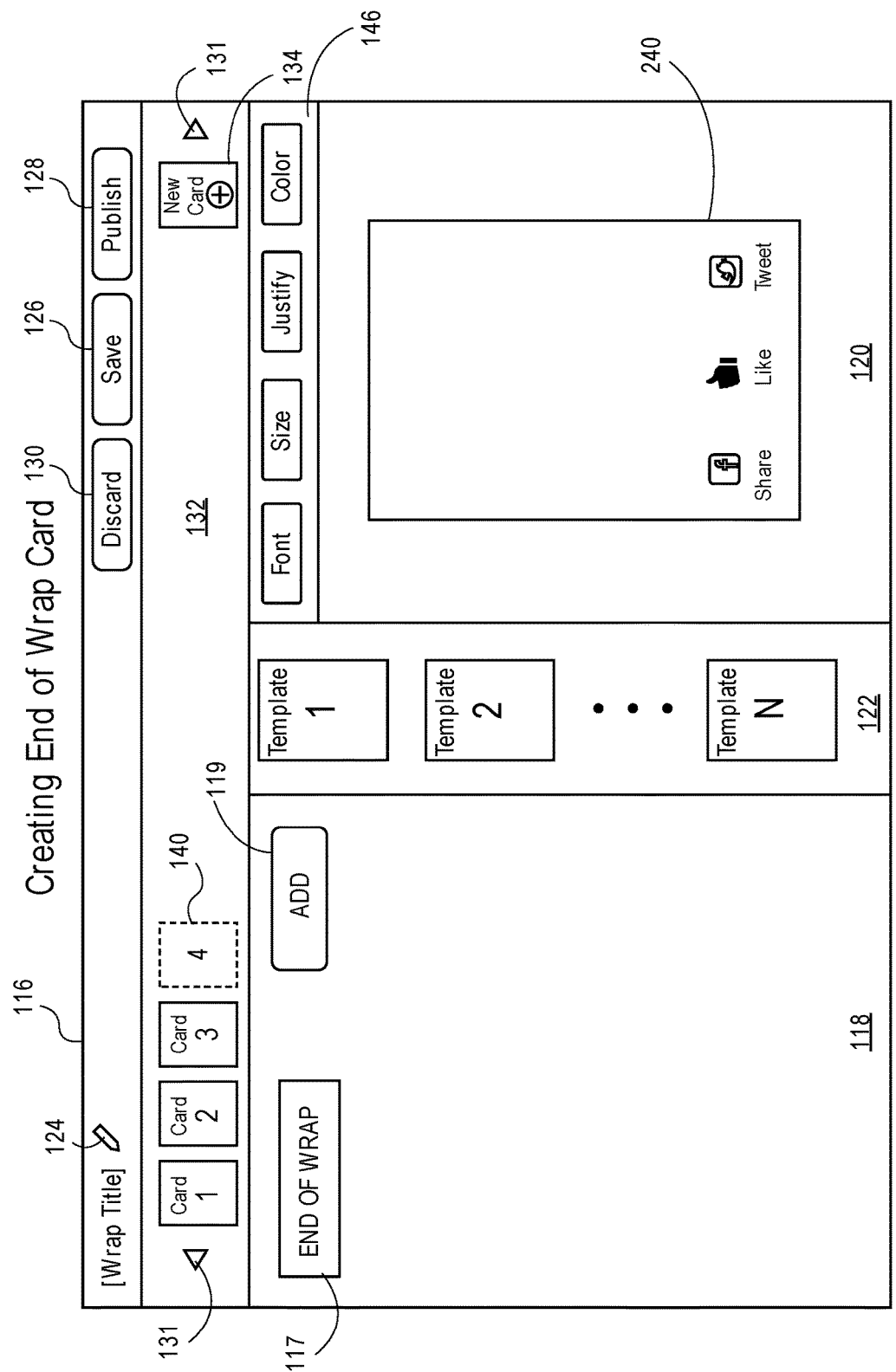
FIGS. 20A through 20B illustrate the authoring of an end of wrap card using the authoring tool of the present invention.
Figure 20B:
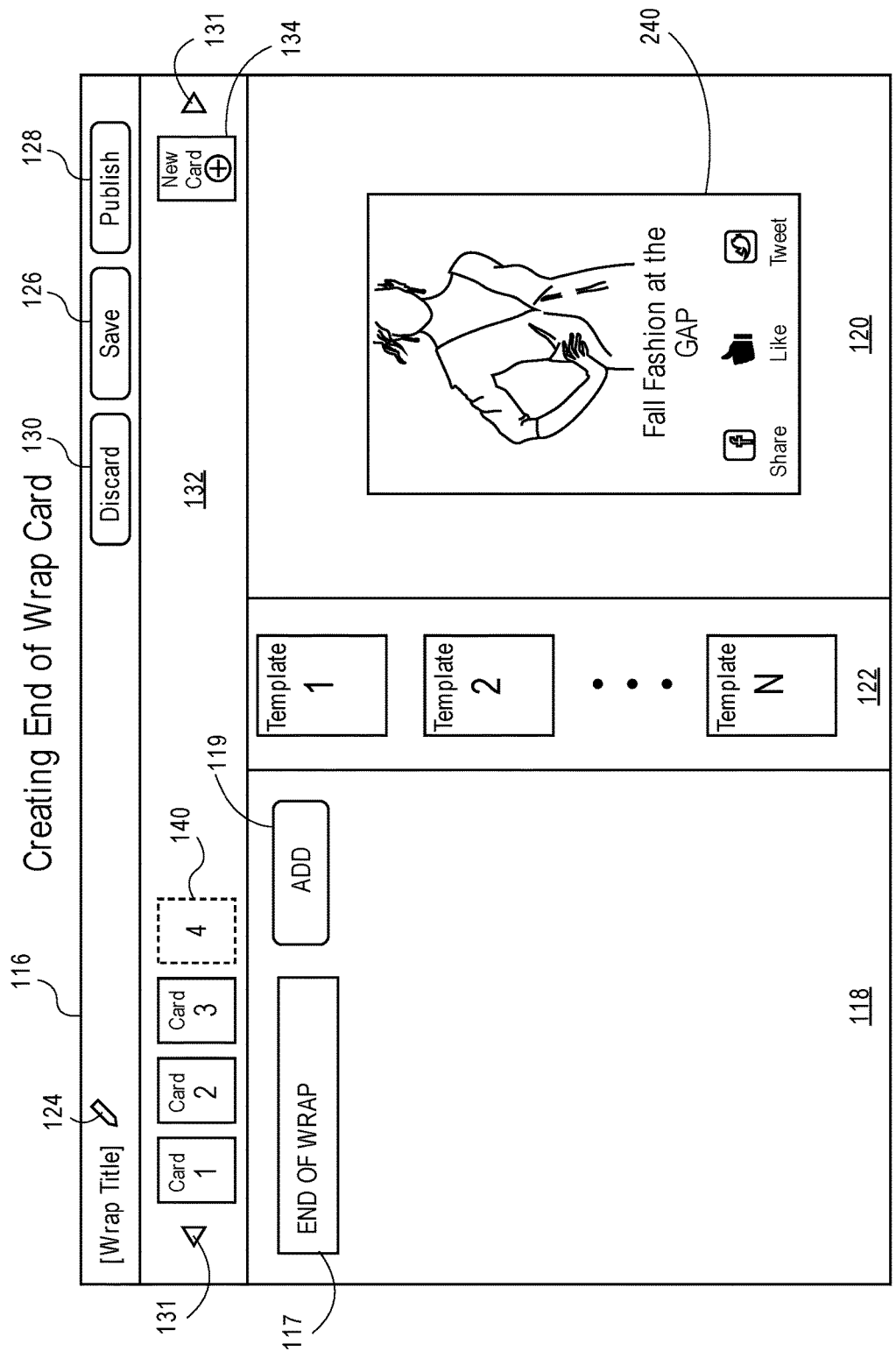

Referring to FIGS. 20A and 20B, diagrams showing the authoring of new card 140 as an end of wrap card is shown. When the end of wrap card is selected within the card type selector 136, a number of appropriate templates appear in the space 122. The author can then select one of the templates and begin the process of defining the last card 240 in the wrap package. For example, the author may select a template with "Share", "Like" and "Tweet" functionality built-in to the card, as illustrated in FIG. 20A. By selecting any of these options, the wrap package may be shared like a message, and included for example in a Facebook feed or a Twitter feed.

In addition, the author may, by selecting the add component tool 119, add image, text, video or other media, actions and/or behaviors to the card, as described above. For example as illustrated in FIG. 20B, the author has added an image of a woman in a dress and text in a sub-header that reads "Fall Fashion at the Gap". This is just one example of an almost infinite number of different card arrangements that can be authored as the last card in a wrap.

In each of the examples provided above, the new card 140 can be either saved using 126, discarded using icon 130, or published using icon 128. When saved, the card 140 is stored in its current state and can be later accessed for additional authoring. When discarded, the card 140 is removed from the sequence space 132. When published, the card 160 is included in the wrap package. At any point in time, the wrap package, or any particular card in the package, can be edited, removed, re-ordered, etc., using the above-described tools.

It should be understood that the card authoring examples provided above are merely exemplary and should in no way be construed as limiting. In various alternative embodiments, the authoring tool 100 may use an almost limitless number of different card templates, components, styles and attributes, functionality and card types, resulting in an almost infinite number of different cards that may be used in wrap packages.

Analytics

Analytics can be used to gain insights into defining content that may be defined and used in wrap packages. This custom content, derived at least partially with the use of analytics, is hereafter sometimes referred to as "insight" content. As described in detail below, a wide variety of different types of analytic tools may be used to generate insight content that may be used in wrap packages.

Companies, businesses and other organizations often use analytics to determine the outcome of marketing campaigns and to guide decisions for investment and consumer targeting. Demographic studies, customer segmentation, conjoint analysis and other techniques allow marketers to use consumer purchase, survey and related data to understand and communicate marketing strategy. Analysis techniques frequently used in marketing include marketing mix modeling, pricing and promotion analyses, sales force optimization, customer analytics, etc. Thus, in a similar manner, insight content for wrap packages can be defined using analytics.

Similar to Web site analytics, analytics can also be used to measure, comment and analyze the use of wrap packages for the purpose of better understanding and optimizing their use. Wrap specific analytics can help companies and other organizations measure the results of wrap packages, including the number of views of the wrap package, views of individual cards, the click-through rate, etc. Wrap package analytics can also be used to specify the structure, layout and sequence of the cards, in addition to any content including insight content, included in the set of cards of the wrap package. For example, wrap analytics can be applied to specify the number of cards and their sequence order in the horizontal and/or vertical directions. Analytics can thus be used as a tool by businesses and other distributors of wraps to improve their effectiveness. By applying analytics, useful marketing information, such as usage, distribution, popularity, etc. of wrap packages, can all be measured, gauged and applied to increase the potency and usage of wraps In other embodiments, the analytics can be applied to target recipients of the wrap package. For example, analytics related to age or age group, gender, geographic location, buying history, demographics, income, etc. of target recipient(s) can all be selectively applied to again define the content, including insight content, structure, layout and sequence of the cards of wrap packages.

In yet other embodiments, the analytics pertain to marketing, risk, portfolio, predictive, security, and or analytics specific to wrap packages can also be applied. In yet other embodiments, one or more of the above analytics tools, along with others not listed herein currently known or developed in the future may be used. Regardless of the analytic tool(s) used, conclusions and/or meaningful usage patterns can be used to define insights into the content, organization, layout of wrap packages, all of which may used to increase the effectiveness of wrap packages.

A number of examples are provided below where wrap packages are created and delivered in response to various triggers and/or beacons. In variations of these embodiments, analytics can be used to generate or define insight content that then can be used in the wrap package.

Figure 21:
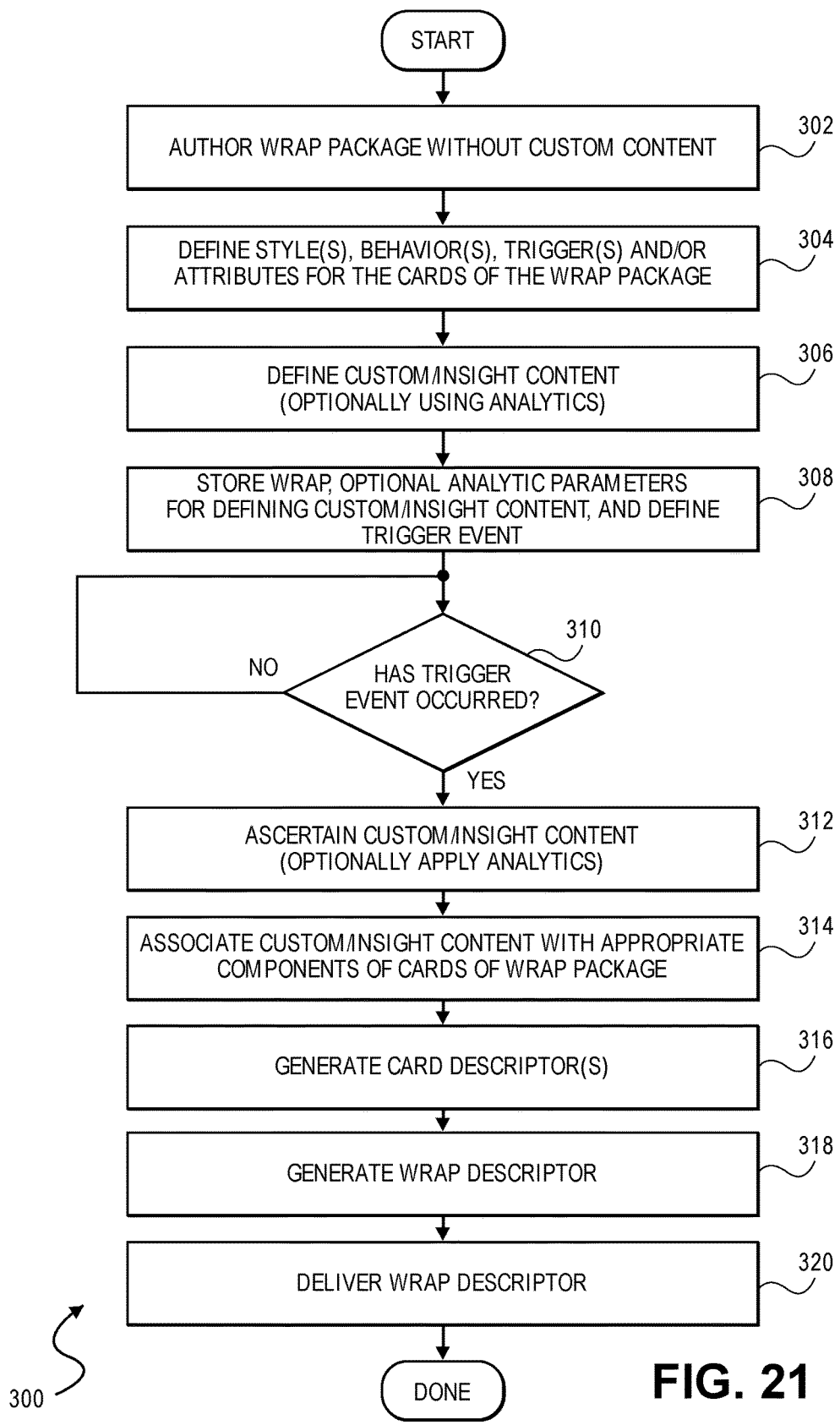
FIG. 21 is a flow chart illustrating the steps of authoring and distributing a wrap package with custom content in accordance with a non-exclusive embodiment of the present invention.

Authoring and Automatically Delivering Wrap Packages with Custom/Insight Content Referring to FIG. 21, a flow chart 300 illustrating the steps of authoring and automatically delivering wrap packages with custom content, including possibly insight content derived from analytics, is illustrated.

In the initial step 302, the author creates a wrap package without certain content. This step typically involves the author generating a wrap package of cards using the authoring tool 100, as described above with respect to FIGS. 7 through 20B. During one or more authoring sessions, the author creates a set of cards and defines their horizontal and/or vertical sequential order(s). The cards may be of any card type as specified above, including but not limited to, textual, image/photo, video, transact, gallery, appointment/reservation, chat, GPS/location, and end of wrap.

During the authoring process as defined in step 304, the style(s), behavior(s), trigger(s) and/or attributes of the various cards of the wrap are defined. As the cards are created, the author relies on the various tools described herein to specify the user experience when consuming the wrap by defining the style (e.g., font type, size, color of text and the like), card behaviors (i.e., scrolling or snap to frame), triggers (e.g., "Buy Now", "Book Now", etc.). However, as described in more detail below, certain content is not included in the wrap package at this point.

In step 306, the author defines a class of custom content that is to be included in the wrap package when it is delivered to a target recipient. Most often, although not necessarily, the class of custom content falls into a broad category of content that is readily defined, but the specific content (i.e., a variable) is not yet known at the time of authoring. For example, the wrap package may be an "active receipt" that accompanies the purchase of a good and/or service. As such, the specific classes of custom content may fall into a number of broad categories, such as customer name, customer account information, purchased product details, etc. Since none of specific transaction variables can be known until an actual transaction takes place, however, the author will create during the authoring process "empty container" components in the various cards for each broad class of content. When the specific variable content becomes known or defined, the "empty container" components are then filled prior to distribution of the wrap package.

In a non-exclusive, but more specific embodiment, the empty containers can be defined by component type. For example, the empty containers can be specified as an empty text component type, an empty image component type, an empty video component type, and empty transact component type, etc. As such, the variable content in each case is limited to the corresponding component type. In other words, only text, images/photos, video, transactions, etc. can be inserted into or associated with empty text, image, video, and transact empty containers respectively. Thus while the content in each is variable, each empty container is limited to its component type.

In an optional variation of step 306, the author may specify that analytics be applied when the custom variable content is generated. For example, with a purchase of a product, analytics can be used to generate variable custom content, again sometimes referred to as "insight" content, that is insightful with respect to the both the purchase item and the target recipient, as opposed for example, randomly generated content. Such marketing analytics may include, but are not limited to, the age, gender, location, purchase history, demographics, etc., of the target recipient, the trigger event, or other parameters. Other product or marketing analytics can also be applied specific to the purchased item for the purpose of generating variable insight content that can then be included in the wrap prior to distribution.

In step 308, the authored wrap package with the empty content container(s) and any analytics rules, algorithms, parameters, or methods used to draw insights, or otherwise define the variable insight content using analytics is stored. In addition, the author specifies a trigger event for triggering the access, application of the analytics, and the insertion or association of the resulting insight variable content into the appropriate empty container components(s) in the card(s) of the wrap package.

In various embodiments, the trigger event can be defined as any conditional event. Although the number of events that could be used as a trigger is too numerous to exhaustively list, several examples will be described herein, pertaining to a purchase of a product at a department store. When the trigger event happens, it triggers the delivery of an "active receipt" wrap package with variable custom content, including possibly insight content as described in more detail below. It should be understood that these examples are provided merely for illustrative purposes. In no way should these examples be construed as limiting.

As provided in decision step 310, when the trigger event occurs, then a series of steps, as described below, are performed that result in the creation and distribution of the wrap package with custom and/or insight content to a target individual.

As provided in step 312, the variable custom content is defined and accessed from storage or otherwise associated with the wrap. For example, if a particular customer purchases a specific product, then the corresponding customer and product records are accessed from database(s) and the relevant information is retrieved. As previously noted, analytics may optionally be applied to provide useful insights into defining the variable custom and/or insight content that is inserted or otherwise associated with the wrap. In various embodiments, the variable custom content, including any insight content, can be included inline or referred to using an identifier such as a URL Thereafter, as specified in step 314, the variable custom and/or insight content is/are inserted into or otherwise associated with the appropriate empty container component(s) of the cards of the wrap package.

As specified in step 316, card descriptors are generated for each card of the wrap package. In this step as explained in more detail below, data object(s) are created for each component in a card, including the components containing custom/insight content, for each card in the wrap.

In the next step 318, a wrap descriptor is generated from all of the card descriptors generated in the previous step. Since the card descriptors include objects that correspond to the custom and/or insight content, the wrap descriptor also defines the custom and/or insight content.

Finally, in step 320, the wrap package with the variable custom and/or insight content is ready for distribution to the target recipient once the wrap descriptor is defined. As previously noted, the wrap descriptor may be distributed numerous ways, including but not limited to, by including the wrap ID 42 in an email, as a message, in a social media feed, or any other method.

Figure 22:
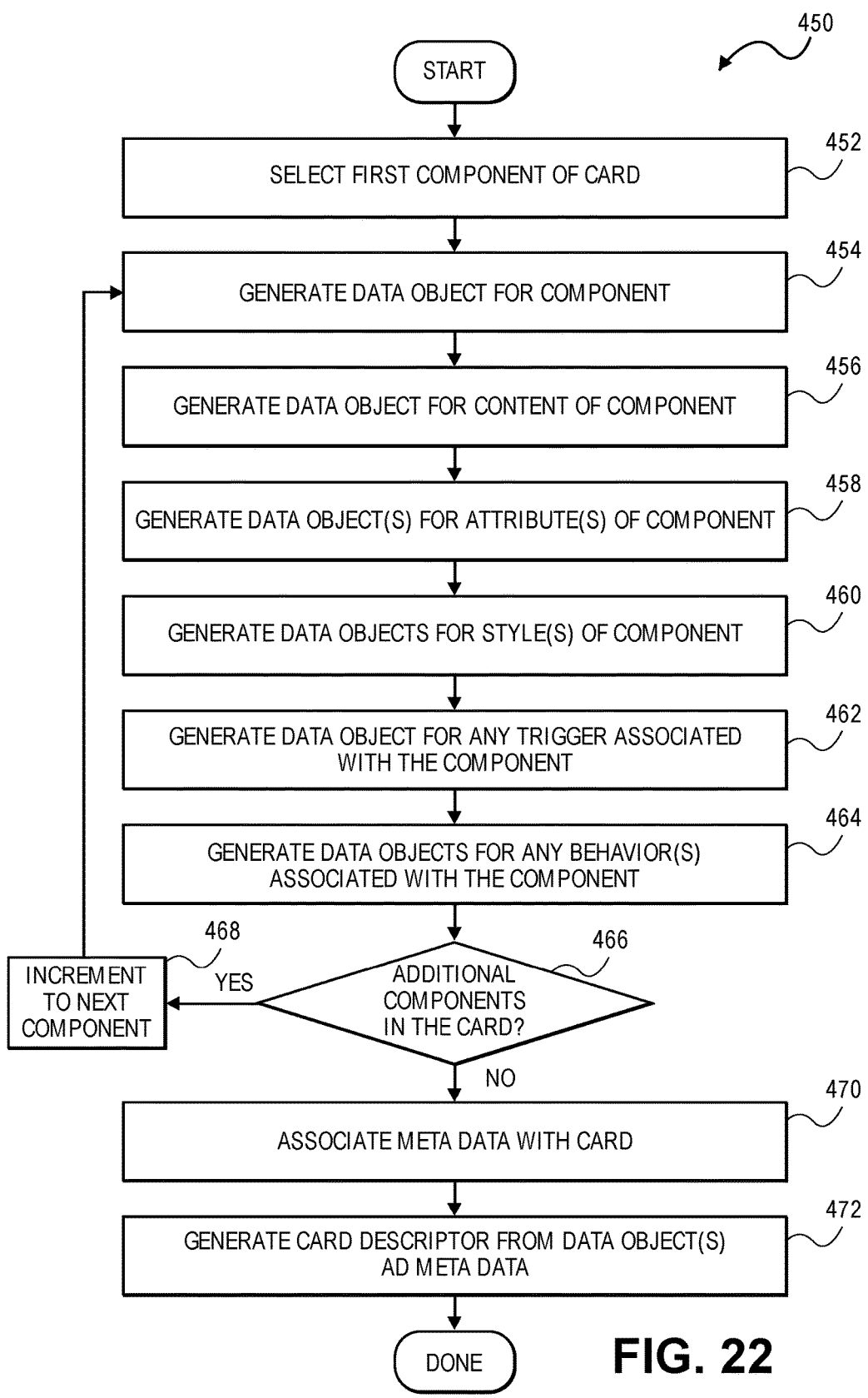
FIG. 22 is a flow chart illustrating the steps of generating a card descriptor for a card of a wrap package in accordance with a non-exclusive embodiment of the present invention.

Referring to FIG. 22, a flow chart 450 illustrating the steps of generating card descriptors (i.e., step 316 of FIG. 21) for each card in the wrap is shown. As previously noted, a card descriptor is a collection of data objects. Thus, generating a card descriptor generally involves generating and assembling individual data objects for all the component(s), content(s) and feature(s) contained in the card, including any custom and/or insight content.

In initial step 452, a first component of the card is selected. Thereafter, data object(s) are generated for the component (step 454) along with any content in the card, regardless if the content was originally authored into the card or later added as variable custom and/or insight content (step 456). In addition, data object(s) are generated for attribute(s) (step 458), style(s) (step 460), trigger(s) (step 462) and/or defined and/or declared behavior(s) (step 464) associated with the component. In decision step 466, it is determined if there are any additional components associated with the card. If yes, then steps 454 through 466 are repeated for each component. If not, then in step 470, any meta data is associated with the card. Finally, the card descriptor is generated from all the data object(s) and the meta data (step 472). The card descriptor thus contains everything needed to render the card at runtime, including any variable custom and/or insight content.

It should be noted that the flow chart 450 described above similarly applies to gallery cards. For each gallery container of the gallery card, the above process is repeated for each component. When all the components have been exhausted for a given gallery container, the process is repeated for the next gallery container. A card descriptor is then generated for the gallery card when the above-described iterative process is complete for all of the gallery containers.

Figure 23:
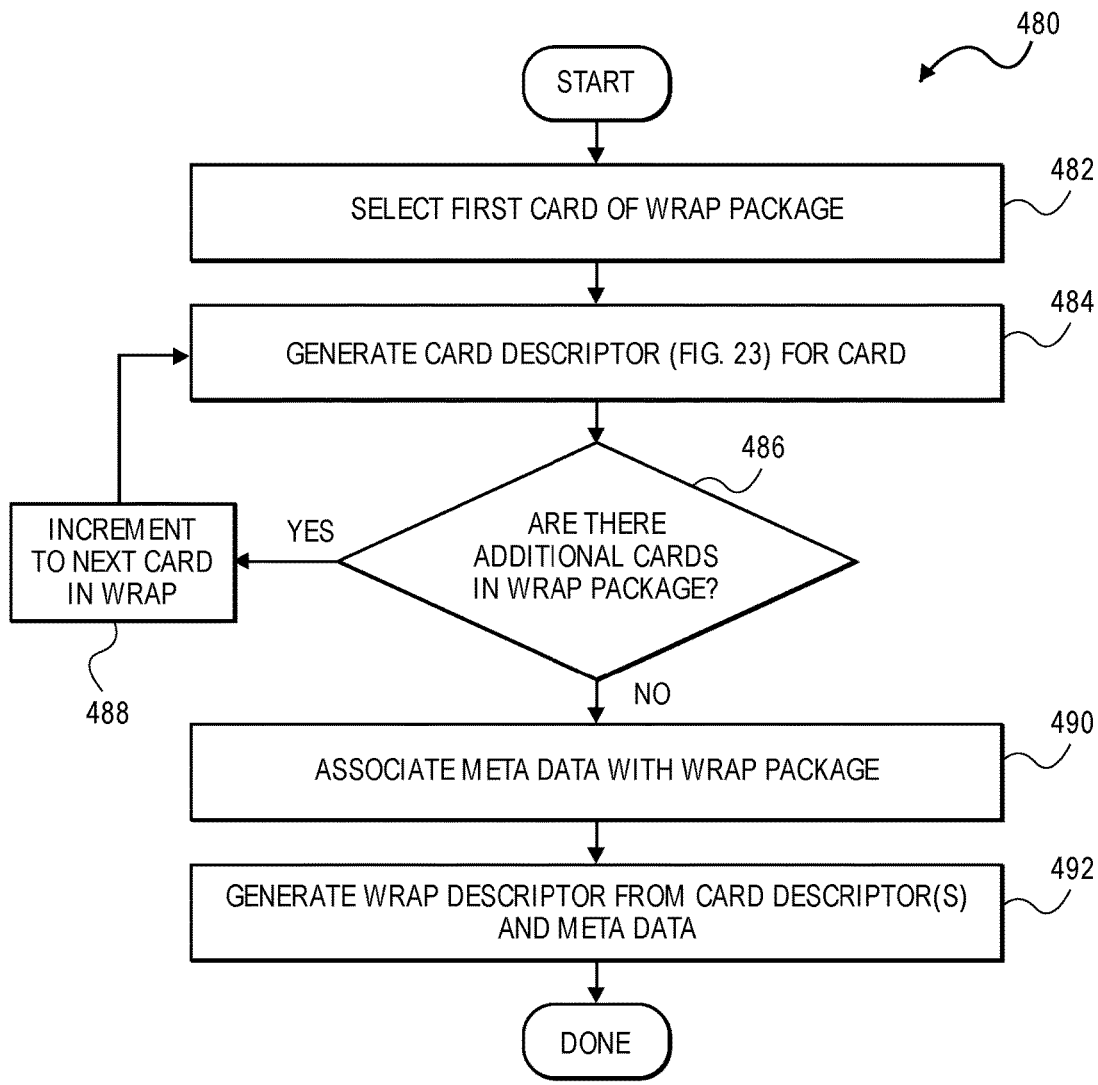
FIG. 23 is a flow diagram illustrating the steps of generating a wrap descriptor from one or more card descriptors of a wrap package in accordance with a non-exclusive embodiment of the invention.

Referring to FIG. 23, a flow diagram 480 illustrating the steps of generating a wrap descriptor (step 320 of FIG. 21) is illustrated. In the initial step (482), a first card of the wrap is selected and its card descriptor is generated (step 484) using the process described above with respect to FIG. 22. Thereafter, in decision 486, it is determined if there are any additional cards in the wrap package. If yes, then the next card in the wrap is incremented (step 488) and the card descriptor for that card is generated in step 484. This process is repeated until a card descriptor is generated for all the cards in the wrap, as determined in decision 486. In step 490, any meta data is associated with the wrap package. Finally, in step 492, the wrap descriptor is generated from all the card descriptor(s) and any meta data associated with the wrap.

The wrap descriptor is thus a collection of card descriptors, each specified in terms of a collection of data objects defining the structure, layout and content, including any variable custom and/or insight content, for each of the cards of the wrap package respectively. As such, the wrap descriptor includes everything necessary to render the wrap upon runtime, including any variable custom and/or insight content.

Example

Active Receipts with Variable Custom/Insight Content

Figure 24A:
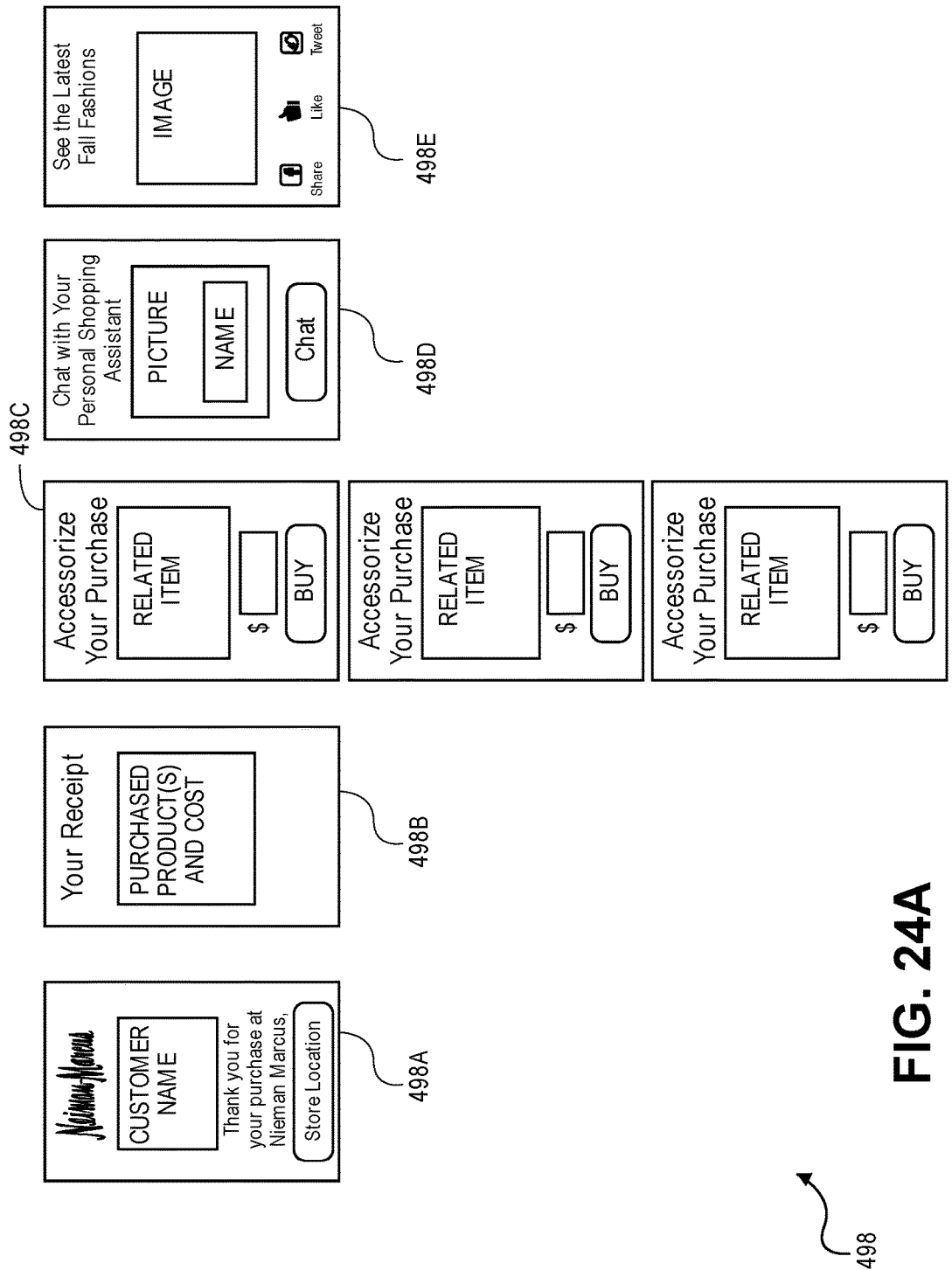
FIG. 24A through 24D are a set of diagrams illustrating the authoring and distribution of active receipt wrap packages with custom content and an infrastructure for doing the same.

Referring to FIG. 24A, an exemplary wrap package 498 authored without custom and/or insight content is illustrated.

In this example, the wrap package 498 is for distribution to customers as an "active receipt" for purchase of product(s) at the department store, Neiman Marcus.

In this example, the wrap package 498 has been authored to include a total of five (5) cards.

The first card 498A provides the Neiman Marcus logo and includes variable text component containers for custom and/or insight content, including the yet to be defined name of a purchasing customer and the location of the local store where the customer purchases an item.

The second card 498B includes a variable image and/or text component container for custom content, including a text and/or an image of a receipt for the yet to be defined purchased product(s).

The third card 498C is a gallery card that includes three gallery containers. In each, a variable image component container is provided for displaying an image/photo of a yet to be defined accessory product that is related to the yet to be purchased item. In addition, a variable text component container is provided for the display of the purchase price for the displayed item once it has been defined. Since each gallery component includes a transact trigger, selecting the "BUY" button initiates a transaction process for purchasing the displayed item at the displayed price using any of the above-mention transaction techniques.

The fourth card 498D is a chat card that includes variable text and image component containers for custom content, including the name and photo of a yet to be defined personal shopping assistant. Since card 498D is a chat card, selection of the "Chat" trigger initiates an online chat session with the designated sales assistant using any of the above-mentioned methods for implementing a chat function within a card.

Finally, the fifth card 498E is an end of wrap card. This card includes a variable image component container for an image/photo appropriate for the end of the wrap.

Figure 24B:
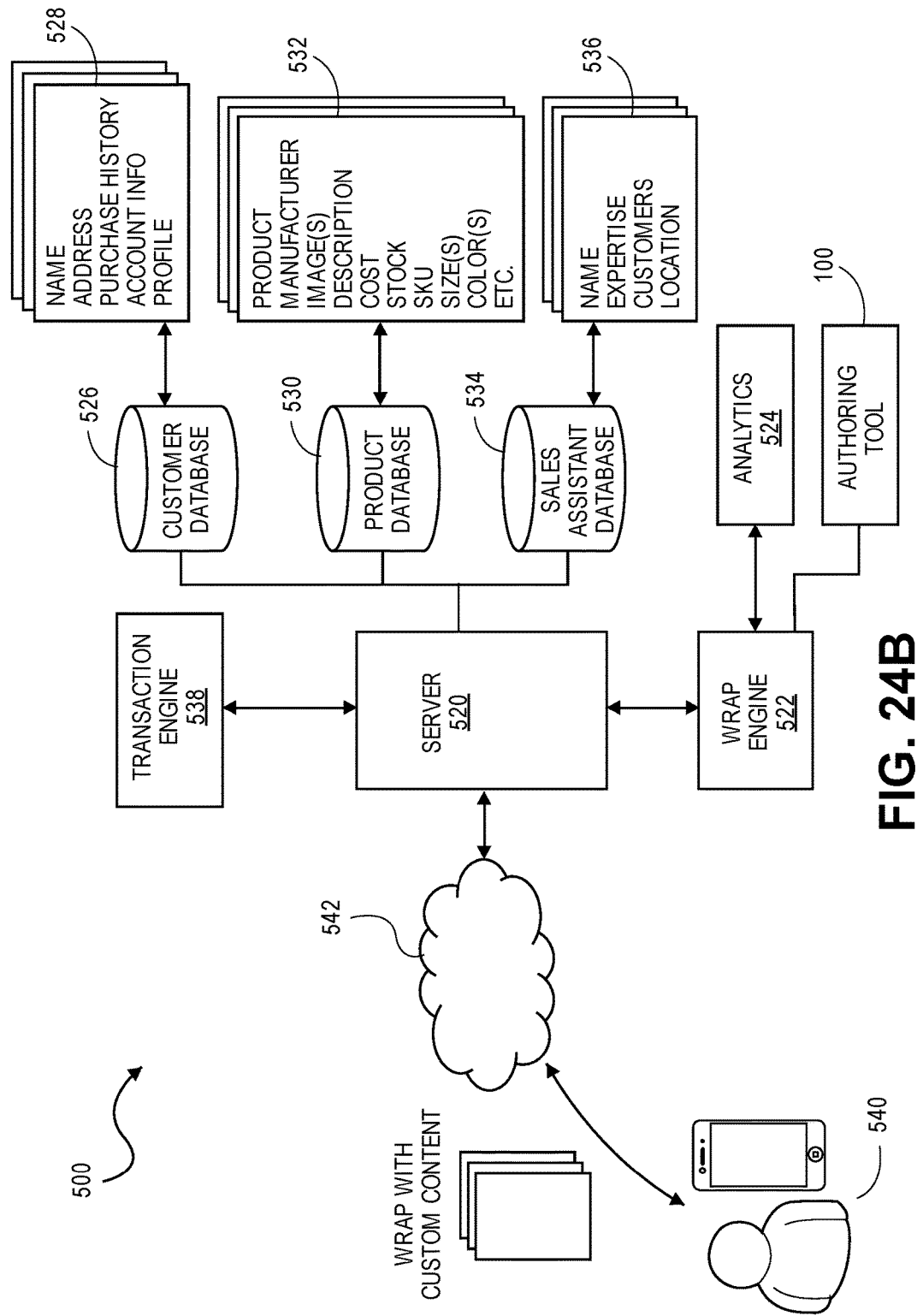

Referring to FIG. 24B, an exemplary logical computing infrastructure 500 for authoring and automatically distributing wrap packages 498 with variable custom content for Neiman Marcus is illustrated. The infrastructure 500 includes a server 520, a wrap engine 522, an analytics tool 524, the authoring tool 100, a customer database 526 containing a plurality of customer records 528, a product database 530 including a plurality of product records 532, and a sales assistant database 534 that includes records 536 for personal sales assistants for Neiman Marcus. In addition, the infrastructure 500 includes a transaction engine 538 for processing transactions that originate in the wrap package 498.

In this example, the author uses the authoring tool 100 to author the wrap package 498, including the empty custom content container components as described above. Once the authoring process is complete, the wrap package 498 and the trigger event are stored at the wrap engine 522. When the trigger event occurs (i.e., a customer purchases an item at a Neiman Marcus store), the wrap engine 522 interacts with the customer database 526, the product database 530 and sales assistant database 534 via the server 520, retrieving the appropriate records to fill the empty component containers of the cards 498A through 498E respectively.

As previously noted, the analytics engine 524 may optionally be used to ascertain at least some of the variable custom and/or insight content, based on insights and other conclusions, inserted into or associated with some of the content container components. Thereafter, the card descriptor and the wrap descriptor for the final wrap package, including the custom and/or insight content, is generated and stored at the wrap engine 552. Thus, when requested by the purchasing customer 540, a wrap package with custom and/or insight content, derived from wrap package 498 of FIG. 24A, is delivered over the network 542. In the examples discussed below, two wrap packages with custom and/or insight content, 550 and 560, are provided to two different purchasing customers.

Figure 24C:
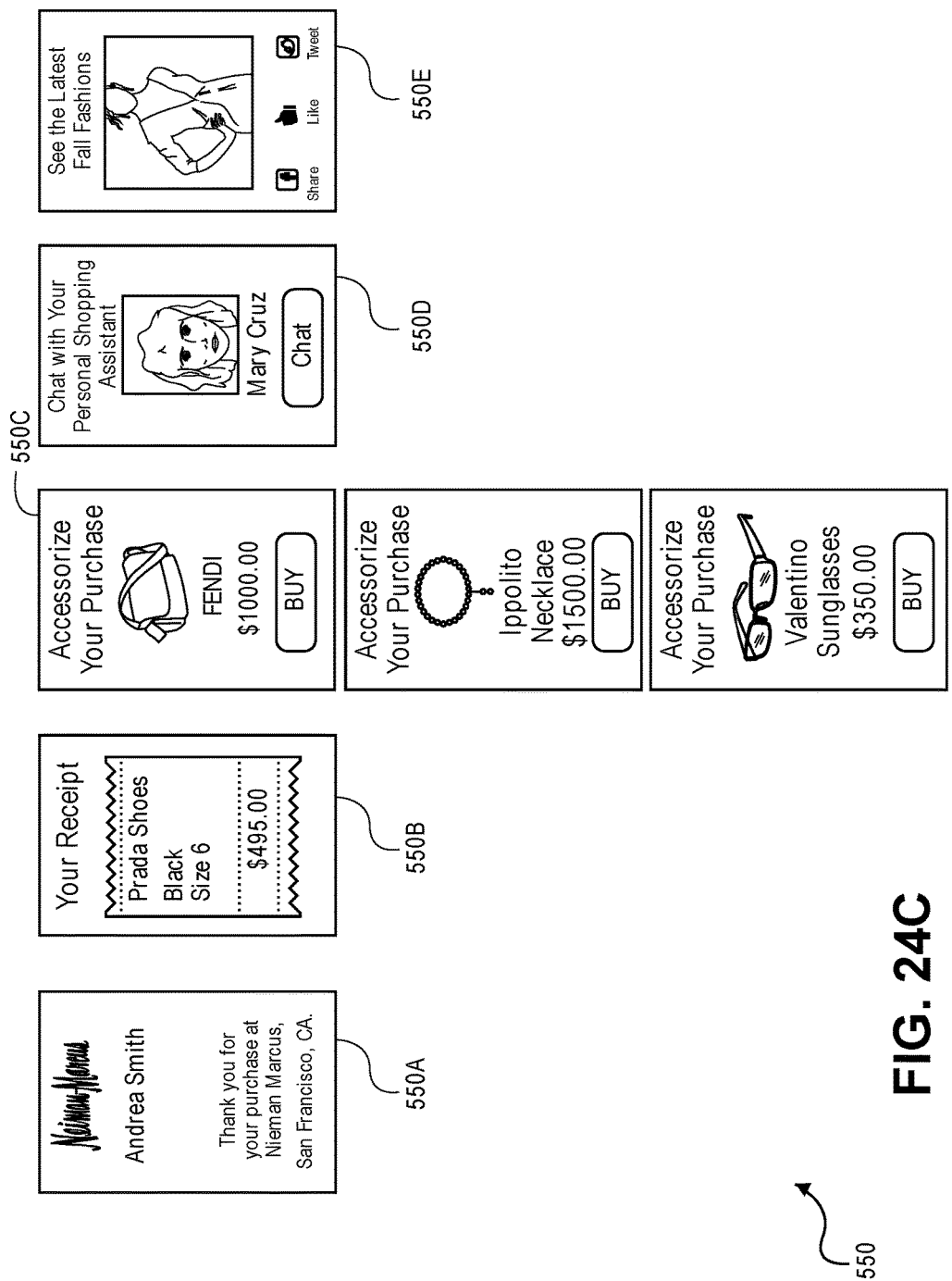

Referring to FIG. 24C, the wrap package 550 with variable custom and/or insight content, derived from the wrap package 498, is shown after the purchase by a customer. In this example, the first card 550A, the variable custom content including the name of the purchasing customer (Andrea Smith) and the local Neiman Marcus store (San Francisco, Calif.) appear in the two defined variable text components containers. In card 550B, variable custom content including an electronic receipt of the item(s) purchased (e.g., Prada shoes) by the customer appears in the variable component container. In gallery card 550C, a number of variable insight content items (purse, necklace, and sun glasses) that accessorize the original purchase appear in the variable component containers of the three gallery containers. In card 550D, an image and name of the personal shopping assistant (Mary Cruz) for Andrea Smith appear in the variable component containers. Finally, in the end of wrap card 550E, variable insight content (e.g., an image of a woman in a Fall dress) appears in the variable component container.

Figure 24D:
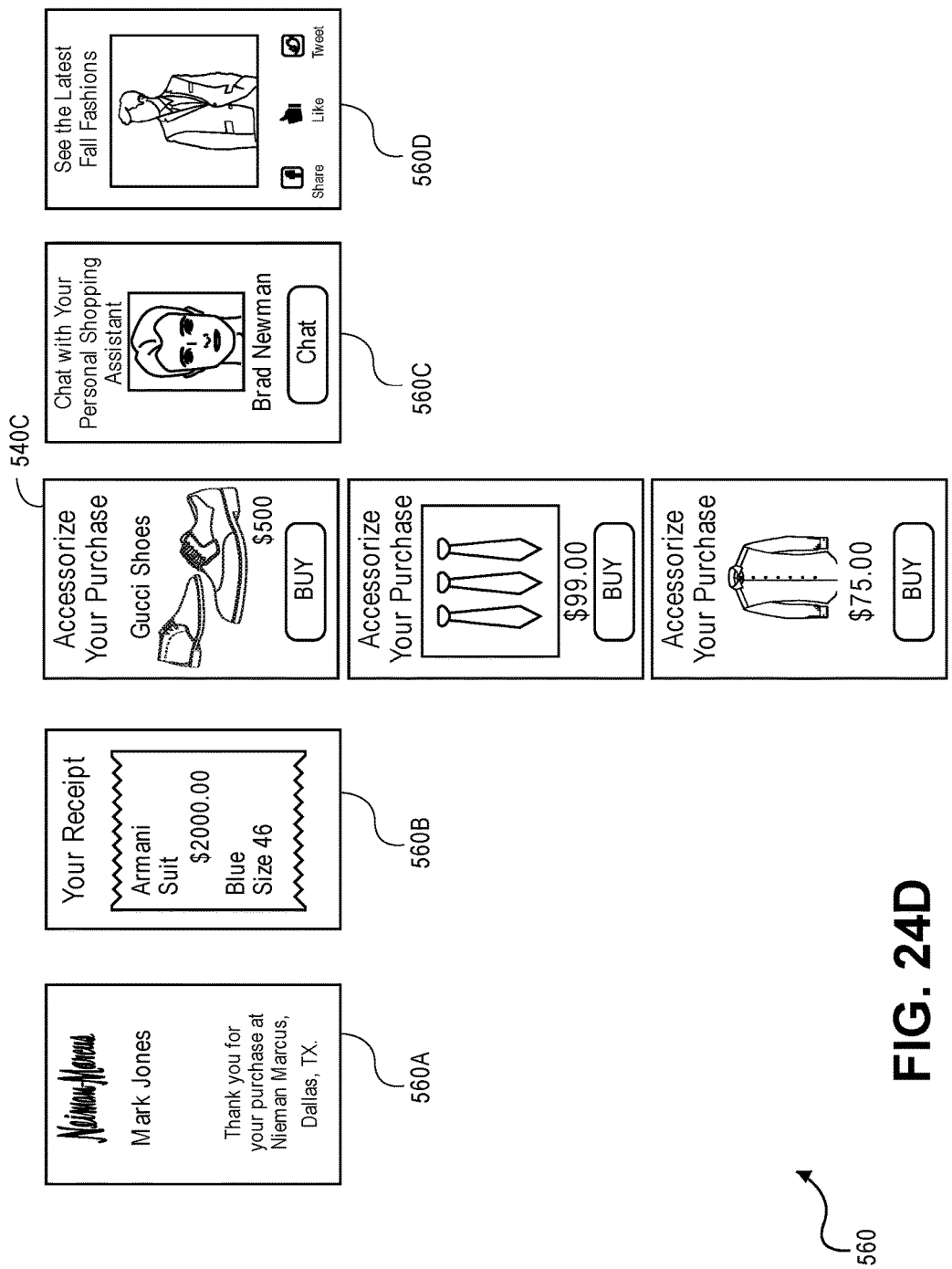

Referring to FIG. 24D, a second wrap package 560 with variable custom and/or insight content, derived from the wrap package 498, is shown after the purchase by another customer. In this example, the first card 560A, the custom content including the name of the purchasing customer (Mark Jones) and the local Neiman Marcus store (Dallas, Tex.) where the purchase occurred appears in the two variable components containers. In card 560B, the custom content of the purchased item (e.g., an Armani suit) appears in the variable component container. In gallery card 560C, a number of custom and/or insight content items (men's dress shoes, neckties, and dress shirt) that accessorize the original purchase appear in the variable component containers of the three gallery containers. In card 560D, an image and name of the personal shopping assistant (Brad Newman) for Mark Jones appear in the variable component containers. Finally, in the end of wrap card 560E, an image of a man in a Fall sports jacket appears in the variable component container.

As previously noted, analytics can optionally be applied when generating the variable content to be inserted into or associated with the various empty components of the cards of a wrap package. In the Neiman Marcus example, a number of analytics can be used to gain insights into the type of accessory items that should be included in the gallery cards. For example, the age, gender, demographics, location, type of item purchased, etc., can all be used to intelligently define the types of items (i.e., the insight content) that should appear in the gallery and/or the end of wrap card in each example.

Again, it should be noted that the examples of custom content wrap packages as provided herein are merely exemplary and should not be construed as limiting in any way. On the contrary, a wide variety of wrap packages with just about any type of custom content, under a wide variety of circumstances, using any relevant analytics, can be authored and distributed.

Using Beacons to Generate and Deliver Wrap Package of Cards with Custom/Insight Content to Target Individuals In yet another embodiment, beacons can be used as the trigger event to generate and deliver wrap packages of cards with variable custom and/or insight content.

Figure 25:
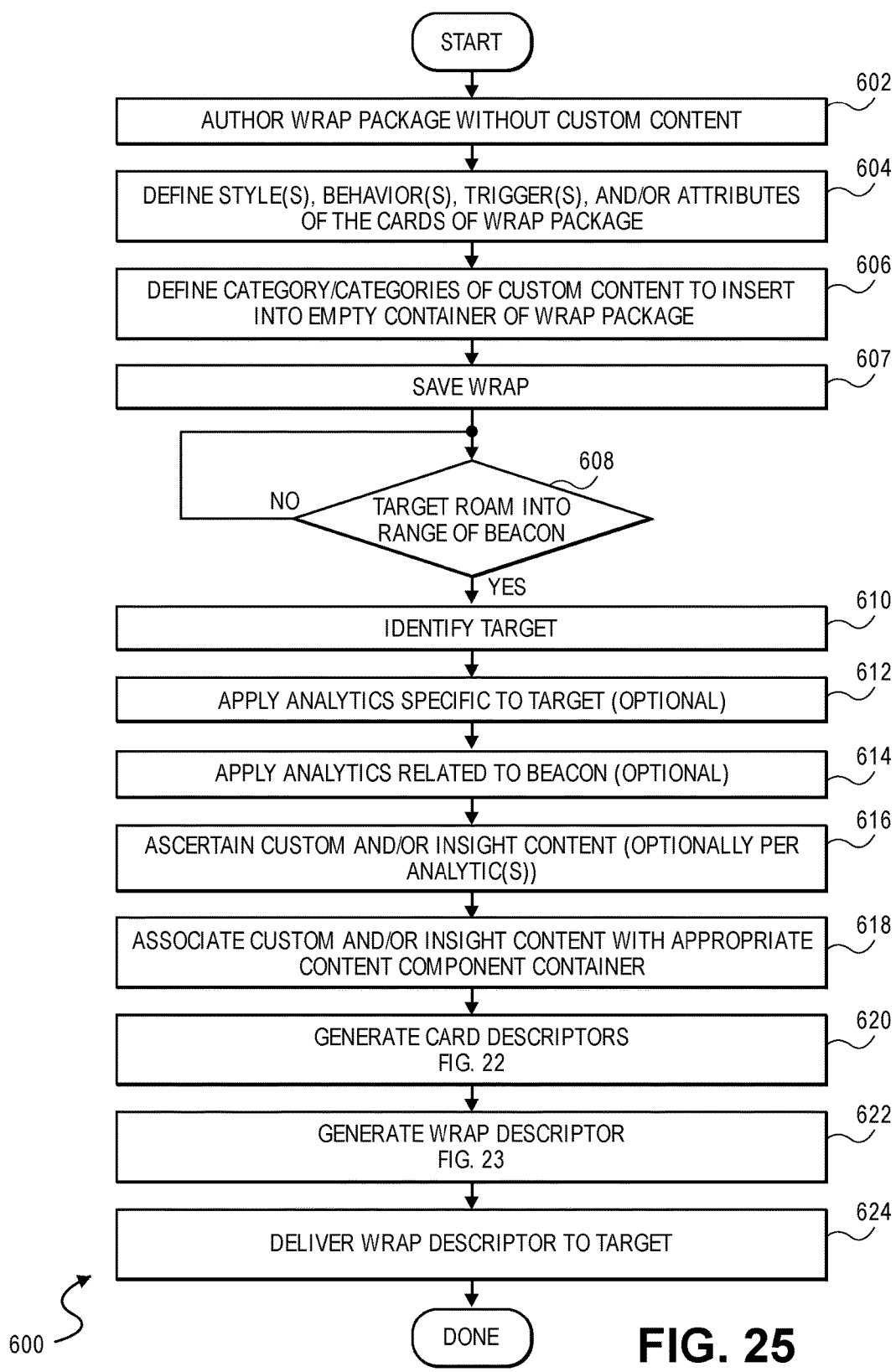
FIG. 25 is a flow diagram illustrating the use of beacons to automatically generate and deliver wrap packages of cards with custom content to target individuals in accordance with yet another non-exclusive embodiment of the invention.

Referring to FIG. 25, a flow diagram 600 illustrating the use of beacons to automatically generate and deliver wrap packages of cards with custom and/or insight content to target individuals is illustrated. As described below, this process is similar, although not identical, to the process described above with respect to FIG. 21.

In the initial step 602, the author creates a wrap package without custom content. This step typically involves the author generating a wrap package of cards using the authoring tool 100, as described above with respect to FIGS. 7 through 20B. During one or more authoring sessions, the author creates a set of cards and defines their horizontal and/or vertical sequential order(s). The various cards of the wrap may include any card type as specified above, including but not limited to, textual, image/photo, video, transact, gallery, booking/reservation, chat, GPS/location, and end of wrap, etc.

During the authoring process as defined in step 604, the style(s), behavior(s), trigger(s) and/or attributes of the various cards of the wrap are defined. As the cards are created, the author relies on the various tools described herein to create the intended user experience when consuming the wrap by defining the content (e.g., images, photos, video, etc.), style (e.g., font type, size, color of text and the like), card behaviors (i.e., scrolling or snap to frame), application or web-site like functionality (chats, GPS, transactions, etc.) and triggers (e.g., "Buy Now", "Book Now" buttons, etc.). However, as described in more detail below, certain custom and/or insight content is not included in the wrap package at this point.

In step 606, the author defines variable custom and/or insight content that is to be included in the wrap package when it is delivered to a target recipient. Most often, although not necessarily, the custom and/or insight content falls into a general category or class of content that is readily defined, but the specific variable content is not yet known at the time of authoring. For example, the wrap package may be a promotional wrap that advertises the sale of a category of goods and/or services that are delivered to a target consumer when they trigger a beacon upon entering a particular department of a department store. Since none of variable custom and/or insight content for completing the wrap can be known when the wrap is authored, "empty container" components are defined within the various cards of the wrap that are later filled or associated with the variable custom and/or insight content when a beacon is triggered. For example, one set of custom and/or insight content may be inserted into or associated with the empty container components when a customer enters the Men's department, whereas a different set of custom and/or insight content may be inserted into or associated with the empty component container(s) when another customer enters into the Women's department.

In step 607, once the authoring of the wrap package with the empty component container(s) is complete, the wrap package is saved. For example in a non-exclusive embodiment, the wrap package is saved by the wrap engine 522 of the wrap infrastructure described above with respect to FIG. 24B.

In decision 608, it is determined if a target recipient of the wrap package has roamed into a range of a beacon.

If yes, then the target recipient is identified in step 610. In a non-exclusive embodiment, the target recipient is identified using an iBeacon as developed by Apple of Cupertino, Calif.), which are compatible with the well-known Bluetooth Low Energy protocol. Such beacons broadcast an identifier to any nearby mobile communication device that may roam into range, such as smart phones and/or tablets. In reply, the mobile communication device, such as those running either iOS or Android operating systems, are configured to listen for the broadcasts. When in range and the broadcast is identified, the mobile device responds with location information and unique identifier information, which can be used to identify the target and their specific location (e.g., a name of a customer and a specific department in a department store). In an alternative embodiment, an application (i.e., an "app") can be preinstalled onto mobile communication device. When the mobile communication device enters into the range of a beacon, the unique identifier of the device, as well as its location, are provided during a session between the beacon and the mobile device. With either embodiment, the target recipient and his/her specific location can be ascertained.

In optional step 612, analytics specific to the identified target recipient may be applied to obtain insights into defining the custom and/or insight content to be included in the wrap. For example, a wide array of analytic parameters, such as gender, age, location, past buying history, location, and other demographics, such as income, personal preferences, etc., may be applied in generating or defining the insight content to be included in the empty component container(s) of the wrap package. For instance, the custom and/or insight content defined for a 20 year-old female student will be different than a 55 year-old businessman.

In an optional step 614, analytics specific to the triggered beacon are applied to gain insights into defining the custom content to be included in the empty component containers of the wrap package. Different custom content can be specified depending on a wide variety of analytic factors, such as a given department (e.g., men's shoes vs. woman's formal wear), a time period in which the beacon was triggered (e.g., the time period or season of the year (winter, spring, summer or fall)).

For example, if the aforementioned businessman enters the jewelry department in a department store, then analytics based on demographics, past buying history, season of the year, etc. can all optionally be applied to gain insight into defining the custom and/or insight content that is most likely to entice and peak the interest of the target into making another purchase. If the businessman had previously purchased jewelry for his wife, then customized insight content specific to jewelry items for his wife can be delivered to the businessman in the form of a wrap package when a beacon detects he has entered the jewelry department during the holiday shopping season for example.

Similarly, for the 20 year-old female student, analytics can also optionally be applied to again gain insights into defining the custom content. For instance, if the student enters the women's causal wear department in the month of June in a department store located in Florida, then custom and/or insight content relative to summer or beach clothing (e.g., tee-shirts, shorts, bathing suits, etc.) would be defined. However, if the same student entered a similar department in a department store located in New England during the month of February, then winter-related custom and/or insight content (e.g., coats, sweaters, boots, etc.) would be defined.

It should be noted that the above examples are merely illustrative The look, feel, content, and functionality of wrap packages, along with the custom content, and optionally any analytics used to define the custom content, can all widely vary. The above examples, therefore, should not be construed as limiting in any manner.

In step 616, the custom and/or insight content for insertion into or association with the empty component containers of the wrap package is defined, optionally by applying the analytics as discussed above with respect to steps 612 and/or 614.

In step 618, the defined custom and/or insight content is associated with the appropriate empty component containers of the wrap package. In various embodiments, the custom and/or insight content can be inserted inline into the cards are referenced using an identifier, such as a URL.

In step 620, a card descriptor is generated for each card, including any custom and/or insight content, included in or associate with the wrap package, using the process described above with respect to FIG. 22.

In step 622, a wrap descriptor for the wrap package, including the custom and/or insight content, is generated from the card descriptors using the process described above with respect to FIG. 23.

Finally, the wrap descriptor is delivered to the target recipient in step 624. In one non-exclusive embodiment, a wrap cover including a URL that contains a unique wrap ID 42 for the wrap package is sent to the target recipient in the form of a message, such as an email or other message type, such as a text or other multi-media message. When the target recipient accesses the cover in the message, the URL is accessed, causing the wrap ID 42 to be requested. In response, the wrap descriptor is delivered to the target recipient.

Figure 26:
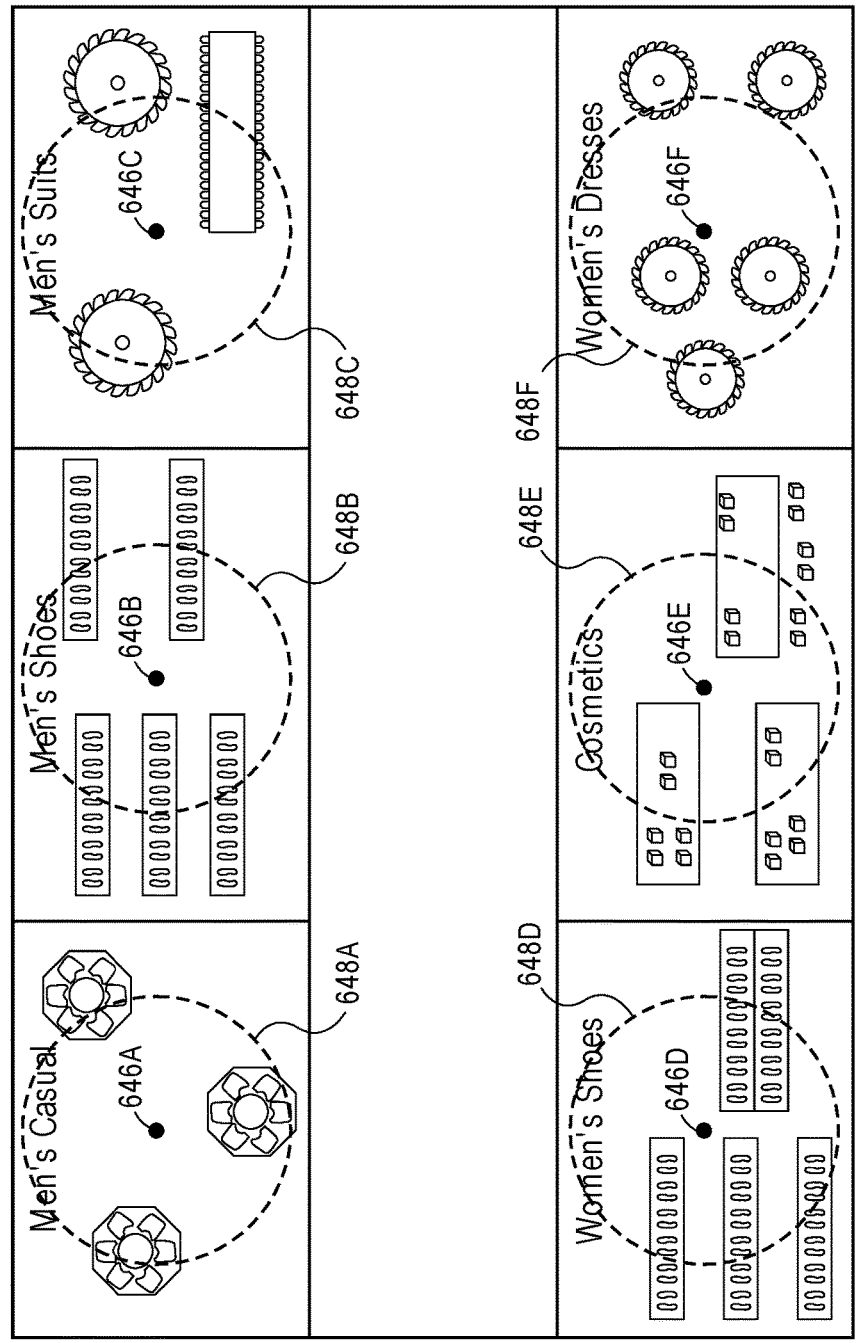
FIG. 26 is a diagram illustrating a plurality of beacons arranged in different departments of a department store in accordance with a non-exclusive embodiment of the present invention.

Referring to FIG. 26, a diagram 640 illustrating a plurality of beacons provided at different locations of a Neiman Marcus department store located in Palo Alto, Ca is illustrated. In this example, the various departments in the store each have their own beacon 646 that defines a range designated by a dashed circle 468. Specifically, the beacon and corresponding range for the Men's Casual, Men's Shoes, Men's Suits, Women's Shoes, Cosmetics and Women's Dresses departments are represented by reference numerals 646A/648A, 646B/648B, 646C/648C, 646D/648D, 646E/648E, and 646F/648F respectively.

As described in more detail below, wrap packages with custom and/or insight content are generated and delivered to target recipients as they enter the various departments of the store. In a non-exclusive embodiment, the wrap packages with custom and/or insight content are generated and delivered using a logical computing infrastructure 500 similar to that described above with respect to FIG. 24B.

EXAMPLES

Figure 27A:
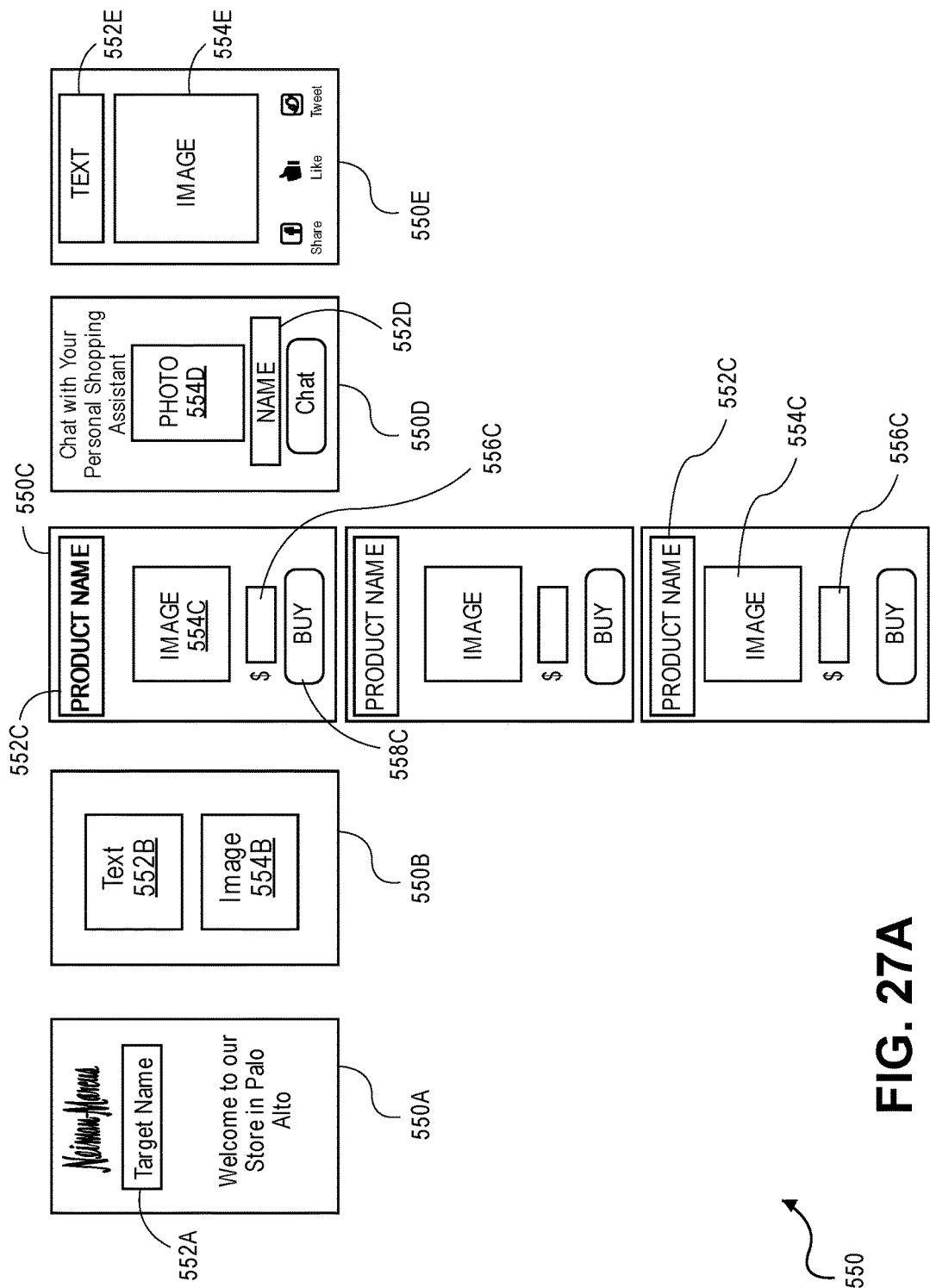
FIGS. 27A through 27C illustrate two exemplary wrap packages automatically generated with custom content and delivered to target individuals in response to beacons in accordance with the principles of the present invention.

Referring to FIG. 27A, an exemplary wrap package 550 with empty component containers is illustrated. This wrap has been authored to deliver custom content to customers as they enter the various departments of the Neiman Marcus store of FIG. 26.

The wrap package 550 has a first card 550A that includes the store name "Neiman Marcus" and a message "Welcome to our Store in Palo Alto". In addition, the card includes a variable text component container 552A for the name of an identified target recipient.

The second card 550B includes another variable text component container 552B and a variable image component container 554B for naming and depicting a particular department in the store respectively. When a target triggers one of the beacons 646A-646F, text and an image pertinent to the corresponding department are inserted into or associated with the two containers 552B and 554B respectively.

The third card 550C is a gallery including a plurality of gallery containers. The intent of the gallery card 550C, in this example, is to populate the various gallery containers with variable text and variable images related to products in the department the target entered. Each gallery container includes a variable text component container 552C for naming a product, a variable image component container 554C for presenting an image of the named product, another variable text component container 556C for displaying the cost of the displayed product, and a "BUY" trigger 558C. As previously discussed, the BUY transaction can be processed in a number of ways, including cul-de-sacing to a remote web site, using a transaction widget embedded in the card 650C or elsewhere in the wrap, or building in the functionality necessary to process and complete the transaction within wrap 650 itself.

The fourth card 550D is a chat card. Variable text and image component containers 552D and 554D are provided for the name and picture of a yet-to-be defined personal shopping assistant. In addition, a "Chat" trigger 559D is provided. When selected, an online chat session is established between the target and the identified personal assistant.

Finally, the fifth card 550E is an end of wrap card. This card includes variable text and image component containers 552E and 554E for appropriate text and an image or photo for the end of the wrap.

In one example, a customer named Tom Casey enters the range 648B of the beacon 646B associated with the Men's shoe department. As a result, the beacon 646B is triggered, resulting in the identification and location of Tom Casey in or near the department. In response, the computing infrastructure 500, as described above, optionally using analytics, generates a wrap package 660 with custom and/or insight content.

In this particular example, Mr. Tom Casey's customer records 528 (e.g., name, address, purchase history, account information, profile, etc.) are accessed in the database 526. In addition, since the triggered beacon corresponds to the Men's shoe department, the product database 530 including records pertaining to a number of men's shoes are also accessed. Once the databases are accessed, analytics may optionally be applied to gain insights and define the specific custom and/or insight content to be included or otherwise associated with the wrap.

For example, the income, demographics, past buying history, cost and brand of past shoe purchases, etc. of Tom Casey are considered. In addition, because Palo Alto is a warm climate, warm weather shoes, as opposed to cold weather shoes or boots, are considered. Using these or similar analytics, the analytics tool 524 defines the custom and/or insight content that is likely to enhance the possibility that Mr. Casey will make another shoe purchase while visiting Neiman Marcus that day or in the near future.

Figure 27B:
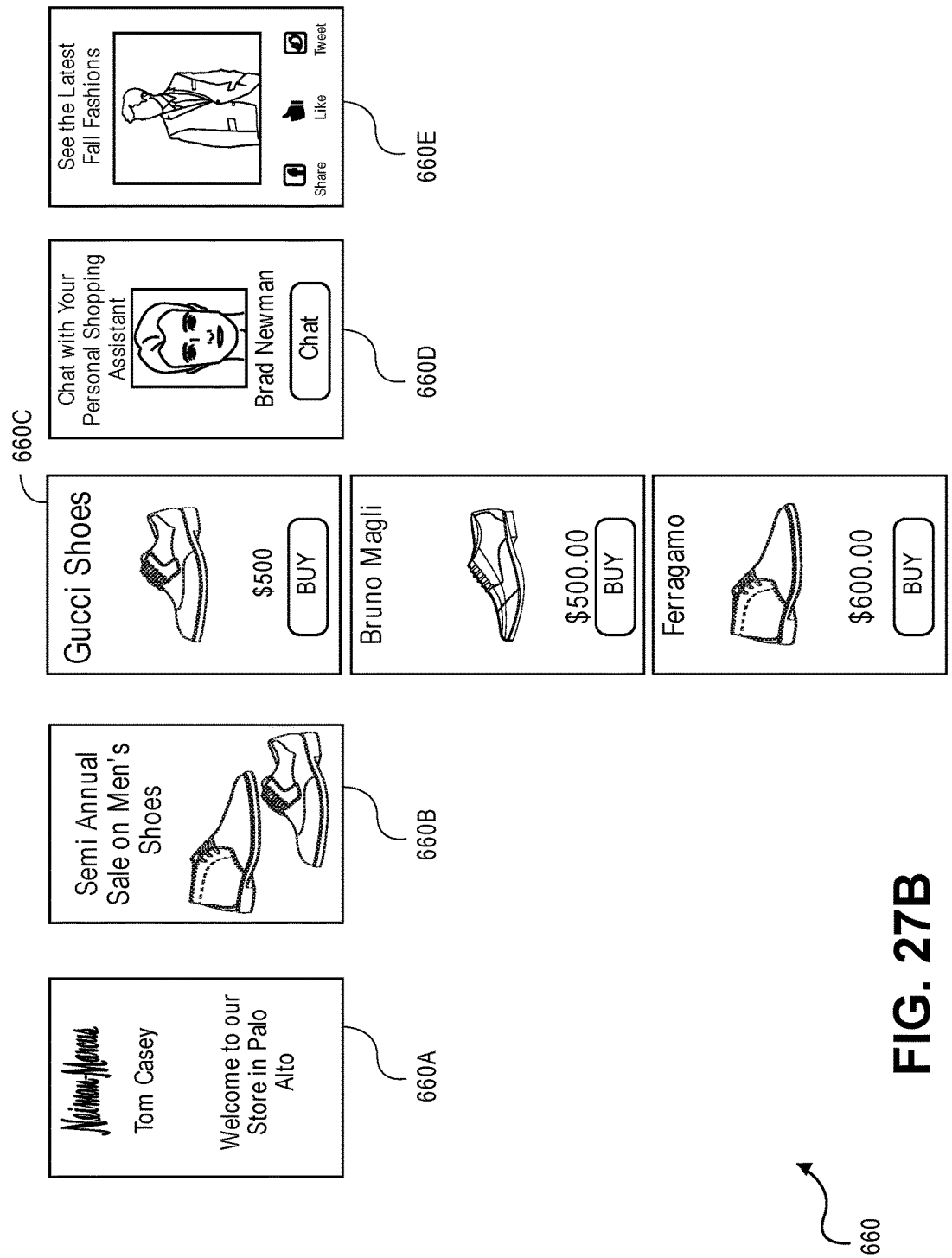

Referring to FIG. 27B, an exemplary wrap package 660 for Tom Casey with custom and/or insight content is illustrated. The wrap package 560 is derived from the authored wrap package 550 with the various variable component containers filled with custom and/or insight content.

In the first card 660A, a message welcoming Tom Casey to the Neiman Marcus store in Palo Alto is provided. The name "Tom Casey" is inserted into or associated with the text component container 552A of card 550A to create this card.

In the second card 660B, text "Semi Annual Sale on Men's Shoes" and graphics pertinent to the relevant department is inserted into or associated with the variable component containers 552B and 554B of card 550B respectively to create the card.

In the gallery card 660C, a gallery of men's shoes is provided in the various gallery containers. Again, text, image and price content are inserted into or associated with the variable component containers 552C, 554C and 556C of each gallery container respectively. By scrolling up and down when the wrap is being consumed, the various displayed shoes can be purchased by selecting the corresponding BUY trigger.

In the fourth card 660D, a chat card enabling a chat with a personal shopping assistant named Brad Newman is provided. Again, the name and a photo of the assistant are inserted into or associated with the variable component containers 552D and 554D to create the card.

Finally, in the fifth card 660E, an end of wrap card is provided. In this example, text reciting "See the Latest Fall Fashions" and an image of a man in a suit are inserted into or associated with text and image variable component containers 552E and 554E of card 550E to create the card.

Figure 27C:
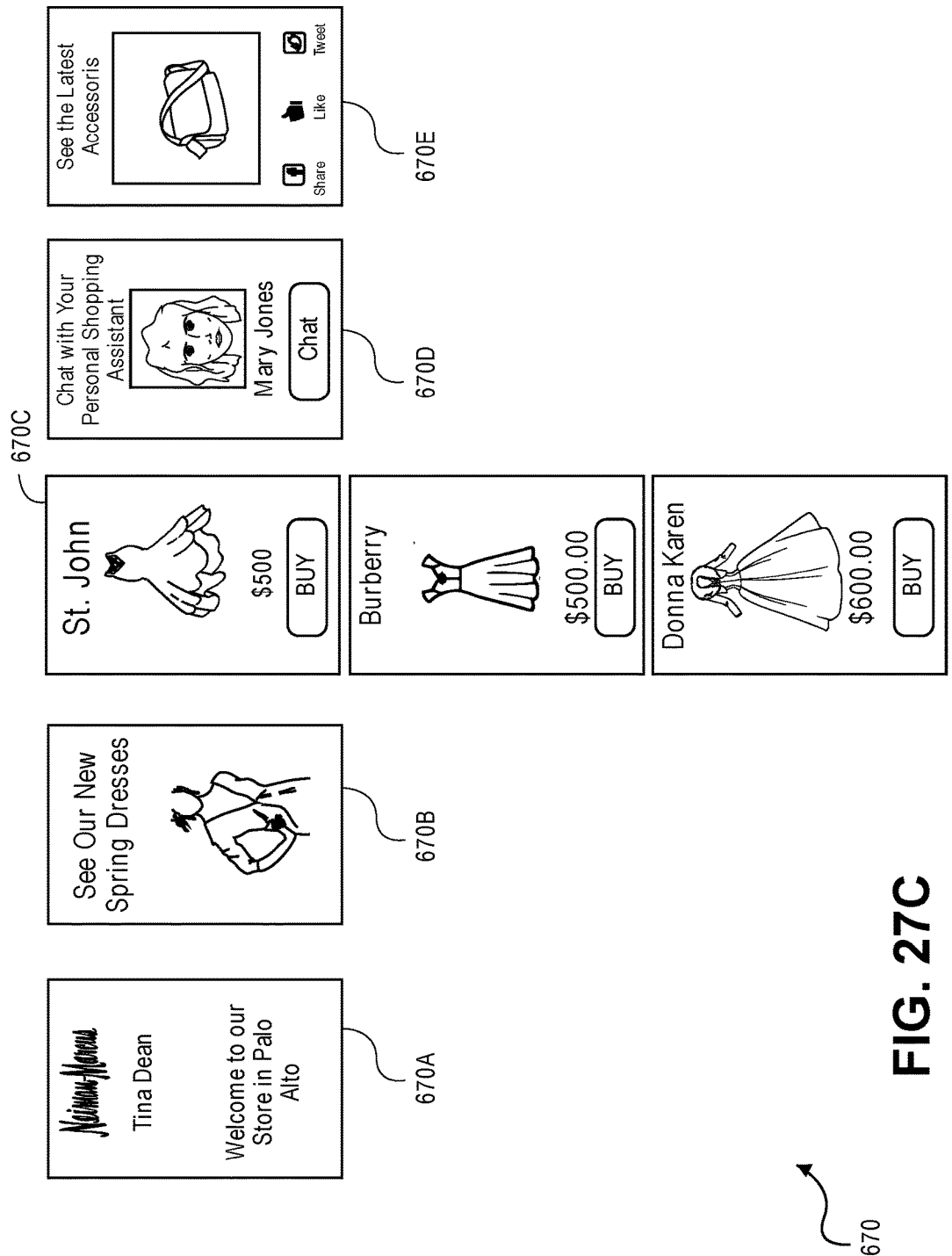

Referring to FIG. 27C, another exemplary wrap package 670 with custom and/or insight content is illustrated. In this example, the target customer is a woman, named Tina Dean, who entered into the Women's Dress department in the same Neiman Marcus department store 640, triggering the beacon 646F. In a manner similar to that described above, including optionally the use of analytics, the wrap package 670 with custom and/or insight content relevant to Tina Dean and women's dresses is generated and delivered. In the first card 670A, a message welcoming Tina Dean to the Neiman Marcus store in Palo Alto is provided. In the second card 670B, text and graphics informing Tina Dean of the new spring dresses is provided. In the third card 670C, a gallery of spring dresses by various designers is provided. By scrolling up and down, the various dresses can be viewed and purchased by selecting the corresponding BUY button. In the fourth card 670D, a chat card allowing or enabling a chat with a personal shopping assistant named Mary Jones is provided. Finally, in the fifth card 670E, an end of wrap card is provided with text and an image of a handbag accessory.

In each of the examples provided above, the wrap packages 660 and 670, is each delivered to a customer as they enter a particular department in the store 640. By timely delivering custom content, especially when intelligently using analytics, wrap packages can effectively be used to reach out and contact customers, increase sales, improve customer experiences and brand loyalty in ways previously not possible.

The examples provided in FIGS. 27A through 27C are merely illustrative and in no way should be construed as limiting. It should be understood that the circumstances and situations, including the type of custom content that can be included in a wrap package that is delivered in response to the triggering of a beacon may widely vary and should not be limited by any examples provided herein.

In the aforementioned embodiments, a wrap descriptor is generated after the custom and/or insight content is defined and inserted into or otherwise associated with a wrap package. It should be noted, however, that in alternative embodiments, the wrap descriptor for a wrap package can be generated before a trigger event and/or any containing custom and/or insight content is defined.

Figure 28:
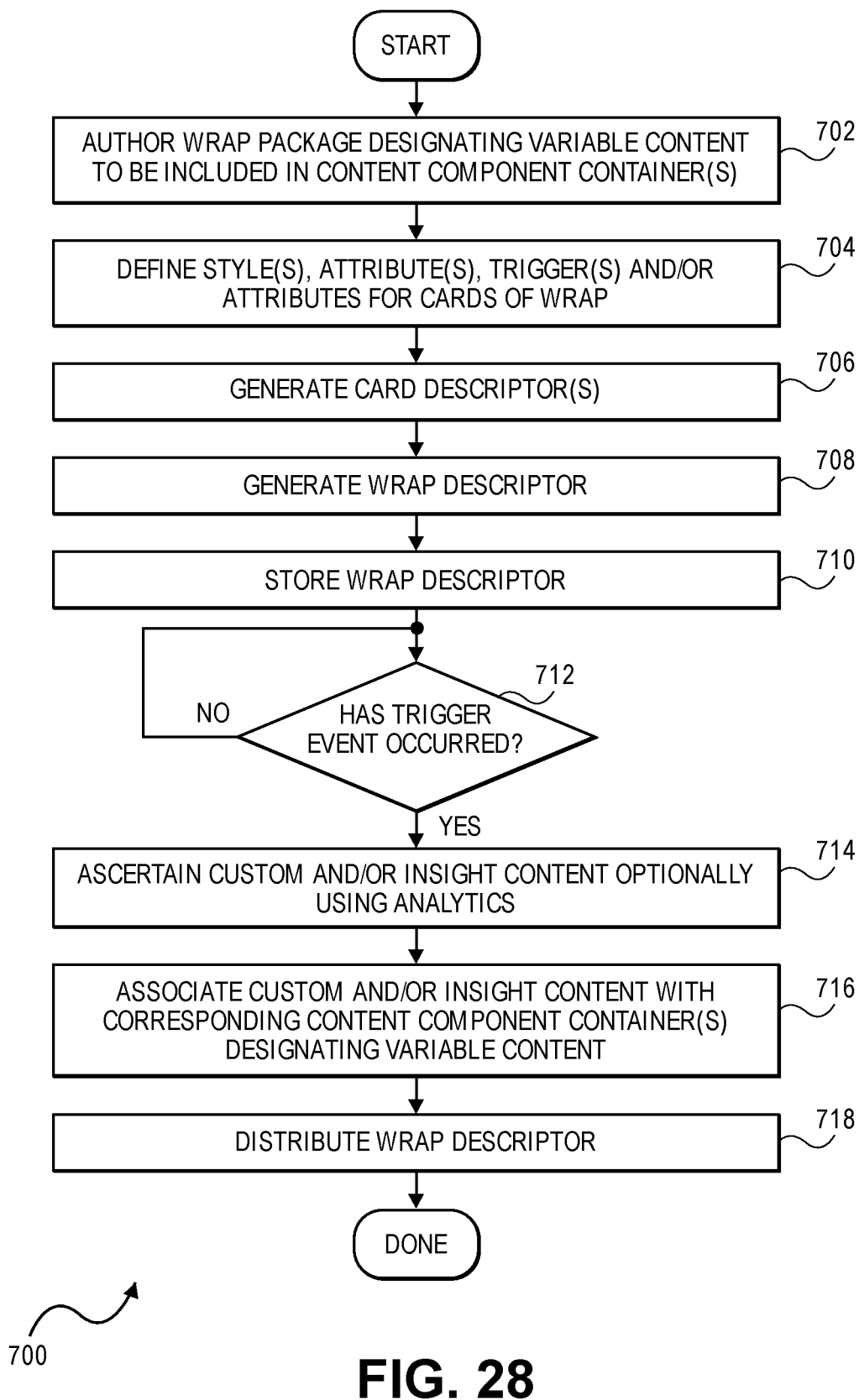
FIG. 28 is a flow diagram of another embodiment for creating and distributing wrap packages with custom content.

Referring to FIG. 28, a flow diagram 700 illustrating the steps for generating a wrap descriptor for a wrap package before a trigger event and/or any containing custom and/or insight content is defined is illustrated.

In the initial step 702, cards of a wrap package are authored with one or more variable content component containers. As previously described, these variable content component containers may text, images, photos, triggers, or any other type of component or behavior.

In step 704, the style(s), attribute(s), trigger(s), and/or attribute(s) for the cards of the wrap package are defined.

In steps 706 and 708, the card descriptors and wrap descriptor for the wrap package are generated using a process similar to that described above with respect to FIGS. 22 and 23. This embodiment differs, however, in that the data objects define variables for the various types of content to be later defined and associated with the cards. Once the wrap descriptor is generated, with the variables, it is stored in step 710.

In step 712, a trigger event occurs. As previously discussed, the trigger can be entering the range of a beacon. In other embodiments, the trigger can be any event, such as the purchase of a good or service, or any other predefined and/or conditional event.

In step 714, the custom and/or insight content, optionally using analytics, is generated or otherwise defined after the trigger event has occurred.

In step 716, the generated or defined custom and/or insight content is/are associated with the various variables referenced in the data objects defining the cards of the wrap package respectively.

Finally, in step 718, the wrap descriptor is distributed to a target upon request.

In an alternative embodiment, the trigger event can be the opening of a wrap by the target recipient. In other words, steps 702 through 710 and step 718 would all occur prior to ascertaining if the trigger has occurred. When the target opens and starts to consume the wrap, then step 714 for ascertaining custom and/or insight content and step 716 for associating the ascertained custom and/or insight content with the corresponding content component containers occurs. This embodiment has the advantage of potentially delivering content that is more timely and relevant than simply using beacons as the trigger event as discussed above. For example as a customer roams from department to department at a store, they may receive multiple wraps as various beacons are triggered. As a result, previously received, but un-opened and un-consumed wraps, may become stale after the customer wonders into another department. With this embodiment, however, a first trigger when the customer enters the store may result in the delivery of a wrap, but without any custom and/or insight content. Then, when the wrap is opened and consumed, steps 714 and 716 are performed, resulting in the delivery of timely and relevant content. For example, if the wrap is opened and consumed while in the men's shoe department, or alternatively the woman's dress department, then either shoe or dress related content is ascertained and delivered.

Wraps as Messages

The described wrap packages 10 are essentially cloud based portable data objects that can readily be distributed using a wide variety of electronic techniques including messaging, posting and inclusion as links in documents, articles or other electronic communications. The wrap package 10 thus allows authors to take applet and website functionality and make them consumable as a message, delivered in a narrative storytelling format. This allows the transformation of an app or website functionality into a portable, sharable, and savable wrap package 10, that can be distributed like electronic messages (e.g. email, SMS, text) are disseminated today. For example as illustrated in FIG.

7M, the media triggers 381 and 383 can be used to share the wrap package 310 with others via Facebook Twitter. Although in this embodiment actual triggers for sharing are provided within or embedded in the wrap itself, this is not always necessary for sharing the wrap. Alternatively for example, the cover 15 that includes a URL associated with the wrap (e.g., the wrap ID 42) can be posted on a social media site or feed, email to others, or otherwise distributed using an electronic communication protocol or platform.

Not only are the wrap packages 10 easy for publishers and others to distribute, but viewers and other recipients of a wrap may also readily share a wrap with their friends, family, coworkers, colleagues, etc. This is a powerful construct that can greatly extend or enhance the market (or other target segment) reach and penetration of a well designed wrap since a "message" from a friend or acquaintance is often more favorably received than a message from an unknown party. Neither applets nor websites are well suited for such viral distribution.

Since the set of cards 14 that make up a wrap package 10 are encapsulated as a data object and can be sent as a unit, the wrap package 10 can also readily be stored on a viewer's device if the viewer so desires. Contrast this with a conventional multi-page website which is not designed to be persistently stored on a viewer's device as a unit, even if individual pages may sometimes be cached. It also eliminates third party aggregator (e.g., the Apple App Store; Google Play, etc.) control over the delivery of a company's services/messages to its customers as occurs in the distribution of conventional apps.

Benefits and Advantages of Wrap Packages

Wrap packages 10 offer a number of benefits and attributes currently not available with conventional methods of distributing content, such as with PDFs, web sites, or stand-alone apps. Since cards 14 can be sequenced and authored to include media content, application functionality, and e-commerce related services, wrap packages 10 have the unique ability to narrate a story, in a book-like format, that captures and holds the attention of the viewer, while also offering an "app" like user experience. As such, wrap packages 10 offer a new web-based platform for storytelling, communicating ideas, and delivering highly visual and functional user experiences. Wrap packages 10 thus enable a new business paradigm for selling, advertising, publishing, increasing brand loyalty, offering services, and contacting and engaging new and old customers alike, all ideally delivered to consumers on their mobile devices, where they spend their time and consciousness. Where businesses used to have to build destinations (e.g., websites) or monolithic systems (e.g., "apps"), they can now, instead, provide consumers with wrap packages 10, that are delivered like messages, and that provide the user experiences and functionality they really want and need. As a result, wraps 10 create opportunities for business to innovate and improve products and services, leveraging the mobile web in ways not before possible, because a convenient, enabling interface and platform did not previously exist.

Wrap packages 10 are also like interactive messages that can be easily shared, delivered over the mobile web, and locally stored. With the ability to share, distribute over the mobile web and locally store, popular wrap packages can readily go viral.

Wrap packages 10 are also preferably delivered using a SaaS (Software as a Service) model, meaning wrap packages are delivered only on an as-needed basis.

Wrap packages can be authored by anyone, from an individual with little technical or design skills, to large and sophisticated enterprises.

Wrap packages 10 can be distributed narrowly to a specific or targeted person or persons or widely distributed to many, many persons.

Wrap packages 10 can be written once and can run on just about any browser enabled device. As a result, wraps are not platform, operating system, or device dependent.

Since wrap packages 10 can be easily generated and optionally dynamically updated with new content, wrap packages can be used as a digital "corollary" or "companion", accompanying the sale or rental of goods and/or services. For example, wrap packages can be created and distributed as an "Active Receipt" accompanying the sale or rental of a good or service. The merchant can thus provide through the wrap package 10 ongoing contact and support to on-board, up-sell and/or cross-sell the customer with ancillary goods and/or services, potentially for the entire life cycle of the product or service, all delivered in a digital format that never gets lost or misplaced. Accordingly, wrap packages can be used as an essential component of any product or service, delivering better customer service and creating new selling opportunities.

In summary, wrap packages 10 introduce the "narrative web", which is a storytelling mobile user interface, delivered over a cloud-based platform, ushering in a digital evolution of mobile marketing and customer relationship management. As a marketing tool, wrap packages 10 have the unique ability to increase mobile engagement, lead generation, and conversion, enabling businesses to increase sales, improve loyalty, and enhance customer relationships and loyalty. Wrap packages 10 thus offer a compelling business proposition by solving one of the biggest problems in the mobile space of today; namely the lack of connectivity between apps. With wrap packages 10, however, consumers and other users can enjoy a multi-function app-like experience, without having to be in an app, download an app, or open any apps.

Finally, while many of the benefits and attributes of wrap packages 10 are realized on mobile devices operating on the mobile web, it should be made clear that there is nothing inherent with wrap packages 10 that limit their usefulness or functionality in non-mobile environments. On the contrary, wrap packages 10 can also be used, and all the same benefits and attributes realized, on non-mobile devices, such as desktop computers and/or smart TVs for example.

The present invention is thus intended to be broadly construed to cover any system and method, such as carousel ads for example, that enables publishers and marketers to tell sequenced stories with (i) a combination of images, photos, text, video and other types of media, (ii) a swipe-able format that enables viewers to navigate the media displayed in one card or gallery container of a gallery card to the next, and (iii) includes embedded app-like functionality and/or links to other locations that provide additional information or such functionality and/or services. Consequently, the present application should not be construed to just those specific embodiments as described herein.

In the primary described embodiments, all of the behaviors are declared rather than being stored in-line within the descriptor. Thus, the descriptor itself does not have any programmable logic. In many embodiments, the declared behavior are all defined within the runtime viewer such that the runtime view can readily associate the desired behavior with the wrap, card or component as appropriate in a runtime instance of the wrap. It should be appreciated that this is a particularly powerful framework for enhancing portability of the wraps. With the descriptor/runtime viewer approach, a single item (the descriptor) can be used to define all of the content and functionality of a set of cards that can be rendered on virtually any platform. The declared functionality is provided (or obtained) by the runtime viewers when the wrap is to be rendered so that the author of the wrap is not required to know or understand any of the idiosyncrasies of any particular platform. The runtime viewer may be a generic runtime viewer (e.g., a viewer executable by a conventional browser) or may be native viewer customized for a particular platform. Regardless of the underlying platform, the runtime viewer handles the tasks of associating the declared behaviors with the wrap/cards/components which frees the wrap author and/or authoring tool from having to ensure that desired behaviors are programmed correctly for all of the different platforms that the wrap may be rendered on.

In most implementations, all of the sizeable assets that serve as content of the wrap are referenced in the wrap by appropriate identifiers rather than being stored directly in the wrap. This again significantly enhances portability by keeping the size of the descriptor small while facilitating the use of rich media content.

From the foregoing it should be apparent that the described wrap packages provide businesses with a powerful tool for engaging their customers, suppliers, employees or other constituents in a format that is particularly well tailored for display on mobile devices.

Although only a few embodiments of the invention have been described in detail, it should be appreciated that the invention may be implemented in many other forms without departing from the spirit or scope of the invention. For example several specific wrap descriptor structures have been described. Although such descriptor structures work well, it should be appreciated that the actual descriptor structure may vary widely. For example, in some embodiments some special behaviors can be defined within a wrap descriptor if desired. Such in-line behavior definition might be particularly useful in association with certain behavior extensions that are not otherwise readily available. For example, JavaScript can be included within a JSON object and various other descriptor structures. Thus, when JSON descriptors are used, selected behaviors or behavior overrides can be defined in-line using JavaScript if desired. Although programmed functionality can be included in some circumstances, it should be appreciated that liberal definition of behaviors within a wrap tends to defeat some of the primary advantages of the described descriptor/runtime viewer framework.

In many implementations much of the actual content of the wrap will be referenced by the descriptor rather than being stored in-line within the descriptor. However, the balance between in-line storage and references to external assets in any particular wrap descriptor may be widely varied anywhere from 100% referenced content to (at least theoretically) 100% in-line content—although the later is less desirable for media rich content and again, begins to defeat some of the advantages of using the descriptor approach. The choice between in-line and referenced content will typically be dictated in large part by the relative size of the content. For example, text, which tends to be very compact, is generally more suitable for inclusion in-line, whereas more graphic media, images, videos and/or audio files are typically more efficiently referenced.

A few different methods of and architectures for serving wrap packages and constructing runtime instances have been described herein. Although only a few approaches have been described in detail, it should be apparent from the foregoing that a wide variety other methods and architectures can be used as well. Therefore, the present embodiments should be considered illustrative and not restrictive and the invention is not to be limited to the details given herein, but may be modified within the scope and equivalents of the appended claims.

What is claimed is:

1. A method, comprising:
(a) defining a set of cards of a wrap package with one or more variable content container(s);
(b) ascertaining if a predefined trigger event has occurred;
(c) defining custom content to be associated with the one or more variable content container(s) when the predefined trigger event is ascertained;
(d) associating the custom content with the one or more variable content container(s) of the set of cards of the wrap package when the trigger event occurs; and
(e) delivering the wrap package to a computing device associated with a target individual after the trigger event occurs, the delivered wrap package having the custom content associated with the one or more variable content container(s) of the set of cards of the wrap package,
wherein the wrap package is delivered to the computing device in the form of a JavaScript Object Notation (JSON) wrap descriptor, the JSON wrap descriptor including: a set of JSON card descriptors for the set of cards of the wrap package respectively, each of the JSON card descriptors defining for an associated card:
a JSON card container;
one or more JSON content containers, including any variable content container(s) included in the associated card, the one or more JSON content containers each either including inline or referencing content, including any custom content, included in the associated card;
wherein the computing device is arranged to generate a runtime instance of the set of cards of the wrap package, including the custom content, from the delivered JSON wrap descriptor;
the runtime instance of the set of cards of the wrap packages including a gallery card arranged to be browsed in a first direction and non-gallery cards arranged to be browsed in a second direction that is perpendicular to the first direction;
the runtime instance of the cards of the set of cards, including the gallery card and the non-gallery cards, each having their own fixed aspect ratio when rendered on a display associated with the computing device.

2. The method of claim 1, further comprising:
specifying a content type for each of the one or more variable content container(s); and
associating the custom content to the one or more variable content container(s) by the specified content type respectively.

3. The method of claim 1, wherein each of the one or more variable content container(s) comprises one of the following:
a variable text content component container;
a variable photo/image content component container;
a variable video content component container; or
a variable trigger content component container.

4. The method of claim 1, wherein defining the custom content further comprising applying analytics to a set of data.

5. The method of claim 4, wherein the analytics pertain to the target individual and include one or more of the following:
(a) age;
(b) gender;

(c) location;
(d) buying history.

6. The method of claim 1, wherein the predefined trigger event is a conditional event.

7. The method of claim 1, wherein ascertaining if the predefined trigger event has occurred further comprises:
defining one or more analytics associated with the predefined trigger event; and
ascertaining that the predefined trigger event has occurred at least partially based on the one or more analytics.

8. The method of claim 1, wherein defining the set of cards of the wrap package with the one or more variable content container(s) further comprises:
defining the set of cards of the wrap package from one or more card templates; and
defining the one or more variable content container(s) in the set of cards.

9. The method of claim 1, wherein defining the set of cards of the wrap package with the one or more variable content container(s) further comprises:
using an authoring tool that specifies one or more card templates;
creating the set of cards of the wrap package from the one or more card templates respectively; and
authoring the set of cards created from the one or more card templates to include the one or more variable content container(s).

10. The method of claim 1, wherein defining the set of cards of the wrap package further comprises authoring one or more linear sequences for rendering the set of cards during the runtime instance, the one or more sequences including:
(i) a horizontal sequence;
(ii) a vertical sequence; or
(iii) both the horizontal and the vertical sequences.

11. The method of claim 1, wherein defining the set of cards of the wrap package further comprises selectively defining a component into a select card of the wrap package.

12. The method of claim 11, wherein the component authored into the select card is a dynamic component that is capable of dynamically updating when the select card is rendered during the runtime instance.

13. The method of claim 11, wherein the component is selected from the group consisting of:
(a) text;
(b) an image or photo
(c) video;
(d) a document;
(e) a chat function;
(f) a location or GPS function;
(g) a transact function; or
(h) an appointment making function.

14. The method of claim 1, further comprising assigning a unique wrap identifier to the wrap package, the wrap identifier used for identifying the JSON wrap descriptor.

15. The method of claim 1, further comprising associating a cover with the wrap package, the cover defining a wrap identifier for identifying and accessing the JSON wrap descriptor associated with the wrap package.

16. The method of claim 1, wherein the JSON card container and the one or more JSON content containers of each JSON card descriptor defines content and layout of the associated card respectively.

17. The method of claim 1, wherein the JSON wrap descriptor is further configured to be used by a runtime engine provided in a native application residing at the computing device, the runtime engine configured to generate the runtime instance of the wrap package from the delivered JSON wrap descriptor.

18. The method of claim 1, wherein the set of cards of the runtime instance of the wrap package are sequentially rendered on the display associated with computing device in response to navigable inputs provided to the computing device.

19. The method of claim 1, further comprising delivering a runtime engine to the computing device in cooperation with the delivery of the JSON wrap descriptor, the runtime engine configured to generate the runtime instance of the wrap package from the delivered JSON wrap descriptor.

20. The method of claim 1, wherein delivering the wrap package to the computing device associated with the target individual further comprises:
delivering a wrap identifier that identifies the wrap package to the computing device; and
delivering the JSON wrap descriptor to the computing device in response to a selection of the wrap identifier.

21. The method of claim 20, wherein delivering the wrap identifier further comprises one of the following:
delivering an electronic message to the computing device, the electronic message including the wrap identifier;
delivering a Uniform Resource Identifier (URL) to the computing device, the URL defining the wrap identifier; or
delivering a cover to the computing device, the cover including or embedding the wrap identifier.

22. The method of claim 1, wherein defining the set of cards of the wrap package further comprises one or more of the following:
assigning one or more styles to one or more components included in the set of cards of the wrap package;
declaring a behavior to a select component or a select card among the set of cards of the wrap package; and/or
defining a call-to-action trigger in the set of cards of the wrap package.

23. The method of claim 1, wherein the JSON wrap descriptor further includes a behavior declaration for declaring a behavior associated with either a select component or a select card in the wrap package, wherein a runtime engine present at the computing device is responsible for imbuing the behavior to either the select component or a select card in the wrap package during the runtime instance.

24. The method of claim 1, wherein the runtime engine includes a plurality of behavior definitions, the imbued behavior selected among the plurality of behavior definitions based on the behavior declaration declared in the JSON wrap descriptor.

25. The method of claim 1, wherein associating the custom content with the one or more variable content container(s) further comprising either (i) inserting the custom content inline the JSON wrap descriptor or (ii) referencing the custom content in the JSON wrap descriptor using content identifier(s).

26. The method of claim 1, wherein the gallery card includes a plurality of variable content containers for a plurality of gallery item components, the plurality of gallery item components defined using analytics pertinent to the target recipient when the trigger event is ascertained.

* * * * *